US012749204B2

(12) United States Patent
Saliu et al.

(10) Patent No.: US 12,749,204 B2
(45) Date of Patent: Sep. 29, 2026

(54) SYSTEM AND METHOD TO SIMULTANEOUSLY TRACK MULTIPLE ORGANISMS AT HIGH RESOLUTION

(71) Applicant: Ramona Optics Inc., Durham, NC (US)

(72) Inventors: Veton Saliu, Durham, NC (US); Mark Harfouche, Harfouche, NC (US); Gregor Horstmeyer, Durham, NC (US); John Efromson, Durham, NC (US)

(73) Assignee: Ramona Optics Inc., Durham, NC (US)

( * ) Notice: Subject to any disclaimer, the term of this patent is extended or adjusted under 35 U.S.C. 154(b) by 977 days.

(21) Appl. No.: 17/882,539

(22) Filed: Aug. 6, 2022

(65) Prior Publication Data

US 2023/0045152 A1 Feb. 9, 2023

Related U.S. Application Data

(60) Provisional application No. 63/230,472, filed on Aug. 6, 2021.

(51) Int. Cl.
*G06T 7/292* (2017.01)
*G01C 11/06* (2006.01)
(Continued)

(52) U.S. Cl.
CPC .............. *G06T 7/292* (2017.01); *G01C 11/06* (2013.01); *G02B 21/06* (2013.01); *G02B 21/36* (2013.01); *G06T 7/593* (2017.01); *G06T 7/70* (2017.01); *G06V 20/693* (2022.01); *G06V 20/695* (2022.01); *H04N 23/56* (2023.01);
(Continued)

(58) Field of Classification Search
CPC .......... G06T 7/292; G06T 7/593; G06T 7/70; G06T 2207/10021; G06T 2207/10056; G06T 2207/20021; G06T 2207/20084; G06T 2207/20132; G01C 11/06; G02B 21/06; G02B 21/36; G02B 21/088; G02B 21/367; G02B 21/125; G06V 20/693; G06V 20/695; H04N 23/56; H04N 23/90; H04N 5/77; A61B 3/18; A61B 3/0008; A61B 3/0033; A61B 3/005; A61B 3/028;
(Continued)

(56) References Cited

U.S. PATENT DOCUMENTS

2008/0262760 A1* 10/2008 Sakurai ............... G06F 13/4045 702/58
2015/0004637 A1* 1/2015 Cohen .................. G02B 21/361 359/380
(Continued)

*Primary Examiner* — Bumsuk Won
*Assistant Examiner* — Rahman Abdur
(74) *Attorney, Agent, or Firm* — Edward Ergenzinger

(57) ABSTRACT

A microscopy includes multiple cameras working together to capture image data of a sample having a group of organisms distributed over a wide area, under the influence of an excitation instrument. A first processor is coupled to each camera to process the image data captured by the camera. Outputs from the multiple first processors are aggregated and streamed serially to a second processor for tracking the organisms. The presence of the multiple cameras capturing images from the sample, configured with 50% or more overlap, can allow 3D tracking of the organisms through photogrammetry.

15 Claims, 37 Drawing Sheets

(51) Int. Cl.

| | |
|---|---|
| ***G02B 21/06*** | (2006.01) |
| ***G02B 21/36*** | (2006.01) |
| ***G06T 7/593*** | (2017.01) |
| ***G06T 7/70*** | (2017.01) |
| ***G06V 20/69*** | (2022.01) |
| ***H04N 23/56*** | (2023.01) |
| ***H04N 23/90*** | (2023.01) |
| *H04N 5/77* | (2006.01) |

(52) U.S. Cl.
CPC ... *H04N 23/90* (2023.01); *G06T 2207/10021* (2013.01); *G06T 2207/10056* (2013.01); *G06T 2207/20021* (2013.01); *G06T 2207/20084* (2013.01); *G06T 2207/20132* (2013.01); *H04N 5/77* (2013.01)

(58) Field of Classification Search
CPC ......... A61B 3/0285; A61B 3/09; A61B 3/103; A61B 3/1208; A61B 3/10; A61B 3/1015
USPC ........................................... 359/385; 351/223
See application file for complete search history.

(56) References Cited

U.S. PATENT DOCUMENTS

2020/0300764 A1* 9/2020 Gerlach ................ G06T 7/0012
2020/0382721 A1* 12/2020 Harfouche ......... G01N 21/8806

* cited by examiner

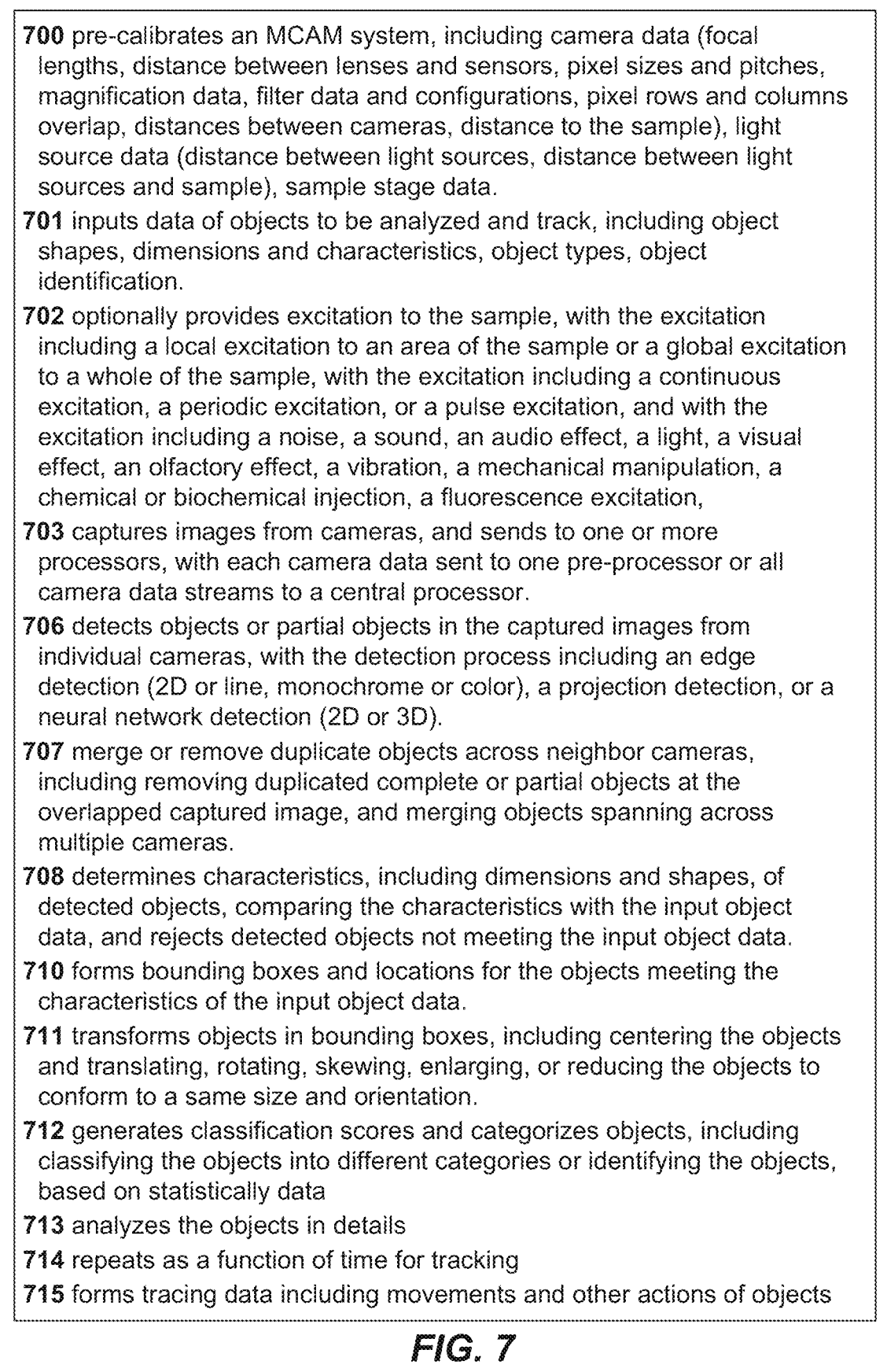

700 pre-calibrates an MCAM system, including camera data (focal lengths, distance between lenses and sensors, pixel sizes and pitches, magnification data, filter data and configurations, pixel rows and columns overlap, distances between cameras, distance to the sample), light source data (distance between light sources, distance between light sources and sample), sample stage data.

701 inputs data of objects to be analyzed and track, including object shapes, dimensions and characteristics, object types, object identification.

702 optionally provides excitation to the sample, with the excitation including a local excitation to an area of the sample or a global excitation to a whole of the sample, with the excitation including a continuous excitation, a periodic excitation, or a pulse excitation, and with the excitation including a noise, a sound, an audio effect, a light, a visual effect, an olfactory effect, a vibration, a mechanical manipulation, a chemical or biochemical injection, a fluorescence excitation,

703 captures images from cameras, and sends to one or more processors, with each camera data sent to one pre-processor or all camera data streams to a central processor.

706 detects objects or partial objects in the captured images from individual cameras, with the detection process including an edge detection (2D or line, monochrome or color), a projection detection, or a neural network detection (2D or 3D).

707 merge or remove duplicate objects across neighbor cameras, including removing duplicated complete or partial objects at the overlapped captured image, and merging objects spanning across multiple cameras.

708 determines characteristics, including dimensions and shapes, of detected objects, comparing the characteristics with the input object data, and rejects detected objects not meeting the input object data.

710 forms bounding boxes and locations for the objects meeting the characteristics of the input object data.

711 transforms objects in bounding boxes, including centering the objects and translating, rotating, skewing, enlarging, or reducing the objects to conform to a same size and orientation.

712 generates classification scores and categorizes objects, including classifying the objects into different categories or identifying the objects, based on statistically data

713 analyzes the objects in details

714 repeats as a function of time for tracking

715 forms tracing data including movements and other actions of objects

*FIG. 7*

Forming an MCAM system for tracking objects in a sample,
wherein the MCAM system comprises multiple cameras configured to capture images of different portions of the sample, one or more light source configured to provide irradiation to the sample, and a controller configured to process image data from the captured images, wherein the MCAM system optionally comprises an excitation source configured to provide a local or a global excitation to the sample, with the excitation including a local excitation to an area of the sample or a global excitation to a whole of the sample, with the excitation including a continuous excitation, a periodic excitation, or a pulse excitation, and with the excitation including a noise, a sound, an audio effect, a light, a visual effect, an olfactory effect, a vibration, a mechanical manipulation, a chemical or biochemical injection, a fluorescence excitation, wherein the controller is configured to store pre-measured calibration information to determine locations of the objects detected from the captured images with respect to individual cameras or with respect to the sample, to determine identifications of the multiple cameras in which the objects are detected, to determine sizes of the objects, to determine a spatial distance between two objects,
wherein the pre-measured calibration information comprises camera data (focal lengths, distance between lenses and sensors, pixel sizes and pitches, magnification data, filter data and configurations, pixel rows and columns overlap, distances between cameras, distance to the sample), light source data (distance between light sources, distance between light sources and sample), sample stage data, wherein the controller is configured to accept inputs related to the objects being tracked, with the inputs comprising at least object shapes, dimensions and characteristics, object types, object identification,

*FIG. 8* wherein the controller is configured to detect objects or partial objects in the captured images from individual cameras, with the detection process including an edge detection (2D or line, monochrome or color), a projection detection, or a neural network detection (2D or 3D), wherein the controller is configured to merge or remove duplicate objects across neighbor cameras, including removing duplicated complete or partial objects at the overlapped captured image, and merging objects spanning across multiple cameras, wherein the controller is configured to determine characteristics, including dimensions and shapes, of detected objects, comparing the characteristics with the input object data, and rejects detected objects not meeting the input object data, wherein the controller is configured to form bounding boxes and locations for the objects meeting the characteristics of the input object data, wherein the controller is configured to transform objects in bounding boxes, including centering the objects and translating, rotating, skewing, enlarging, or reducing the objects to conform to a same size and orientation, wherein the controller is configured to generate classification scores and categorizes objects, including classifying the objects into different categories or identifying the objects, based on statistically data, wherein the controller is configured to analyze the objects in details, wherein the controller is configured to form tracking data including movements of the objects.

*FIG. 8*
*(Continued)*

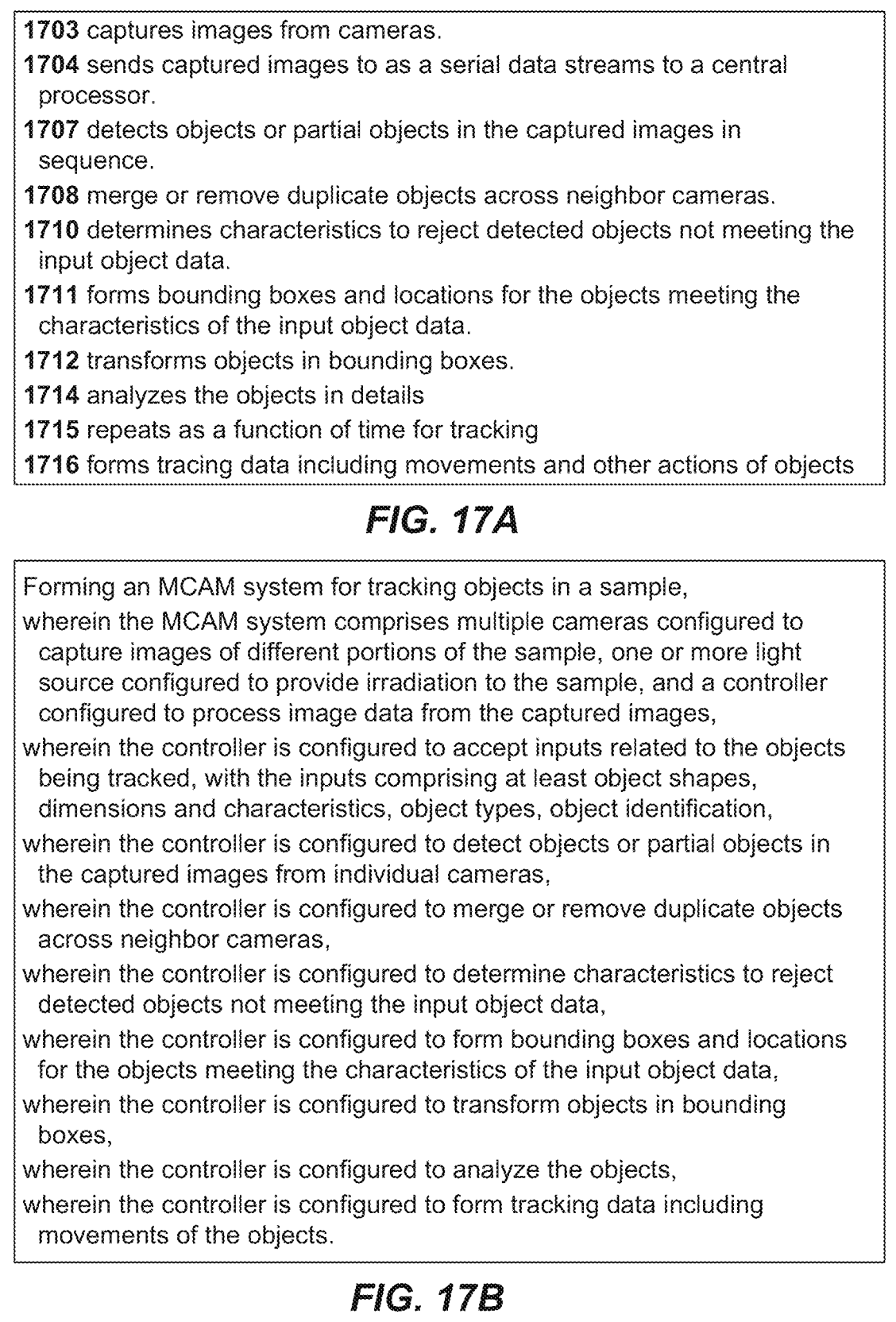

1703 captures images from cameras.
1704 sends captured images to as a serial data streams to a central processor.
1707 detects objects or partial objects in the captured images in sequence.
1708 merge or remove duplicate objects across neighbor cameras.
1710 determines characteristics to reject detected objects not meeting the input object data.
1711 forms bounding boxes and locations for the objects meeting the characteristics of the input object data.
1712 transforms objects in bounding boxes.
1714 analyzes the objects in details
1715 repeats as a function of time for tracking
1716 forms tracing data including movements and other actions of objects

*FIG. 17A*

Forming an MCAM system for tracking objects in a sample,
wherein the MCAM system comprises multiple cameras configured to capture images of different portions of the sample, one or more light source configured to provide irradiation to the sample, and a controller configured to process image data from the captured images,
wherein the controller is configured to accept inputs related to the objects being tracked, with the inputs comprising at least object shapes, dimensions and characteristics, object types, object identification,
wherein the controller is configured to detect objects or partial objects in the captured images from individual cameras,
wherein the controller is configured to merge or remove duplicate objects across neighbor cameras,
wherein the controller is configured to determine characteristics to reject detected objects not meeting the input object data,
wherein the controller is configured to form bounding boxes and locations for the objects meeting the characteristics of the input object data,
wherein the controller is configured to transform objects in bounding boxes,
wherein the controller is configured to analyze the objects,
wherein the controller is configured to form tracking data including movements of the objects.

*FIG. 17B*

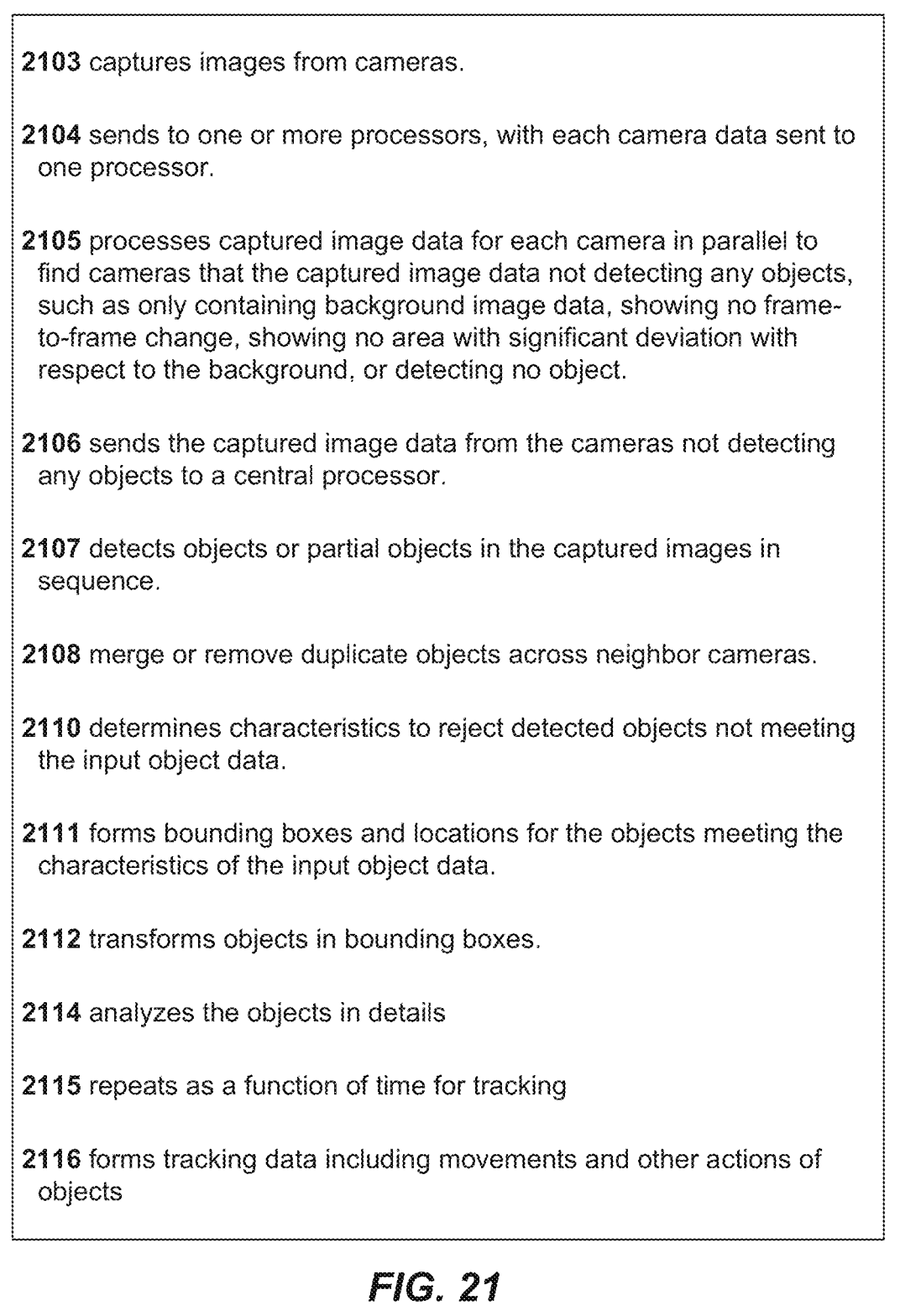

2103 captures images from cameras.

2104 sends to one or more processors, with each camera data sent to one processor.

2105 processes captured image data for each camera in parallel to find cameras that the captured image data not detecting any objects, such as only containing background image data, showing no frame-to-frame change, showing no area with significant deviation with respect to the background, or detecting no object.

2106 sends the captured image data from the cameras not detecting any objects to a central processor.

2107 detects objects or partial objects in the captured images in sequence.

2108 merge or remove duplicate objects across neighbor cameras.

2110 determines characteristics to reject detected objects not meeting the input object data.

2111 forms bounding boxes and locations for the objects meeting the characteristics of the input object data.

2112 transforms objects in bounding boxes.

2114 analyzes the objects in details

2115 repeats as a function of time for tracking

2116 forms tracking data including movements and other actions of objects

*FIG. 21*

Forming an MCAM system for tracking objects in a sample,
wherein the MCAM system comprises multiple cameras configured to capture images of different portions of the sample, one or more light source configured to provide irradiation to the sample, and a controller configured to process image data from the captured images, wherein the multiple cameras are disposed on a board, with each camera coupled to a processor configured to detect absence of objects in the captured images, such as only containing background image data, showing no frame-to-frame change, showing no area with significant deviation with respect to the background, or detecting no object, wherein the processors are coupled to the controller to deliver the captured image data from the camera not detecting the absence of objects in a serial data stream, wherein the processors are disposed on the board, or disposed on a separate element, wherein the processors are configured to be multiple separate components, with each component of the multiple separate components coupled to a camera,
or wherein the processors are configured to be in one or more components, with each component of the one or more components comprising one or more processors of the processors for coupling to one or more cameras,
or wherein the processors configured to be in a single component, with the single component coupled to the multiple cameras, wherein the controller is configured to form tracking data including movements of objects detected from the captured images sent to the controller.

*FIG. 22*

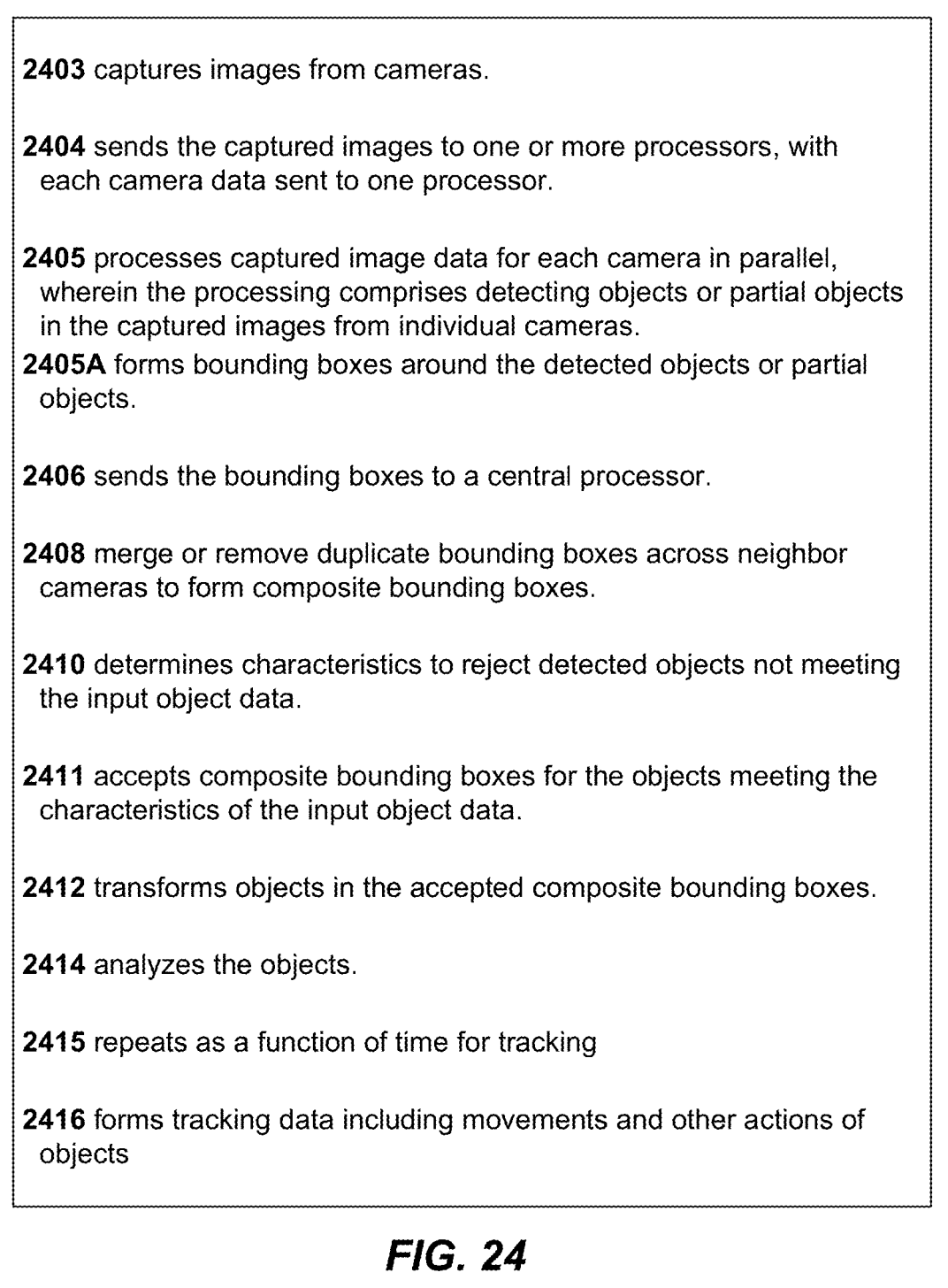

2403 captures images from cameras.

2404 sends the captured images to one or more processors, with each camera data sent to one processor.

2405 processes captured image data for each camera in parallel, wherein the processing comprises detecting objects or partial objects in the captured images from individual cameras.

2405A forms bounding boxes around the detected objects or partial objects.

2406 sends the bounding boxes to a central processor.

2408 merge or remove duplicate bounding boxes across neighbor cameras to form composite bounding boxes.

2410 determines characteristics to reject detected objects not meeting the input object data.

2411 accepts composite bounding boxes for the objects meeting the characteristics of the input object data.

2412 transforms objects in the accepted composite bounding boxes.

2414 analyzes the objects.

2415 repeats as a function of time for tracking

2416 forms tracking data including movements and other actions of objects

*FIG. 24*

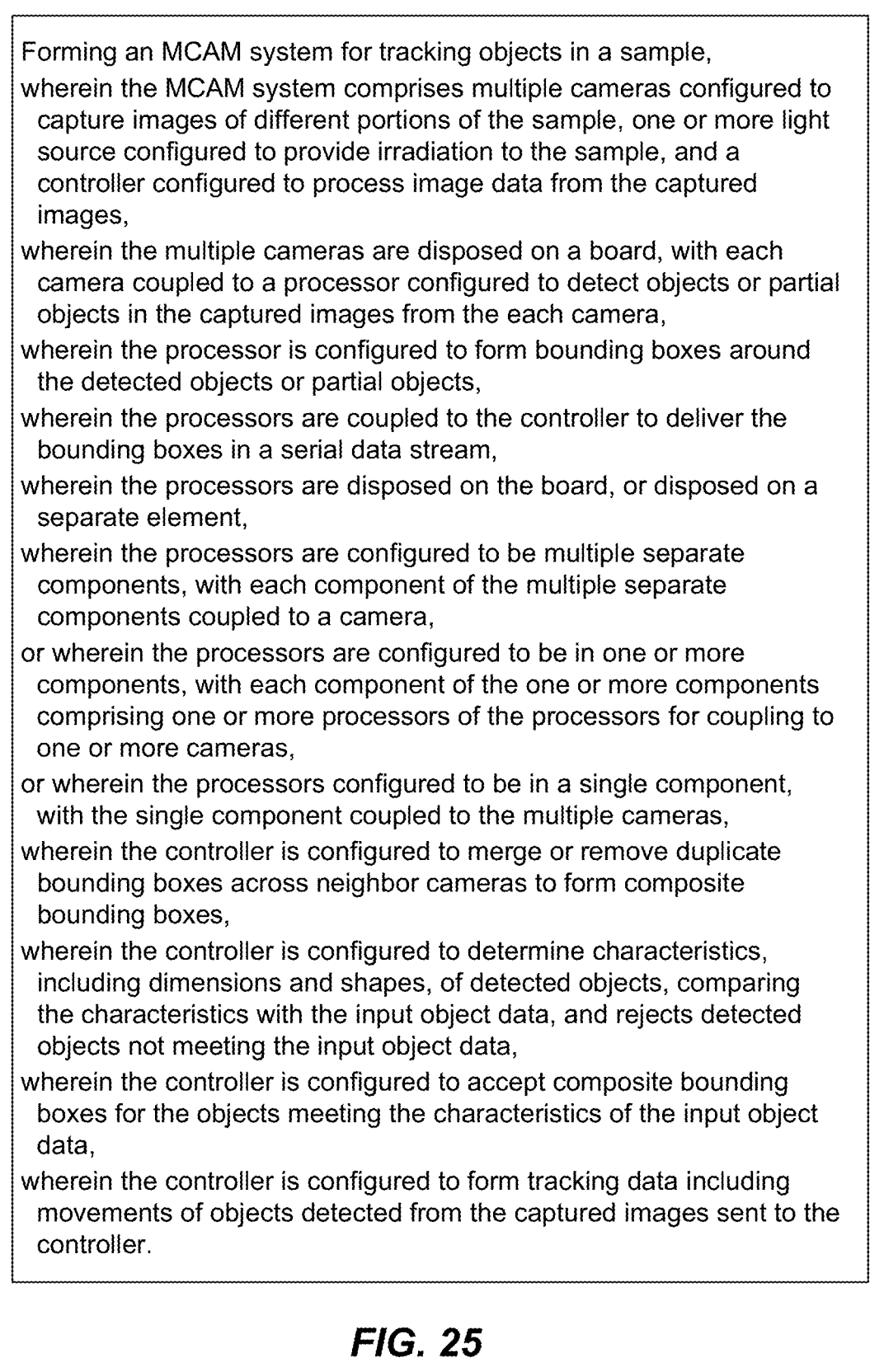

Forming an MCAM system for tracking objects in a sample,
wherein the MCAM system comprises multiple cameras configured to capture images of different portions of the sample, one or more light source configured to provide irradiation to the sample, and a controller configured to process image data from the captured images,
wherein the multiple cameras are disposed on a board, with each camera coupled to a processor configured to detect objects or partial objects in the captured images from the each camera,
wherein the processor is configured to form bounding boxes around the detected objects or partial objects,
wherein the processors are coupled to the controller to deliver the bounding boxes in a serial data stream,
wherein the processors are disposed on the board, or disposed on a separate element,
wherein the processors are configured to be multiple separate components, with each component of the multiple separate components coupled to a camera,
or wherein the processors are configured to be in one or more components, with each component of the one or more components comprising one or more processors of the processors for coupling to one or more cameras,
or wherein the processors configured to be in a single component, with the single component coupled to the multiple cameras,
wherein the controller is configured to merge or remove duplicate bounding boxes across neighbor cameras to form composite bounding boxes,
wherein the controller is configured to determine characteristics, including dimensions and shapes, of detected objects, comparing the characteristics with the input object data, and rejects detected objects not meeting the input object data,
wherein the controller is configured to accept composite bounding boxes for the objects meeting the characteristics of the input object data,
wherein the controller is configured to form tracking data including movements of objects detected from the captured images sent to the controller.

*FIG. 25*

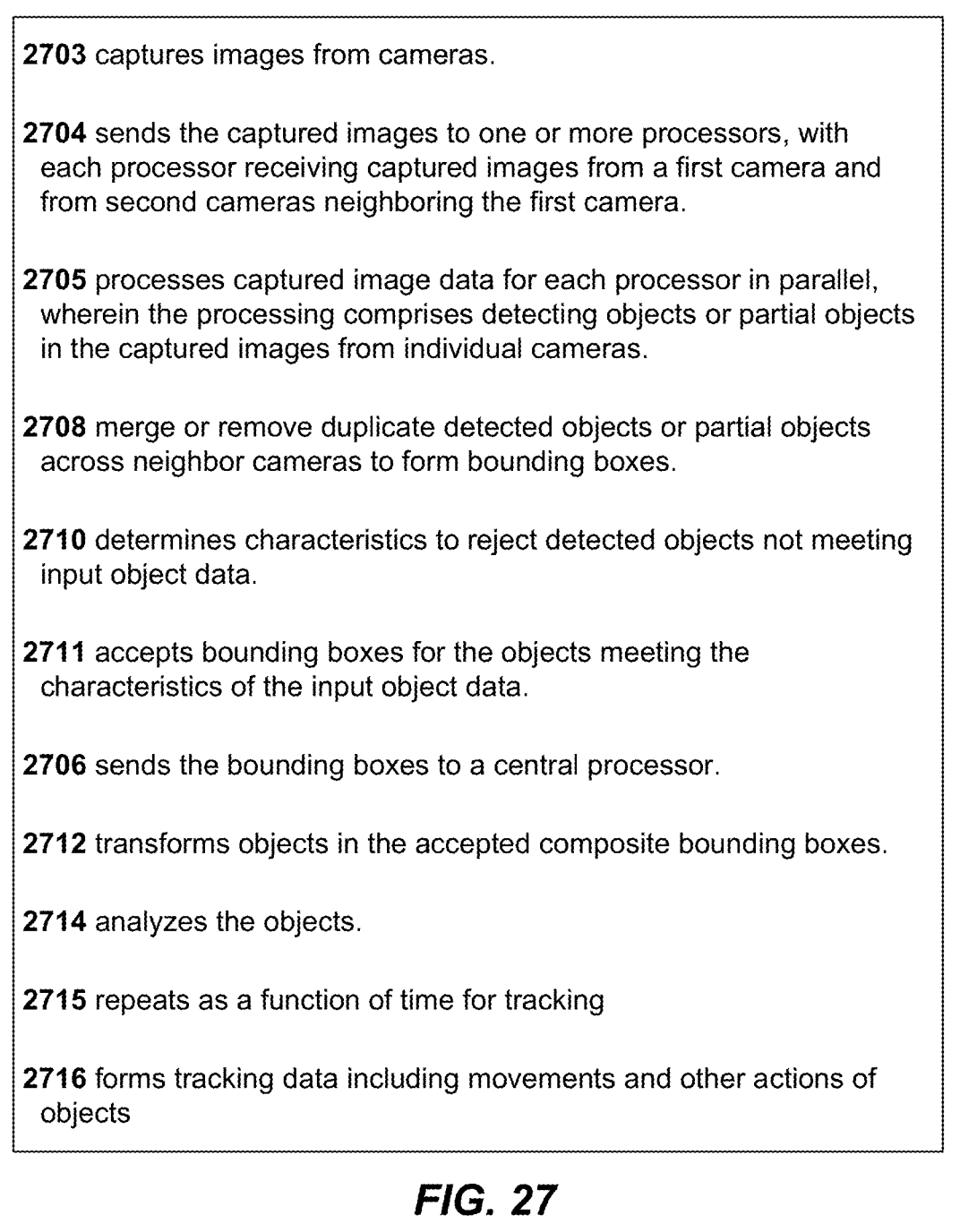

2703 captures images from cameras.

2704 sends the captured images to one or more processors, with each processor receiving captured images from a first camera and from second cameras neighboring the first camera.

2705 processes captured image data for each processor in parallel, wherein the processing comprises detecting objects or partial objects in the captured images from individual cameras.

2708 merge or remove duplicate detected objects or partial objects across neighbor cameras to form bounding boxes.

2710 determines characteristics to reject detected objects not meeting input object data.

2711 accepts bounding boxes for the objects meeting the characteristics of the input object data.

2706 sends the bounding boxes to a central processor.

2712 transforms objects in the accepted composite bounding boxes.

2714 analyzes the objects.

2715 repeats as a function of time for tracking

2716 forms tracking data including movements and other actions of objects

*FIG. 27*

Forming an MCAM system for tracking objects in a sample,
wherein the MCAM system comprises multiple cameras configured to capture images of different portions of the sample, one or more light source configured to provide irradiation to the sample, and a controller configured to process image data from the captured images,
wherein the MCAM system further comprises one or more processors coupled to the multiple cameras, with each processor coupled to a first camera and second cameras neighboring to the first camera,
wherein the each processor configured to detect objects or partial objects in the captured images from the first camera,
wherein the each processor is configured to merge the detected partial objects or remove the objects or the partial objects duplicated with the second cameras,
wherein the each processor is optionally configured to reject objects of the objects or the merged objects not meeting characteristics of input object data, wherein the each processor is configured to form bounding boxes around the non-rejected objects and merged objects,
wherein the processors are coupled to the controller to deliver the bounding boxes in a serial data stream,
wherein the multiple cameras and the one or more processors are disposed on a board, or wherein the multiple cameras are disposed on a board and the one or more processors are disposed on a separate element,
wherein the processors are configured to be multiple separate components, with each component of the multiple separate components coupled to a camera,
or wherein the processors are configured to be in one or more components, with each component of the one or more components comprising one or more processors of the processors for coupling to one or more cameras,
or wherein the processors configured to be in a single component, with the single component coupled to the multiple cameras,
wherein the controller is optionally configured to reject objects of the objects or the merged objects not meeting characteristics of input object data, wherein the controller is configured to form bounding boxes around the non-rejected objects and merged objects,
wherein the controller is configured to form tracking data including movements of objects detected from the captured images sent to the controller.

*FIG. 28*

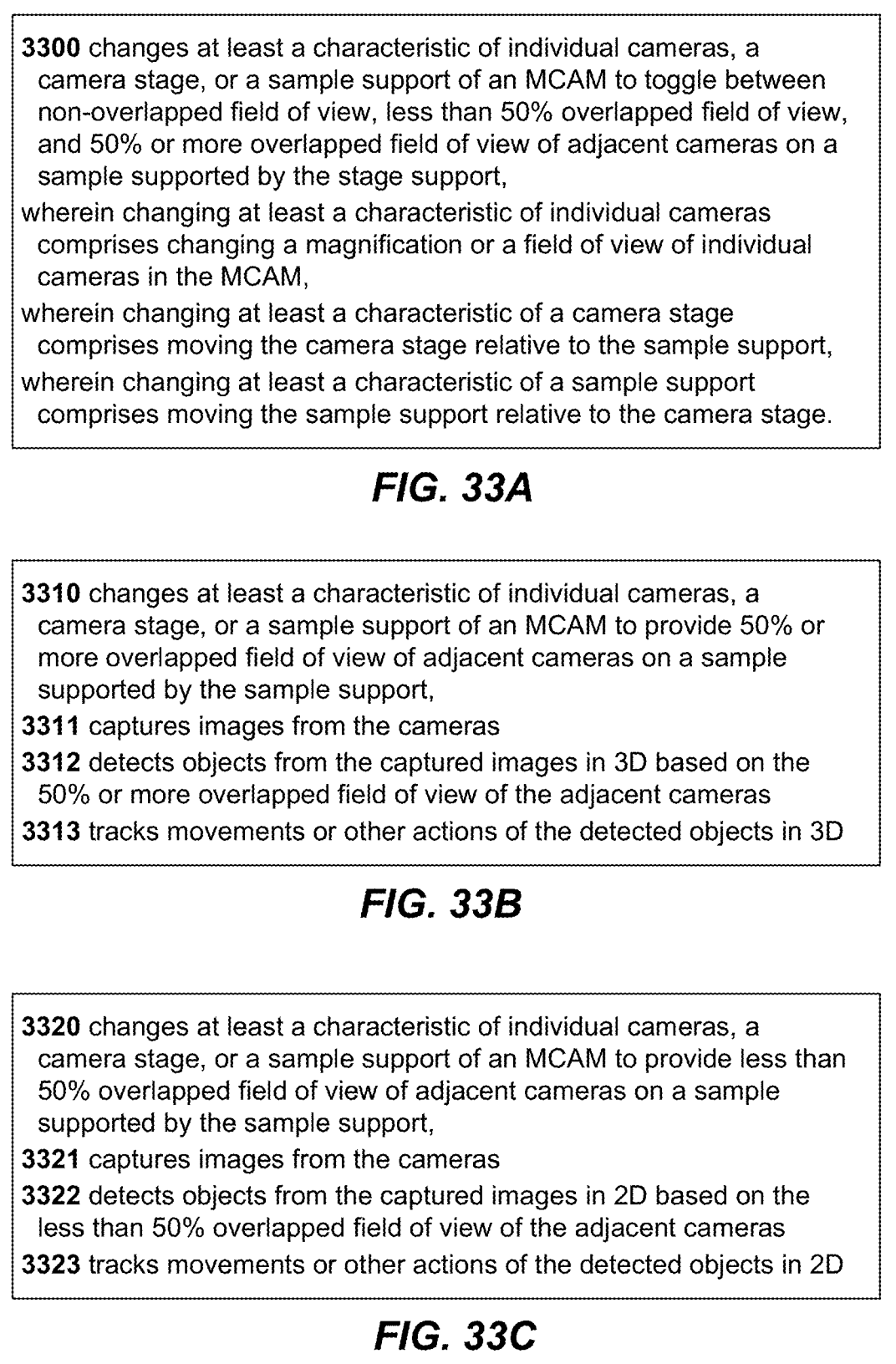

3300 changes at least a characteristic of individual cameras, a camera stage, or a sample support of an MCAM to toggle between non-overlapped field of view, less than 50% overlapped field of view, and 50% or more overlapped field of view of adjacent cameras on a sample supported by the stage support,
wherein changing at least a characteristic of individual cameras comprises changing a magnification or a field of view of individual cameras in the MCAM,
wherein changing at least a characteristic of a camera stage comprises moving the camera stage relative to the sample support,
wherein changing at least a characteristic of a sample support comprises moving the sample support relative to the camera stage.

*FIG. 33A*

3310 changes at least a characteristic of individual cameras, a camera stage, or a sample support of an MCAM to provide 50% or more overlapped field of view of adjacent cameras on a sample supported by the sample support,
3311 captures images from the cameras
3312 detects objects from the captured images in 3D based on the 50% or more overlapped field of view of the adjacent cameras
3313 tracks movements or other actions of the detected objects in 3D

*FIG. 33B*

3320 changes at least a characteristic of individual cameras, a camera stage, or a sample support of an MCAM to provide less than 50% overlapped field of view of adjacent cameras on a sample supported by the sample support,
3321 captures images from the cameras
3322 detects objects from the captured images in 2D based on the less than 50% overlapped field of view of the adjacent cameras
3323 tracks movements or other actions of the detected objects in 2D

*FIG. 33C*

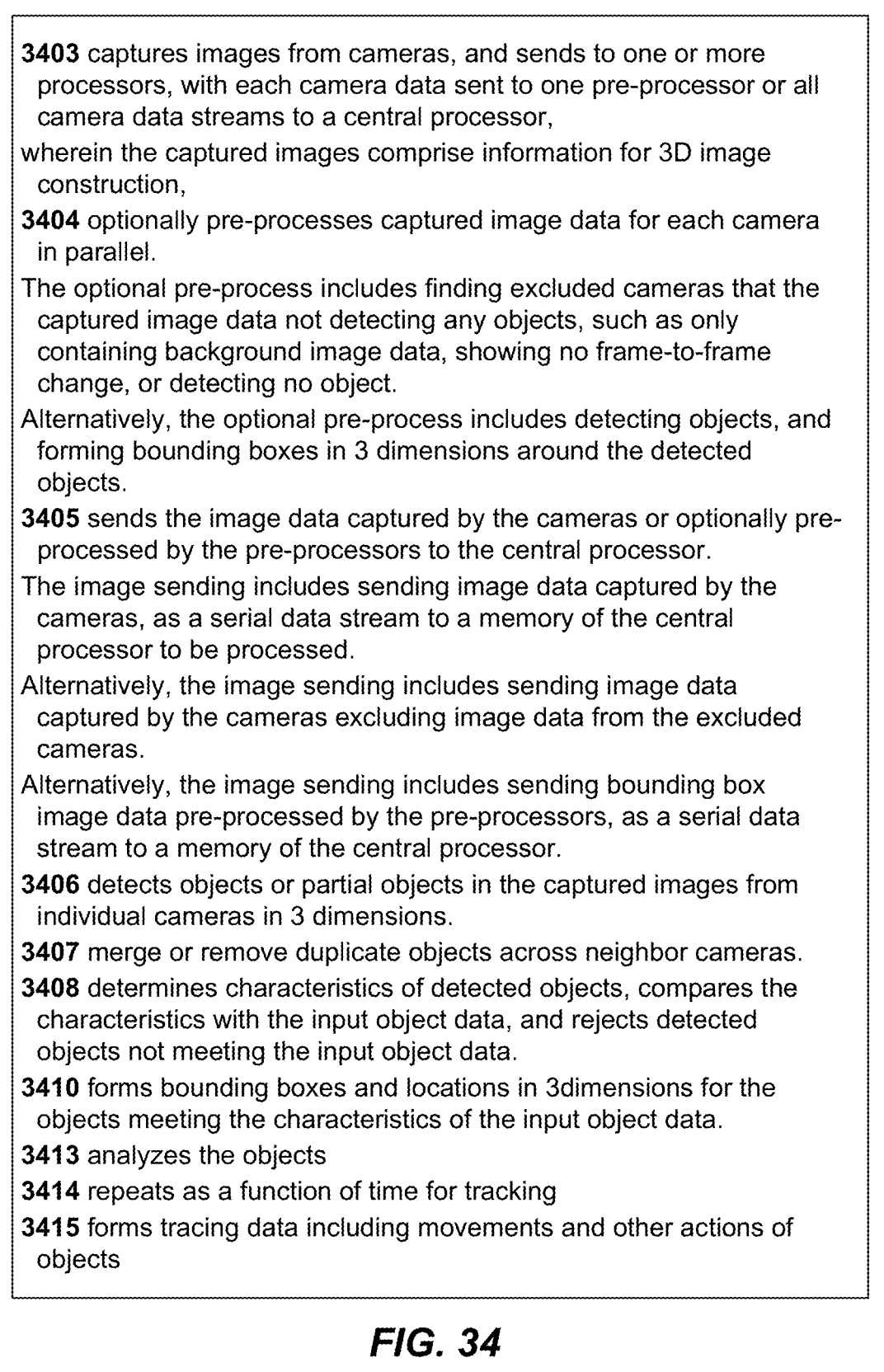

3403 captures images from cameras, and sends to one or more processors, with each camera data sent to one pre-processor or all camera data streams to a central processor, wherein the captured images comprise information for 3D image construction,

3404 optionally pre-processes captured image data for each camera in parallel.

The optional pre-process includes finding excluded cameras that the captured image data not detecting any objects, such as only containing background image data, showing no frame-to-frame change, or detecting no object.

Alternatively, the optional pre-process includes detecting objects, and forming bounding boxes in 3 dimensions around the detected objects.

3405 sends the image data captured by the cameras or optionally pre-processed by the pre-processors to the central processor.

The image sending includes sending image data captured by the cameras, as a serial data stream to a memory of the central processor to be processed.

Alternatively, the image sending includes sending image data captured by the cameras excluding image data from the excluded cameras.

Alternatively, the image sending includes sending bounding box image data pre-processed by the pre-processors, as a serial data stream to a memory of the central processor.

3406 detects objects or partial objects in the captured images from individual cameras in 3 dimensions.

3407 merge or remove duplicate objects across neighbor cameras.

3408 determines characteristics of detected objects, compares the characteristics with the input object data, and rejects detected objects not meeting the input object data.

3410 forms bounding boxes and locations in 3dimensions for the objects meeting the characteristics of the input object data.

3413 analyzes the objects

3414 repeats as a function of time for tracking

3415 forms tracing data including movements and other actions of objects

*FIG. 34*

Forming an MCAM system for tracking objects in a sample, wherein the MCAM system comprises a multiple cameras configured to capture images of different portions of the sample, one or more light sources configured to provide irradiation to the sample, and a controller configured to process image data from the captured images, wherein the multiple cameras are configured so that the captured images comprise information for 3D image construction, such as at least two cameras of the multiple cameras comprise more than 50% overlapping field of view, or the captured images comprise images captured through multiple illumination patterns generated by the one or more light sources, wherein the controller is configured to accept inputs related to the objects being tracked, with the inputs comprising at least object shapes, dimensions and characteristics, object types, object identification, wherein the controller is configured to detect objects or partial objects in the captured images from individual cameras in 3 dimensions, wherein the controller is configured to merge or remove duplicate objects across neighbor cameras, wherein the controller is configured to determine characteristics to reject detected objects not meeting the input object data, wherein the controller is configured to form bounding boxes and locations in 3 dimensions for the objects meeting the characteristics of the input object data, wherein the controller is configured to transform objects in bounding boxes, including centering the objects and translating, rotating, skewing, enlarging, or reducing the objects to conform to a same size and orientation, wherein the controller is configured to analyze the objects, wherein the controller is configured to form tracking data including movements of the objects.

*FIG. 35*

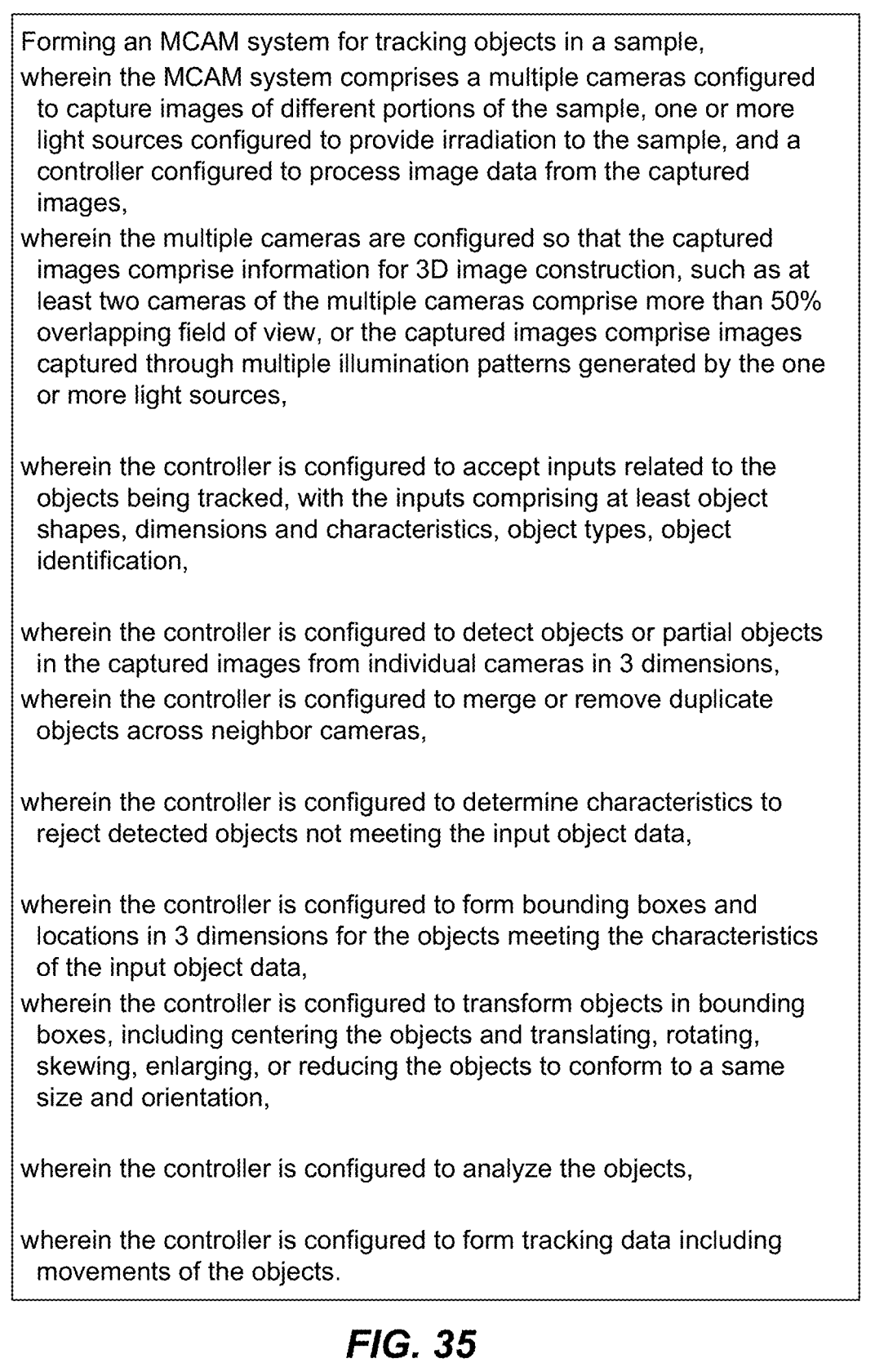

SYSTEM AND METHOD TO SIMULTANEOUSLY TRACK MULTIPLE ORGANISMS AT HIGH RESOLUTION

The present patent applicant claims priority from the U.S. Provisional Patent Application, Ser. No. 63/230,472, filed on Aug. 6, 2021, entitled "System and method to simultaneously track multiple organisms at high resolution", of the same inventors, hereby incorporated by reference in its entirety.

BACKGROUND OF THE INVENTION

In research laboratories that work with small model organisms, microscopic imaging of small living organisms presents special challenges. One challenge is maintaining organisms within the viewing area of the microscope, which is typically quite small for high resolution microscopes (on the order of <1 square centimeter), throughout the duration of an experiment. For example, a standard microscope imaging at 5 μm per pixel resolution typically can observe a field-of-view that is a few square centimeters at most, while a microscope imaging at 1 μm per pixel resolution can observe a field-of-view of several millimeters. This area is typically not sufficient to observe a small model organism, such as a *Drosophila*, zebrafish larvae, medaka, or other invertebrate such as ants, spiders, crickets, or other organisms such as a slime mold, as they freely move in an unconstrained manner. It is also insufficient for observing multiple such organisms interacting. Observing such unconstrained movement and interaction is helpful for improving our understanding of organism behavior, or to observe such behaviors at high resolution, or in neuroscience to study social interaction, or in toxicology and pharmacology, to observe the effect of drugs and toxins on such natural behavior and social interaction.

There are a number of ways in which researchers approach this problem. One way is to sedate the animal while preserving heartbeat and other physiological processes that a researcher might be interested in imaging. Physically constraining the organism (e.g., in agar) is also an option, for example, by embedding the organism in agar or gluing it to a head mount or surface or in general fixing it in place. At such high imaging resolutions, it is possible to apply software to automatically examine heart function, for example. These methods naturally modify the organism behavior and are thus unsuitable for observing natural behaviors during free movement.

Using an imaging setup with a large field of view allows the organisms to move freely within an arena, but there is generally a tradeoff between field-of-view (FOV) and optical resolution, due to the reduced magnification. That is, if a large FOV is captured by a lens, it typically does so at reduced resolution. The tradeoff between resolution and FOV is encapsulated by the space-bandwidth product (SBP) of an imaging system such as a microscope, which is the total number of resolved pixels per snapshot. Standard microscopes typically have a SBP with an upper limit of 50 Megapixels. Despite the loss of resolution, numerous systems have been developed that are able to track the trajectories of multiple organisms simultaneously, but at the cost of not being able to image each of them at high resolution. This includes low-resolution (worse than 25 μm per pixel resolution) tracking of fruit flies, *C. Elegans*, and zebrafish larvae, for example.

Software also exists to enable tracking of organisms such as the zebrafish at low resolution, but typically just the location of the low-resolution organism, as enabled by a few related current products that image at low-resolution. This type of software has been included in several patents. For example, software exists to examine specific morphological features of zebrafish and to store this data, and to compare such image data to standard template images to gain insight. Software also exists to estimate position and velocity from video recordings at 8 frames per second, or to record the 3D position of organisms, such as fish. There are also systems that use two cameras to image zebrafish constrained in capillary tubes, and to image organisms such as rodents who are physically tagged. There have also been devices suggested that use two cameras to jointly image bright-field and fluorescence images. Alternatively, systems have used projected light patterns to assist with calculating physical quantities about moving organisms such as fish.

If the experiment calls for both high optical resolution and the need for allowing organisms to move freely in an arena, many researchers turn to tracking technologies in order to keep the target organism within view of the imaging unit. This often requires elaborate mechanical contraptions that either move the optical components or the sample itself in response to the motion of the organism. A major disadvantage that these mechanical-based tracking systems face is that they can only track one organism at a time, in virtue of the fact that different organisms at any given time can be in different locations and moving in different directions. Therefore, there are many potential model organism assays that are very difficult, if not impossible, to carry out with current technologies. There is a need for a microscope system that is able to track and image, simultaneously, multiple unconstrained organisms over a large arena at high optical resolution, and we present that technology here.

To address this problem, the present invention present a method for organism tracking that operates across many micro-cameras that are tiled together to image a large field-of-view in parallel. The micro-camera array microscope (MCAM) breaks the standard tradeoff between resolution and field-of-view to simultaneously obtain 5-20 μm per pixel image resolution over a 100 cm2 (or more) field-of-view. In other words, it offers a SBP of hundreds to thousands of megapixels (i.e., gigapixel SBP), which unlocks the ability to record video of multiple freely moving organisms at high resolution and thus track their individual behaviors within an optical system that includes no scanning or moving parts. Unlike other existing microscope tracking methods, our technology 1) works across many individual microscopes in parallel and 2) is optimized to automatically process and effectively compress (in a lossless manner) large amounts of image and video data.

There are also prior technologies to track objects from image data outside of the microscopic world. For example, pedestrians are commonly tracked across multiple security cameras, or across multiple cameras in autonomous vehicles. A few patents describing such tracking methods. This current invention differs from such existing technologies in several key regards: 1) as a microscope tracking technology, it can accurately track moving objects, such as living organisms, in all 3 dimensions, 2) the on-microscope processor and computer are located near one another, allowing for data transmission at significantly higher speeds than alternative technologies, 3) tracking software is unique for microscopic imaging cases, given that the scenes are well-controlled (i.e., with minimal clutter and the user can select what the sample and background are) and defocus must be accounted for, and 4) the desired output from microscope tracking (e.g., of model organisms for drug discovery experiments) is generally different than with cameras (e.g., to enable cars to avoid humans), and thus the processing pipeline is quite unique.

SUMMARY OF THE EMBODIMENTS

In some embodiments, the present invention discloses a multi-aperture microscope technology that offers the ability to track in real-time and image multiple independent small model organisms over a large area. The technology includes an organized array of micro-cameras which, together, capture image data of a group of organisms distributed over a wide arena. A first processor (e.g., in the form of a field-programmable gate array (FPGA)) aggregates and streams video data from all micro-cameras simultaneously to a second processor (e.g., within a nearby desktop computer). It is then possible to run an organism tracking algorithm, which is able to compute per-organism position coordinates, produce cropped video footage of each organism, and automatically measure key morphological statistics for each organism in the imaging area. These computational methods can be distributed across the first processor and the second processor. The technology can conduct small animal tracking and imaging with no moving parts and is immune to the performance tradeoffs faced by other microscope technologies developed so far.

The multi-aperture microscope technology can also be used fir 3D tracking of organisms, with a depth limited by a thickness of the sample. The presence of the multiple cameras capturing images from the sample, configured with 50% or more overlap, can allow the 3D tracking of the organisms through photogrammetry.

BRIEF DESCRIPTION OF THE DRAWINGS

FIG. 7 illustrates a method for operating an MCAM for object tracking according to some embodiments.

FIG. 8 illustrates a process for forming an MCAM system for object tracking according to some embodiments.

FIGS. 17A-17B illustrate methods and systems for an MCAM having a central processor according to some embodiments.

FIG. 21 illustrates a method for operating an MCAM for object tracking according to some embodiments.

FIG. 22 illustrates a process for forming an MCAM system for object tracking according to some embodiments.

FIG. 24 illustrates a method for operating an MCAM for object tracking according to some embodiments.

FIG. 25 illustrates a process for forming an MCAM system for object tracking according to some embodiments.

FIG. 27 illustrates a method for operating an MCAM for object tracking according to some embodiments.

FIG. 28 illustrates a process for forming an MCAM system for object tracking according to some embodiments.

FIGS. 33A-33C illustrate toggle processes for an MCAM for object tracking according to some embodiments.

FIG. 34 illustrates a method for operating an MCAM for object tracking according to some embodiments.

FIG. 35 illustrates a process for forming an MCAM system for object tracking according to some embodiments.

DETAILED DESCRIPTION OF THE EMBODIMENTS

Figure 1:
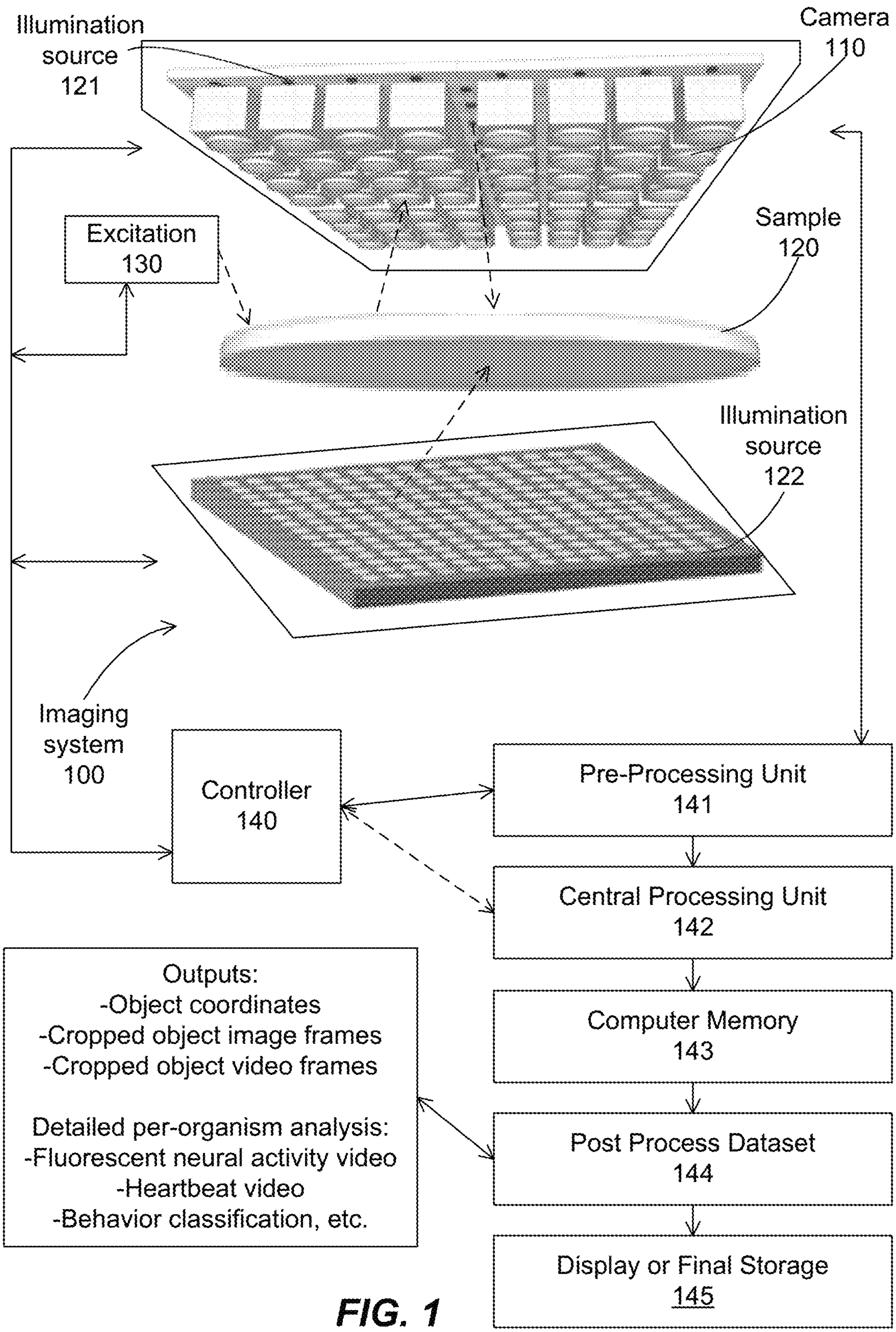
FIG. 1 illustrates a schematic of an MCAM system according to some embodiments.

In some embodiments, the present invention discloses systems and methods to track freely moving objects, such as model organisms, over a large imaging area and at high spatial resolution in real-time, while also jointly providing high-resolution video and automated morphological analysis on a per-organism level. The system is based upon an imaging hardware unit, computational hardware, and jointly designed software.

In some embodiments, the present invention discloses a microscope technology that offers the ability to track in real-time and image multiple independent small model organisms over a large area. The technology can conduct small animal tracking and imaging with no moving parts and is immune to the performance tradeoffs faced by other microscope technologies developed so far.

The microscope can include multiple cameras, such as micro cameras, e.g., cameras having small form factor arranged in an array. The cameras in the microscope can be organized in an array that can capture images of a group of organisms distributed over a wide arena, e.g., on or in a sample.

The cameras can be configured to have overlapped fields of view on the sample, which can allow stitching the images across neighbor cameras for a seamless view of the sample. The overlapped fields of view between adjacent cameras can be less than or equal to 50%, e.g., there are areas on the sample that can be imaged only by the middle cameras and not by the neighbor cameras. The overlapped fields of view can be 5%, 10%, 20%, 30%, or 40%.

The cameras can be configured to have 50% or more overlapped fields of view on the sample, which can allow sample depth analysis, in addition to the stitching ability, for example, through a photogrammetry process such as photometric stereo. For 50% or more overlapped fields of view, all areas on the sample can be imaged by at least two cameras, which can allow the depth analysis of organisms detected in the images, for example, through image disparity between the captured images for a same feature.

The microscope can include one or more light sources, which can be disposed above the sample, below the sample, or both above and below the sample. The light sources can be configured to provide one or more illumination patterns to the sample. For example, the light sources can be configured to provide bright field images or dark field images to the cameras. The multiple illumination patterns can also allow depth analysis through multiple images captured by a same camera by under multiple illumination patterns.

The microscope can include one or more moving mechanisms configured to move the individual cameras, the camera array, the light sources, or the sample. For example, each camera can have a sensor adjustment mechanism configured to move the image sensor of the camera, an optical lens adjustment mechanism configured to move the optical lens of the camera, an objective lens adjustment mechanism configured to move the objective lens of the camera, and a camera adjustment mechanism configured to move the camera. The camera array can be coupled to a stage moving mechanism configured to move the camera array with respect to the sample. The sample can be disposed on a sample support, which can be coupled to a support moving mechanism configured to move the sample support in one or more directions, such as in a direction toward or away from the cameras, or in directions parallel to the sample for repositioning the sample under the cameras, such as for scanning the sample.

The microscope can include one or more excitation sources configured to affect the organisms in the sample, such as to provide excitation or disturbance to the organisms. The excitation sources can generate a local or a global disturbance, e.g., providing a disturbance limited to a small area of the sample or a disturbance applicable to the whole sample. The disturbance can be continuous or pulsed, and can be include periodic pulses or one or more discrete pulses.

The excitation sources can generate an acoustic signal, e.g., a sound or ultrasound, a radiation signal, e.g., a visible light, an IR light, a UV light, or a polarized light, a radiation pattern, e.g., an image generated from an LCD screen, a vibration signal that can vibrate the whole sample or only one or more local areas of the sample, an injector that can inject a stimulant such as a chemical or a radiation excitation component, e.g., a fluorescent excitation source, to the sample, an olfactory signal, or a manipulator for generate a mechanical disturbance or stimulant to the sample.

The microscope can include one or more processors configured to process the data from the images captured by the cameras. For example, the processors can be configured to run an organism tracking algorithm, which is able to compute per-organism position coordinates, produce cropped video footage of each organism, and automatically measure key morphological statistics for each organism in the imaging area. The computational process can be performed on a main processor, or can be distributed across multiple processors.

The processors can include only a main processor, which can be configured to accept image data from the cameras, such as configured to serially accept the multiple parallel image data streams from the multiple cameras. The processors can include a pre-processor, such as a Field Programmable Gate Array (FPGA), in addition to the main processor. The pre-processor can be configured to accept the multiple parallel image streams from the cameras, parallely process the multiple image streams, and then serially send to the main processor for additional analysis. The processors can include multiple pre-processors, with each pre-processor coupled to a camera output for pre-processing the camera image data right after capturing the image. Outputs from the multiple processors can be sent serially to the main processor, for additional analysis. The conversion of multiple parallel data streams to a serial data stream can be performed by electronic devices, such as by an FPGA, which can aggregate and stream video data from all cameras or from all pre-processors coupled to the cameras simultaneously to the main processor, which can be a processor of a data processing system such as a nearby desktop computer.

The microscope can include a controller configured to control the cameras, the light sources, the excitation sources, and the moving mechanisms, for example, to set the image parameters for the cameras, the radiation parameters for the light sources, and the excitation parameters for the excitation sources. The controller can be configured to control the moving mechanisms for moving the cameras or the sample support, for example, to change the amount of the overlapped field of view between adjacent cameras. The controller can also be configured to accept inputs, such as external inputs from an operator or from a memory device, to provide camera parameters such as distances between cameras or the magnification of the cameras, light parameters such as the wavelengths of the light sources or the locations of the light sources with respect to the cameras, sample support parameters such as positions of the sample support relative to the cameras and the light sources. The controller can also be configured to accept inputs related to the organisms to be tracked, such as sizes and shapes of the organisms or possible types and identification of the organisms.

In some embodiments, "controller", "processor", and "pre-processor" are electronic devices, and can be used interchangeably in the specification, with the distinction between these components based on the context. For example, pre-processor and processor can be the same device type, with a difference being the positions of the pre-processor, e.g., the pre-processor is configured to process data before sending to the processor for processing. An electronic device can be configured to function as a controller or a processor, e.g., a controller can be used to control devices, such as cameras, and at a same time, can be used to process data. A processor can be used to process data, and at a same time, can be used to control devices, such as cameras.

Thus, a controller can be a processor or a pre-processor, a processor can be a pre-processor or a controller, and a pre-processor can be a controller or a processor.

Unique properties of this tracking system include its ability to enable measurement of unconstrained small model organisms by imaging their behavior, morphological properties and biochemical variations at high resolution, in real-time, over a large field of view, and with no moving parts. The array of micro-cameras affords this technology multiple advantages over other tracking systems. Firstly, it expands the field of view of the system without sacrificing resolution. Second, it enables the tracking of multiple organisms simultaneously, which other mechanical based tracking technologies generally cannot achieve. Third, it allows for full field of view imaging at full optical resolution but at low frame rates where the target organisms and their surroundings are recorded as well as targeted imaging where only the tracked organisms are visible and much higher acquisition frame-rates can be achieved. These features allow for a high level of versatility that enables a wide range of research and commercial applications.

There are a multitude of applications which the tracking technology presented here enables or can advance in the future. One such application is studying neural correlates of behavior in small model organisms moving naturally and freely within a standard petri dish or other media that are larger than the field of view of a typical micrometer resolution microscope. Example model organisms that can be tracked include the zebrafish larvae, *Drosophila* (fruit fly), *C. Elegan*, ants and other small invertebrate, small fish such as the *Danionella Translucida* and *Medaka* (*Oryzias latipes*), and small rodents such as mice and rats. Observing and quantifying group dynamics of small model organisms is made possible by this technology, with the added advantage of being able to image at high resolution and high frame-rate. Furthermore, being able to track and crop to target organisms can significantly reduce the volume of data that is acquired as all the extraneous image data of the peripheral surroundings can be left out early in the video acquisition pipeline.

Micro-Camera Array Microscope (MCAM) System

In some embodiments, the present invention discloses a system having parallel image data acquisition, e.g., cameras, across an array of multiple separate image sensors and associated lenses, which can allow the image acquisition of a large sample, limited by the number of cameras in the camera array. The cameras can be micro cameras having small form factors assembled on a camera board, with data transfer cable coupled to a nearby computer system. With the small size and short transfer cable, fast data acquisition for large sample can be achieved.

In some embodiments, the system having parallel image data acquisition can include a computational microscope system of a micro-camera array microscope (MCAM) system. Details about the MCAM system can be found in patent application Ser. No. 16/066,065, filed on Jun. 26, 2018; and in patent application Ser. No. 17/092,177, filed on Nov. 6, 2020, entitled “Methods to detect image features from variably-illuminated images”; hereby incorporated by reference in their entirety, and briefly described below.

FIG. 1 illustrates a schematic of an MCAM system according to some embodiments. In general, the MCAM system can be viewed as an integration of multiple individual microscopes tiled together in an array to image a large sample. Each individual microscope can be configured into a micro camera package, e.g., a camera having a small form factor with minimum components, such as without a cover or extra peripheral elements. The integration of the micro camera packages can form a tightly packed array of micro-cameras with high resolution (1-10 μm) over a large area (hundreds of square centimeters). The images or video taken from the individual micro cameras, which include overlapped or non overlapped image patches of a sample 120, can be assembled together to form the image of the sample. The MCAM system can offer size, weight, complexity, and cost advantages with respect to standard microscopes. The MCAM system may not require any moving parts, and its micro-cameras fit within a compact space without requiring a rigid support structure and can thus operate within a small, confined space.

The MCAM system 100 can include multiple cameras 110, which can form a camera array, and one or more illumination sources disposed above 121 and below 122 for microscopic imaging. The light sources can be visible light sources, infrared light sources, ultraviolet light sources, fluorescent light sources, or polarized light sources, such as light emitting diodes (LEDs) or lasers with appropriate wavelengths and filters. The illumination system can be placed below 122 or above 121 the sample, to provide transmissive or reflective light to the micro cameras.

The MCAM system can use multiple micro-cameras 110 to capture light from multiple sample areas, with each micro camera capturing light from a sample area onto a digital image sensor, such as a charged coupled device (CCD), complementary metal-oxide semiconductor (CMOS) pixel array, or single-photon avalanche diode (SPAD) array.

In some embodiments, the illumination system can provide the sample with different illumination configurations, which can allow the micro cameras to capture images of the sample with light incident upon the sample at different angles, spatial patterns, and wavelengths. The illumination angle and wavelength are important degrees of freedom that impacts specimen feature appearance. For example, by slightly changing the incident illumination angle, a standard image can be converted from a bright field image into a phase-contrast-type image or a dark field image, where the intensity relationship between the specimen and background is completely reversed. The illumination system thus can be controlled to provide an optimum illumination pattern to the sample.

Alternatively, by providing the sample with different illumination light angles, spatial patterns, and wavelengths, both intensity and phase information of the imaged optical field can be recorded, which can allow the reconstruction of an image, for example, with more information or higher resolution, such as a measure of sample depth, spectral (e.g., color) properties, or the optical phase at the sample plane.

In some embodiments, the MCAM system can include one or more excitation sources 130, which can be configured to provide excitation energy to the sample, e.g., to disturb the organisms in the sample. The excitation sources can be local, e.g., the excitation energy is confined to one or more areas of the sample. The excitation sources can be global, e.g., the excitation energy is provided to the whole sample, e.g., to all areas of the sample. The excitation energy can be provided continuously, or in separate pulses. The pulses can be periodic, or can include burst of energy pulses. The excitation sources can include an acoustic signal, a radiation signal, a radiation pattern, a vibration signal, an injector that can inject a stimulant such as a chemical or a radiation excitation component, an olfactory signal, or a manipulator for generate a mechanical disturbance or stimulant to the sample.

The MCAM system 100 can include a controller 140 for controlling the cameras 110, the illumination sources 121 and 122, the excitation sources 130, and for processing the images. For example, the controller 140 can include a central processing unit or processor 142, which can couple to camera and light controllers for controlling the cameras units, such as to tell the cameras when to capture images, and for controlling the illumination sources, such as to tell the illumination sources when to be activated and what illumination sources to be activated. The central processing unit 142 can be coupled with the camera units to obtain the image data captured by the camera units. The data can be stored in memory 143, can be processed by the central processing unit to be stored in a post processing dataset 155, and can be displayed on a display 145 or to send to a final storage. The controller can optionally include a pre-processing unit or pre-processor 141, e.g., another processing unit or another processor, in addition to the central processing unit, for processing the image data from the cameras before sending to the central processing unit.

The post process data set 144 can include the coordinates of the objects or organisms detected in the sample, image frames of the objects cropped to contain only the objects, cropped object image video, and other information. The post process data set 144 can also include detailed per-organism analysis, such as fluorescent neural activity video, heartbeat video, behavior classification, and other information.

Figure 2A:
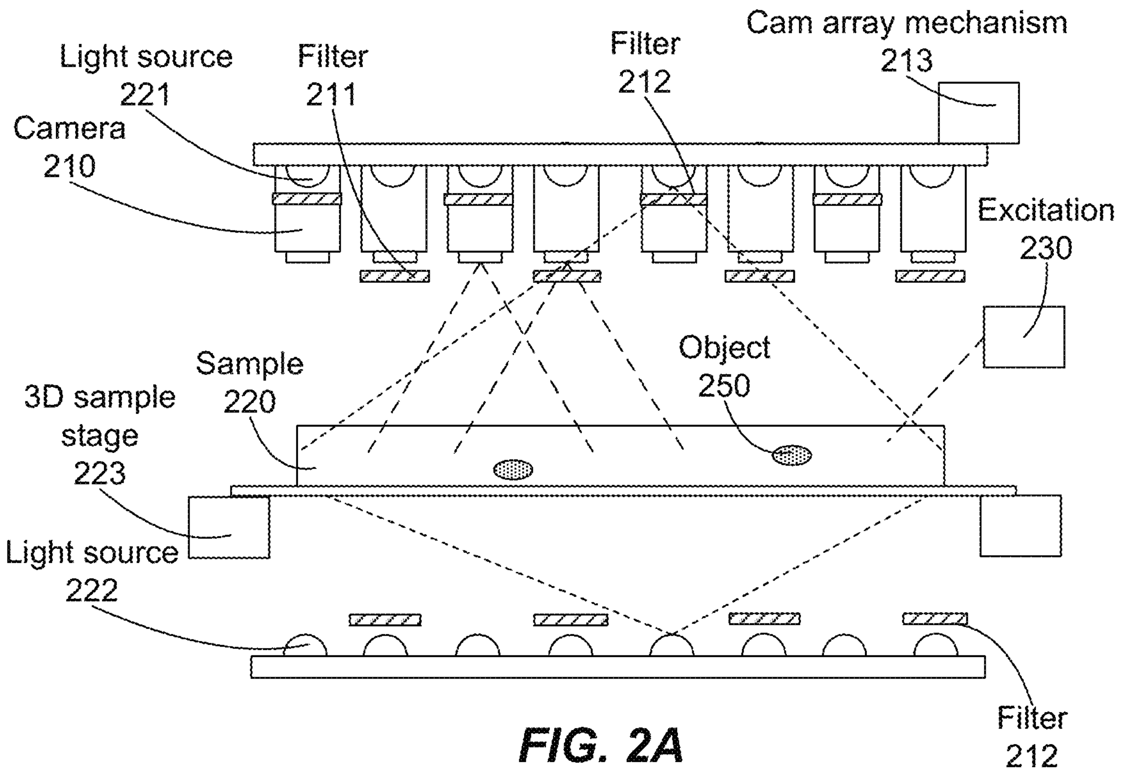
FIGS. 2A-2B illustrate configurations for an MCAM according to some embodiments.
Figure 2B:
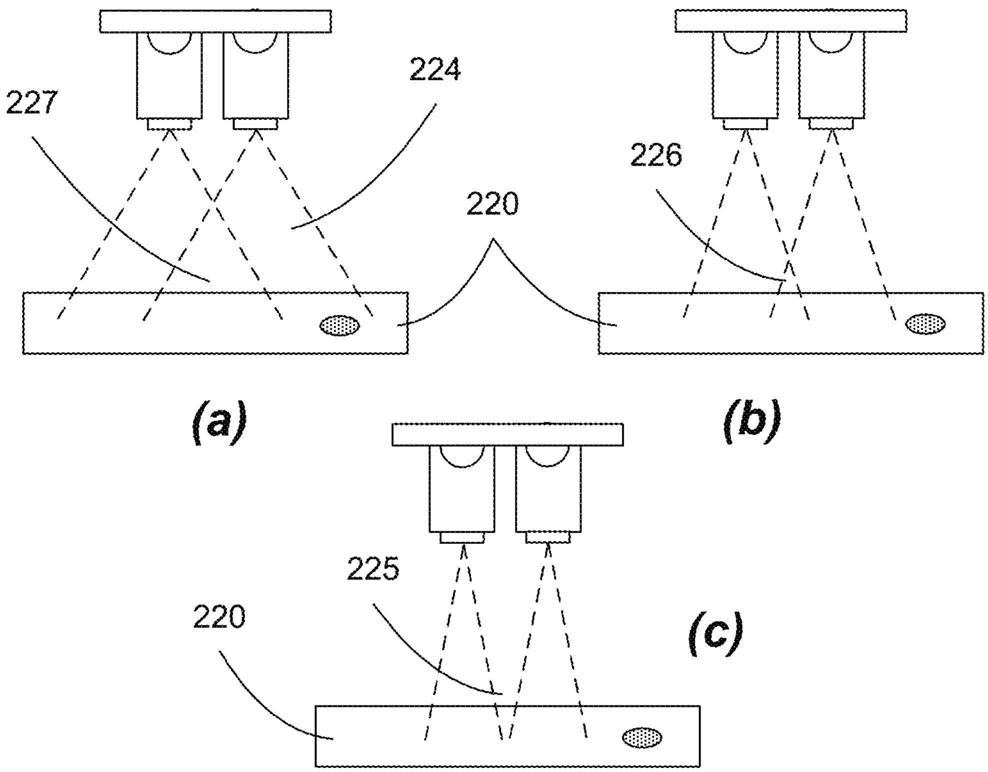

FIGS. 2A-2B illustrate configurations for an MCAM according to some embodiments. FIG. 2A shows a cross section view of an MCAM having multiple cameras 210 and one or more light sources 221 and/or 222 to illuminate a sample 220. The cameras and the light sources can be configured with or without filters, such as fluorescent filters or polarized filters. For example, as shown, alternate cameras and light sources have filters 211 and 212. The filters for the cameras can change the characteristics of the captured light, so that the images captured by the cameras can have the specific property of the filters. For example, a fluorescent filter can allow the cameras to capture fluorescent signal emitted from the sample. A polarized filter, such as a circular polarized filter, can allow the cameras to capture circular-polarized light.

The filters for the light sources can change the characteristics of the emitted light, so that the sample can have the specific light property provided by the filters. For example, a fluorescent filter can allow the light sources to emit fluorescent excitation energy to the sample, causing the organisms in the sample to respond and emit fluorescent signals. A polarized filter, such as a circular polarized filter, can allow the light sources to emit circular-polarized light.

The MCAM system can include excitation sources 230 for exciting objects or organisms 250 in the sample. The excitation sources can be separate excitation sources, or can be incorporated into the light sources, for example, by filters 212, such as polarized filters or fluorescent excitation filter.

The MCAM system can include moving mechanisms configured to move the cameras or the sample. A moving mechanism 213 can be coupled to the camera array to move the camera array relative to the sample, such as toward or away from the sample. Another moving mechanism 223 can be coupled to a sample support to move the sample relative to the cameras, such as toward or away from the cameras. The moving mechanism 223 can also be configured to move the sample support in a lateral direction, for example, for scanning the sample. For example, the specimen can also be placed on a 3D motorized stage, whose position can be controlled via software on the computer to bring the specimen into appropriate focus and lateral position.

FIGS. 2B(a)-2B(c) show different configurations of two adjacent cameras with respect to overlapping fields of view. FIG. 2A(a) shows a configuration for more than 50% overlapped FOV. FIG. 2A(b) shows a configuration for less than 50% overlapped FOV. FIG. 2A(c) shows a configuration for non overlapped FOV. Each camera has a field of view 224, which can depend on the camera magnification and the distance to the sample 220. Each camera can focus on a sample area, with non-overlapping area 225 or overlapping areas 226 or 227 with a nearby camera.

In some embodiments, the field of views of the cameras can be adjusted to vary the overlapping area, such as between non overlapping FOV, less than 50% overlapping FOV, and more than 50% FOV. The adjustment can be performed by changing the magnification of the cameras or the focus distance to the sample areas.

The FOV of the cameras can be non overlapped, for example, to observe samples with discrete areas such as well plates. The FOV of the cameras can overlap 50% or less in one or two lateral directions, such as x and y directions, such that less than half of the points on the object plane for one camera are also captured by one or more other cameras in the array. This permits stitching of the images to form a complete representation of the sample.

The FOV of the cameras can overlap 50% or more in one or two lateral directions, such that less than half of the points on the object plane for one camera are also captured by one or more other cameras in the array. This permits depth calculation for the objects positions, for example, through photogrammetry or photostereo.

Figure 3A:
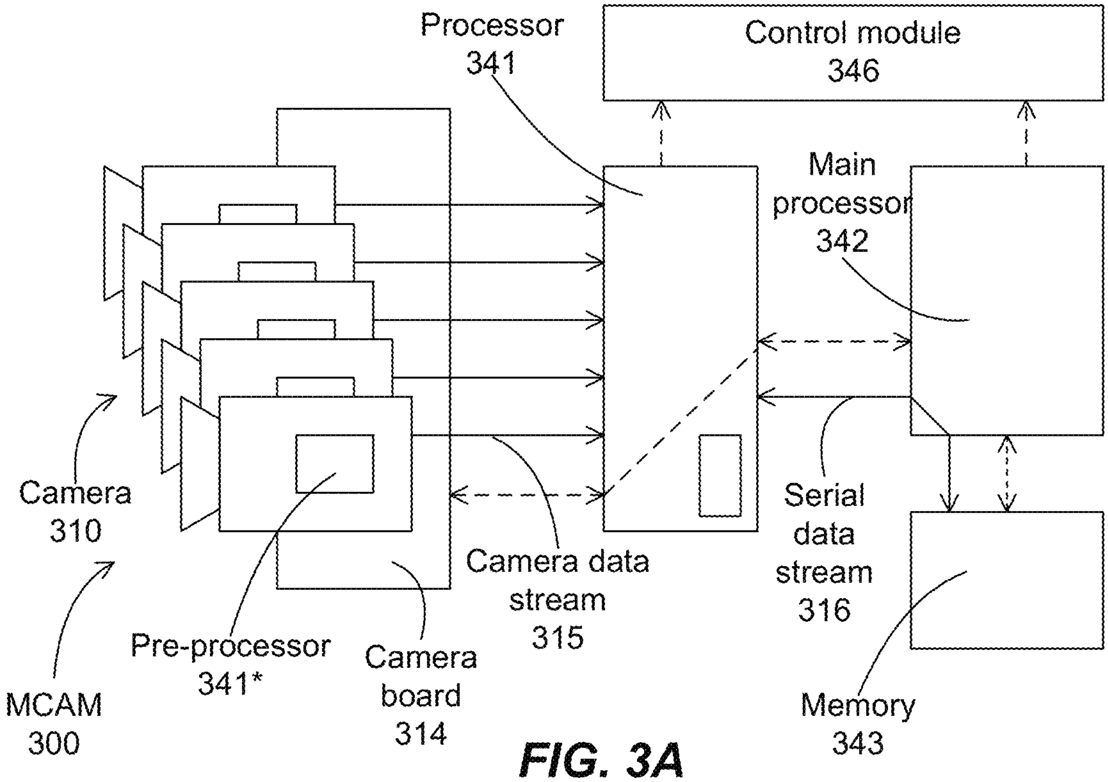
FIGS. 3A-3B illustrate schematic configurations for an MCAM according to some embodiments.
Figure 3B:
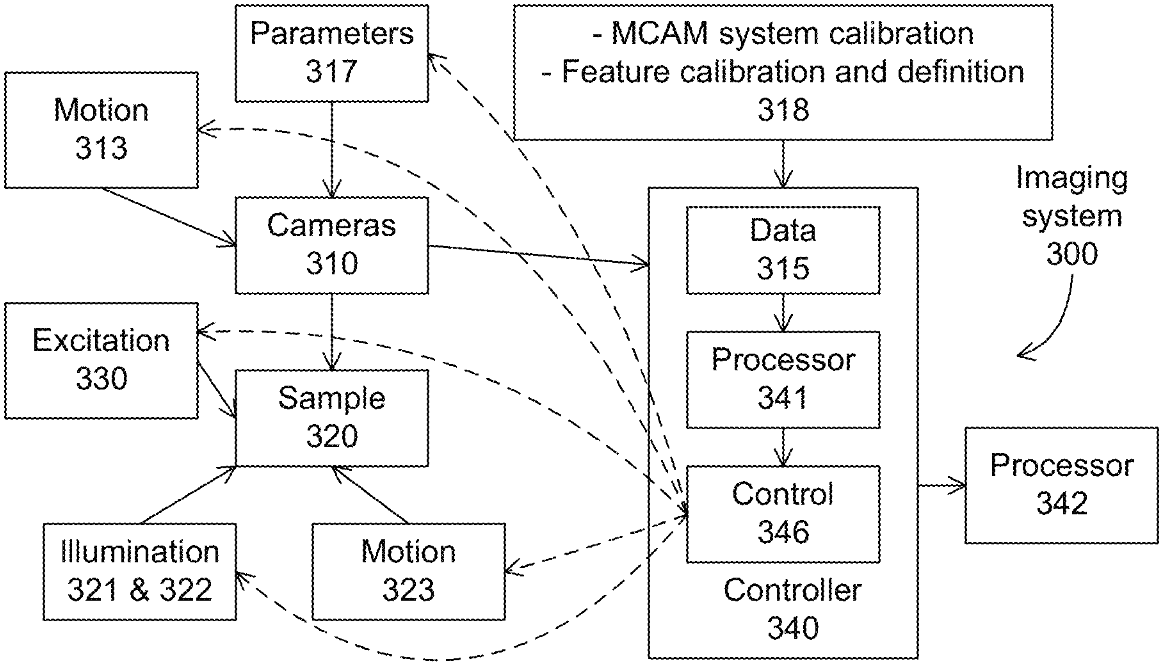

FIGS. 3A-3B illustrate schematic configurations for an MCAM according to some embodiments. An MCAM imaging system can be used to record video of a sample of interest across a wide FOV and at high resolution. MCAM video is created by recording multiple image snapshots in sequence from one or more micro-cameras within the array.

FIG. 3A shows an MCAM microscope system 300 having a camera array 310, which includes multiple camera units. The camera array can have a common clock generator to reduce timing variations between cameras. The cameras can have optional preprocess modules 341, which can be configured to preprocess the image data when reading from the image sensors of the cameras. The preprocess modules can perform simple or complex image processing, such as a quick detection of frame to frame variation or an object detection. The original or preprocessed image data can be sent, in multiple parallel data streams 315, to another optional process module 341, which is configured to organize the image data.

The process module 341 can be an FPGA based module (e.g., a module containing a processing chipset, such as an FPGA, or other chipset of an ASIC, an ASSP, or a SOC), which can be configured to receive image data from the multiple camera units, e.g., through data streams 315. The FPGA based module 341 can include a shallow buffer, for example, to store incoming data from the data streams 315. The FPGA based module can be configured to send sensor configuration data to the camera array, for example, to provide image parameters to the image sensors of the camera units. The sensor configuration can be received from a computational unit having a processor 342 and a memory 343. For example, the processor can send configuration and settings to the FPGA based module, with the configuration and settings including setting information for the FPGA based module and the configurations for the image sensors.

The FPGA based module can communicate 316 with the computational unit using direct memory access (DMA) to pass data directly to the memory 343, through a high speed link such as PCIe. The FPGA based module can communicate with a control module, which can be configured to control lighting, motion, and sample handling for the microscope system. The computational unit 342 can also communicate directly to the control module. The computational unit 342 can communicate with a storage or network devices (not shown). The system can include peripheral devices, such as stages, illumination units, or other equipment involved in the apparatus necessary to ensure adequate imaging conditions.

FIG. 3B shows a block diagram of an imaging system 300, such as an MCAM system, modified for organism detection and tracking. The imaging system can include a camera array 310 and an illumination source 321 and 322, which are controlled by one or more controllers, such as a camera controller, an illumination controller, and a system controller.

An imaging system can include an array of cameras 310 focused on a large sample 320 under the illumination of an array of light sources 321 and 322. Image parameters 317 to the camera array 310 can be inputted to the camera array, for example, to control focus mechanisms for focusing or for changing magnification of the individual cameras. A motion mechanism, e.g., a movable camera stage 313, can be used to adjust the positions of the camera array, such as tipping, tilting, translating the camera array, or for changing the overlap amounts between cameras. A motion mechanism, e.g., a movable sample holder 323, can be used to adjust the positions of the sample, such as tipping, tilting, translating, or curving the sample. The movable sample holder can also be used for advancing the sample or the sample holder in discrete steps for capturing scanning image data of the sample. An excitation module 330 can be used to provide excitation to the organisms in the sample 320.

A data processing system 340 can be used to control the elements of the imaging system. The data processing system 340 can be configured to receive inputs 318, such as data related to features of interest to be detected and analyzed on the sample. The data processing system 340 can be configured to receive data from the camera array 310, and to transfer the data to a data processing processor 341 or 342 for processing. The data processing system 340 can be configured to transfer the data to a second data processing processor 342 for analysis. The data processing system 340 can include a controller 346 to control the camera array, the illumination source, and the sample holder to provide suitable conditions for image captures, such as providing variably illuminated radiation patterns to the sample, repositioning the cameras, the camera array, the sample, or the sample holder for focusing or scanning operations.

In some embodiments, the data processing system is a desktop computer. This desktop computer can be attached to a monitor for visual analysis of recorded MCAM video and/or MCAM statistics. The desktop computer can also be networked to transmit recorded video data and/or MCAM statistics and is also used to control the image and video acquisition parameters of the MCAM instrument (exposure time, frame rate, number of micro-cameras to record video from, etc.) via electronic signal.

The imaging system 300, such as a camera array microscope, based on a set of more than one compact, high-resolution imaging system, can efficiently acquire image data from across a large sample by recording optical information from different sample areas in parallel. When necessary, physically scanning the sample with respect to the array and acquiring a sequence of image snapshots can acquire additional image data.

The imaging system can be used to obtain image and video data from the sample. The data can be analyzed to detect organisms for tracking. In addition, the data can be analyzed to classify the organisms, e.g., using the features on the organisms to classify the organisms into different organism categories or organism identification.

In some embodiments, the presented invention discloses methods to track freely moving objects, such as model organisms, over a large imaging area and at high spatial resolution in real-time, while also jointly providing high-resolution video and automated morphological analysis on a per-organism level.

A sample can be placed on a sample support in an MCAM system, under, above, or to a side of the cameras. Freely moving objects can be observed in the sample for imaging and analysis. The sample can be an arena, for example, having a glass or plastic flat surface with surrounding walls. Alternatively, the sample can have the form of a 6, 12, 24, 48, 54, 96, or more well-plate. The sample can contain model organisms, such as fruit flies, ants, *C. Elegans*, along with other materials of interest. The sample can also contain water, in which aquatic model organisms such as the zebrafish are placed for subsequent investigation and analysis.

The sample can be subjected to one or more excitation sources, which can be placed surrounding the sample area to manipulate the organisms. For example, the excitation sources can include micro-injectors to inject various model organisms with certain biochemical material, or to insert specific chemicals, toxins or other biochemical material into the sample area. Micro-manipulators may also be used to manipulate, stimulate, perturb or otherwise change the model organisms or their surrounding area. Equipment such as voice coils or LCD screens may also be used to stimulate the visual, auditory, olfactory or other sensory systems of the model organisms within the sample area.

FIGS. 4A-4K illustrate a process for tracking organisms in a sample according to some embodiments. An MCAM imaging system can be used to record video of a sample of interest, in which the video is created by recording multiple image snapshots in sequence from the cameras. Excitation sources can be optionally activated.

Figures 4A, 4B, 4C, 4D, 4E:
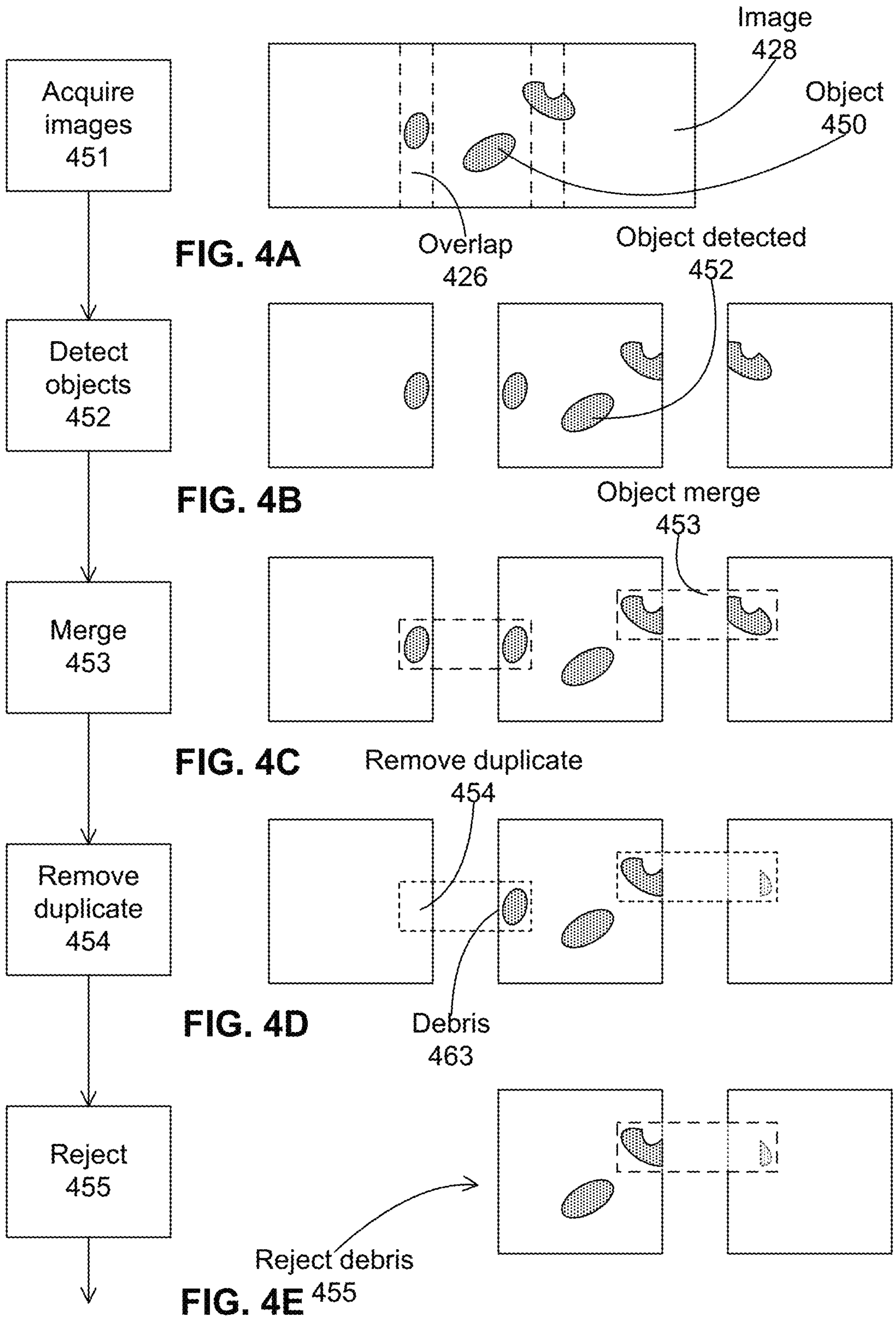
FIGS. 4A-4K illustrate a process for tracking organisms in a sample according to some embodiments.

FIG. 4A shows images 428 captured from 3 adjacent cameras, showing objects in the images. As shown, the images is partially overlapped 426, e.g., overlapping by less than 50%. After the image capture process, the image data can be sent to a processor, such as a processor coupled to each camera, or a main processor coupled to all the cameras.

In FIG. 4B, a feature or object detection algorithm can be used to locate and detect one moving object 452 within the captured image frames. The feature or object detection algorithm can be applied to the received pixel data as it is streaming in. The algorithm can employ object detection methods from image processing, computer vision or machine learning to identify only specific classes of objects, for example, object classes meeting an input requirement.

In FIG. 4C, after the objects are detected, bounding boxes can be formed around each object. The locations of each object can be compared to those of neighbor images to know whether it is part of a same object 453.

In FIG. 4D, detected objects not conformed to the targeted objects are removed from consideration. For example, dimensions and aspect ratios of the detected objects are compared to those of the targeted objects, e.g., objects being considered for tracking. If the dimensions and aspect ratios of the detected objects do not meet the expected dimensions and aspect ratios, the detected objects 454 are ignored 455, e.g., not being tracked.

Figures 4F, 4G, 4H, 4I, 4J, 4K:
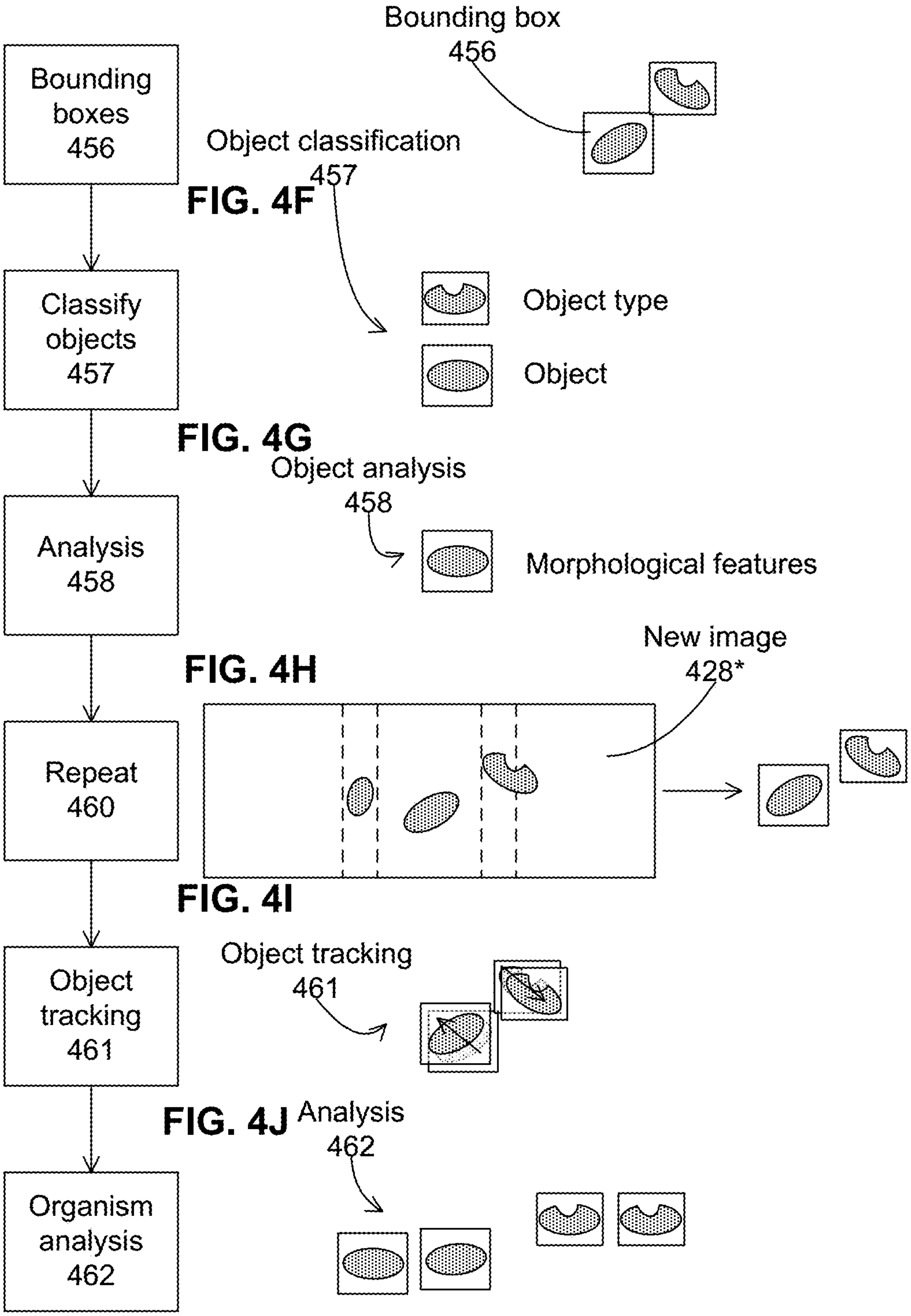

In FIG. 4E, the partial objects across the cameras are merged, e.g., the duplicated portion 454 in the overlapped area is removed. In FIG. 4F, bounding boxes 456 are drawn, e.g., determined and stored, for each detected object meeting the requirements of the targeted objects.

In FIG. 4G, the objects are classified 457 into categories, for example, by a detection algorithm such as convolutional neural network (CNN). For example, CNN can report a classification score for each object, in addition to the location and bounding box widths and heights. The classification score can be used to categorize each object. Categorizations include unique identification of objects, such as classifying object 1 as zebrafish larvae 1, as unique from object 2 as zebrafish larvae 2, or for unique identification of object type, such as classifying object 1 as a zebrafish larva, versus object 2 as a Medaka or a piece of debris.

In FIG. 4H, object analysis 458 can be performed on the detected objects. For example, morphological properties can be calculated for each organism of interest.

In FIG. 4I, the process can be repeated, e.g., new images 428* are captured, new objects are detected, and object properties are calculated. For example, new locations of the objects are determined to observe the movements of the objects as a function of time.

Since the MCAM has multiple cameras, the object can freely move between cameras, e.g., the object can exit the field of view of one camera and enter the field of view of a neighbor camera. With some amount of overlap in the fields of view of neighbor cameras, the processor can maintain a precise measurement of the location of each organism as its crosses image sensor boundaries, by maintaining a precise measurement in both cameras, and communicating information that the object is moving towards a second camera from a first camera.

In FIG. 4J, data from the subsequent captured images are aggregated to show movements of the objects. For example, the processor can update the list of detected objects, e.g., the locations and bounding box coordinates representing the width and length of the objects, to track the movements of the objects. The processor can also generate a cropped video footage displaying only the tracked objects, such as organisms, for efficient data storage and transmission. The processor can additionally report a set of classification categories and confidence scores for each unique object, such as zebrafish larvae 1 with 40% confidence as opposed to zebrafish larvae 2, and as a zebrafish larva with 49% confidence as opposed to a piece of debris.

In FIG. 4K, the cropped frames for each organism can then be rotated to match the reference frame via sinogram analysis, during which the angle of maximal energy can be associated with the orientation of the organism of interest along a preferential direction that aligns with known physiology. After such rotation, additional distortions or canonical transformations can be applied to maximize the similarity between the reference frame and previously acquired frames. Additional cropping can also be applied to ensure all frames are the same size with a uniform number of pixels, and a final alignment step can be used to ensure maximal similarity once again across acquired frames per organism. The output of this procedure is a video of frames per organism, e.g., an image frame set, that are aligned to a standard reference point, from which subsequent detailed per-organism analysis can be applied.

Subsequent analysis can be applied to this image frame set, including measuring one or more morphological properties about each organism of interest. Considering the case of imaging zebrafish larvae, some morphological features of interest include 3D organism position, Eye direction, Eye size, Gaze direction, Body length, Tail curvature, Mouth state, Pectoral fin angle, Pigmentation coverage, and Heart shape, for example. After measuring these quantities, additional subsequent analysis can be automatically executed, for example, unsupervised classification of behavior, watching eye position movement as a function of time, or tail movement or heartbeat as a function of time, or fluorescence variations within the brain as a function of time.

Figure 5:
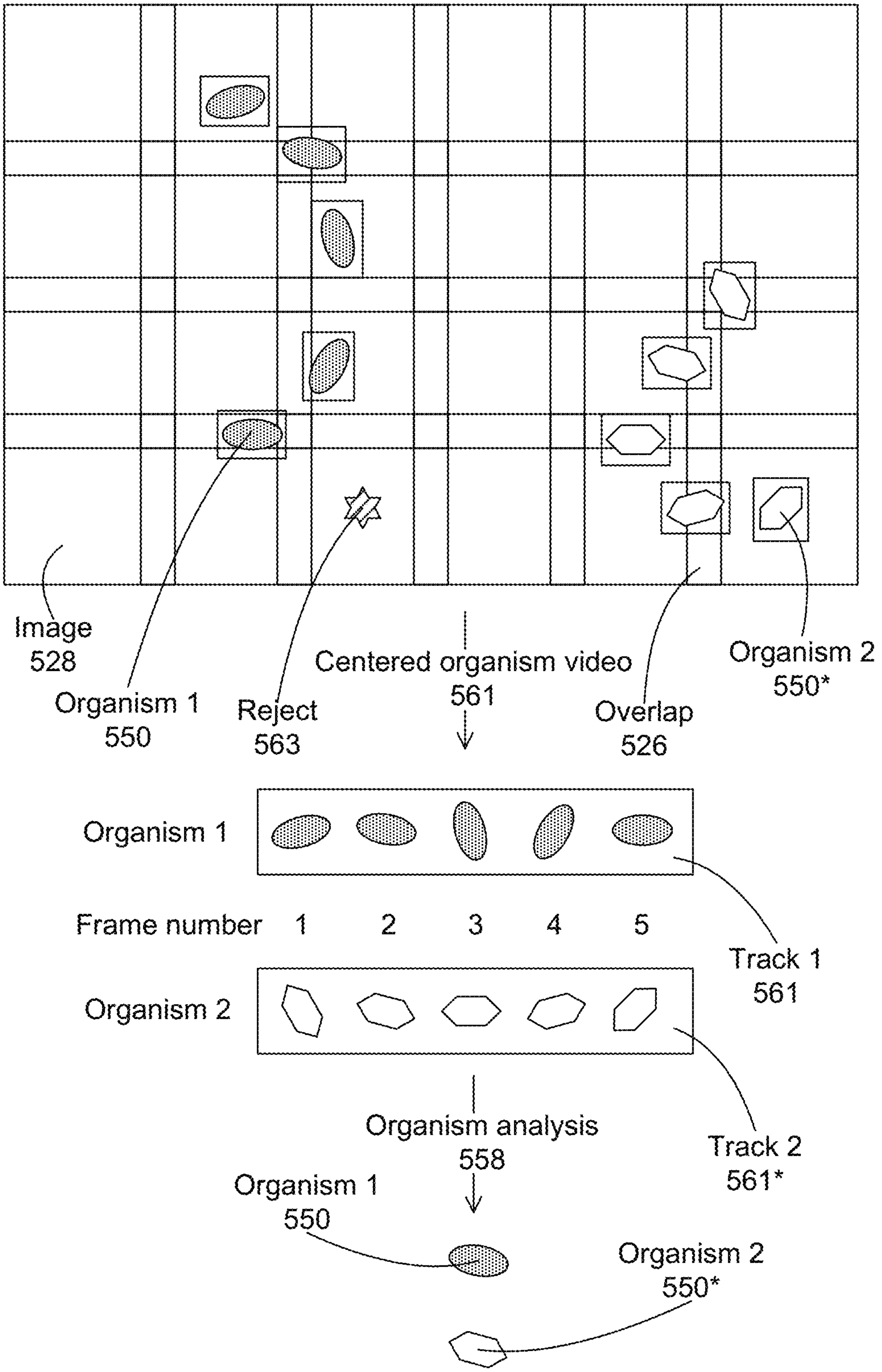
FIG. 5 illustrates a summary of the object tracking process according to some embodiments.

FIG. 5 illustrates a summary of the object tracking process according to some embodiments. A view of an entire MCAM imaging area is shown, with individual fields of view 528 of each camera and overlapped fields of view 526. Also shown are two independent objects 550 and 550* which are being tracked as during movements around the specimen area. In some embodiments, MCAM video can be recorded of the moving objects within the specimen plane, such as one or more model organisms, such as zebrafish larvae, fruit flies, ants, other invertebrates such as spiders, or other vertebrates such as rodents.

A feature or object detection algorithm can be used to locate and detect moving objects 550 and 550* within subsequently captured image frames from the cameras. Same or different object detection algorithms can be used to detect different objects of interest. The object detection algorithm can also be employed to ignore other objects, such as debris 563 or other features of the medium in which the organisms are contained during the imaging process.

The object detection algorithm may also be used to identify multiple objects across multiple image frames acquired as a function of time, to enable object tracking as a function of time. The object detection algorithm can be used to locate and draw bounding boxes around the objects 550 and 550*. The sequences of bounding boxes for the objects associated with different time points can be used to form video frames 561 and 561* with the objects centered within each frame.

In some embodiments, the bounding boxes can be employed to produce cropped image segments per frame, wherein only the pixels within each bounding box area are saved and utilized for additional processing. These cropped image segments can subsequently be spatially aligned to create a centered organism video for each organism of interest. Additional analysis 558 can be performed, including examining the size, speed, morphological features, fluorescent activity, and numerical assessment other important biochemical information that is transmitted optically to the MCAM sensor.

Figure 6A:
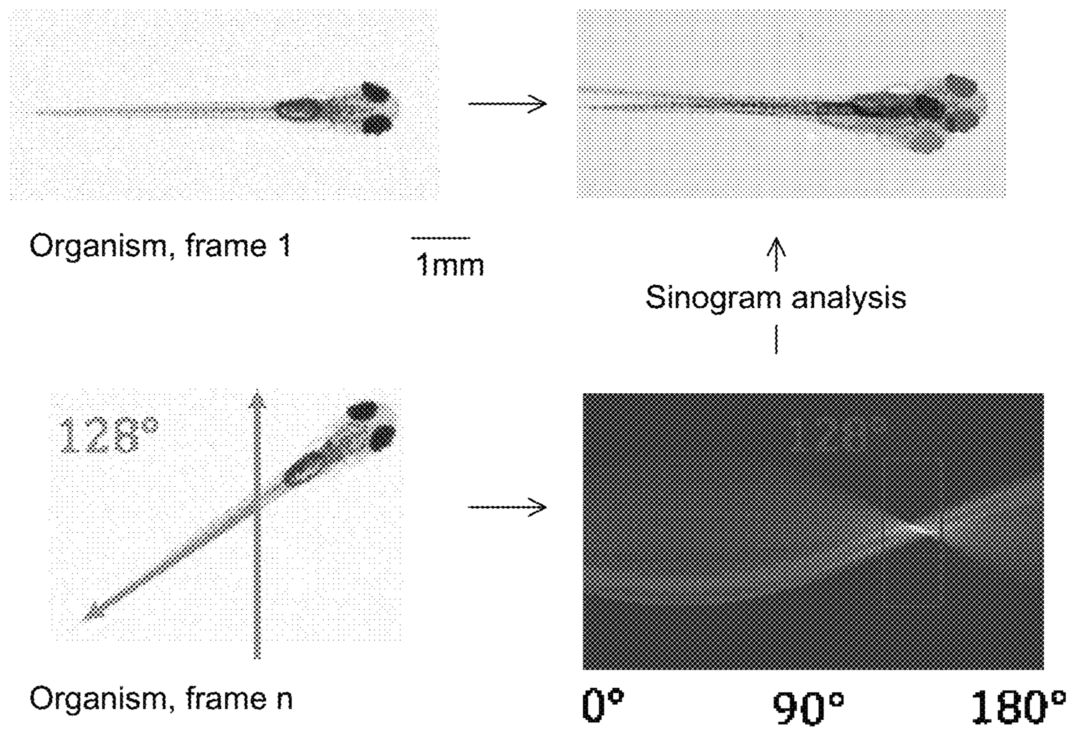
FIG. 6A-6B illustrate an example of object tracking according to some embodiments.
Figure 6B:
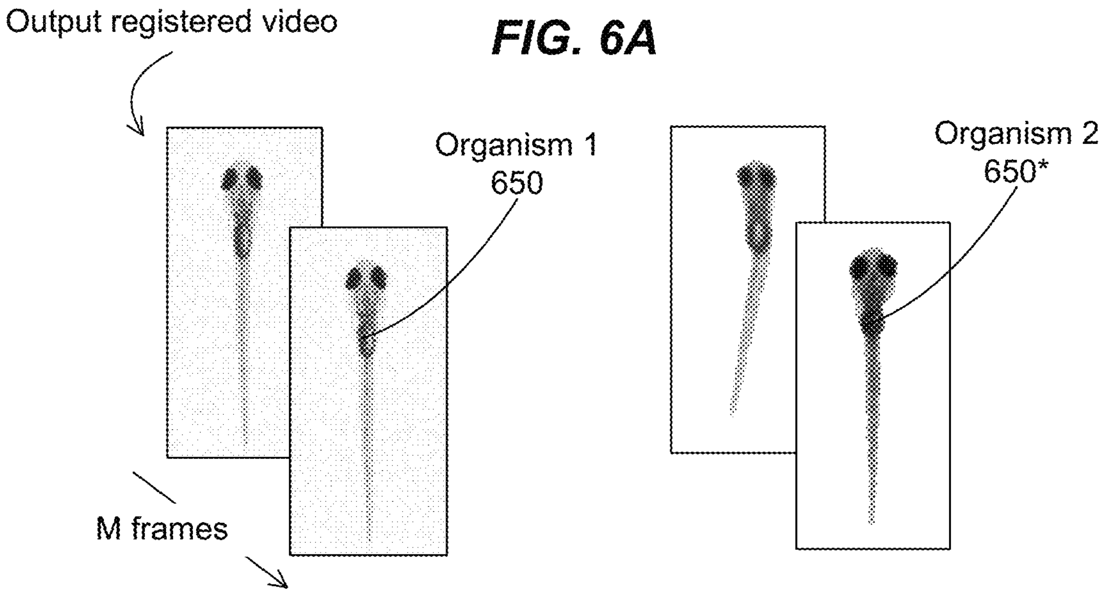

FIG. 6A-6B illustrates an example of object tracking according to some embodiments. An initial frame of each organism 650 and 650* is selected as a reference frame. Subsequent cropped frames for each organism can then be rotated to match the reference frame, for example, by via sinogram analysis during which the angle of maximal energy can be associated with the orientation of the organism of interest along a preferential direction that aligns with known physiology. After the rotation, additional distortions or canonical transformations can be applied to maximize the similarity between the reference frame and previously acquired frames (FIG. 6A). Additional cropping can also be applied to ensure all frames are the same size with a uniform number of pixels, and a final alignment step can be used to ensure maximal similarity once again across acquired frames per organism. The output of this procedure is a video of frames per organism that are aligned to a standard reference point, from which subsequent detailed per-organism analysis can be applied (FIG. 6B).

FIG. 7 illustrates a method for operating an MCAM for object tracking according to some embodiments. Operation 700 pre-calibrates an MCAM system, e.g., obtaining information related to the MCAM system, which can include camera data (focal lengths, distance between lenses and sensors, pixel sizes and pitches, magnification data, filter data and configurations, pixel rows and columns overlap, distances between cameras, distance to the sample), light source data (distance between light sources, distance between light sources and sample), sample stage data.

In some embodiments, the desired outputs from the MCAM video object tracking include a set of coordinates that each define the 2D or 3D location and bounding box encompassing the objects of interest within the MCAM field of view as a function of time. To enable rapid computation of object locations, information related to the MCAM system can be pre-determined, such as being measured or calibrated before the MCAM operation, and stored in memory off either or both pre-processors coupled to the cameras or the main processor receiving data from the cameras or from the pre-processors. The information about the mechanical and optical configuration of the MCAM can be accessed by the pre-processors or by the main processor to enable the pre-processors or the main processor to calculate the measured image data into actual and quantitative values regarding the detected target organisms. The actual data can allow the processors to determine if the detected objects are the target organisms or organisms not being targeted or a piece of debris, for example, by comparing the calculated actual dimensions to the target organism dimensions. The MCAM related information can take the form of a look-up-table, list of variables with associated values, or any other type of numeric array.

For example, the MCAM related information can include the distances between the cameras, the distances between the cameras and the sample being imaged (or the average distance for all cameras to the sample), the focal length of the lenses of the cameras, the distance between the lens and the image sensor in each camera (or the average distance for all cameras), the dimensions, such as in pixels, of each camera, the pixel pitch of each camera, and the number of rows and columns of pixel overlap between neighboring cameras.

The MCAM related information can allow the processors to calculate data useful in the detection or analysis of the target organisms. For example, the useful data can include the local locations within the individual camera, or the global locations within the entire MCAM imaging area, in either pixel or spatial coordinates of each organism being tracked, the identification of the camera in which each target organism is detected, the sizes, shapes, or dimensions of each organism, the average or maximum spatial distance between any two organisms, or other system information that can assist with the computational process of object localization.

Operation 701 inputs data of objects to be analyzed and track, including object shapes, dimensions and characteristics, object types, or object identification. The object data can be pre-stored in memory, and the input can include selecting an organism to be tracked, among a list of organisms presented to an operator of the MCAM system.

In some embodiments, the MCAM organism tracking includes detecting the organisms of interest in the MCAM imaging area. To enable rapid detection of objects within the MCAM field-of-view, it can be beneficial to store information about the features of the object types to be tracked. The object feature information can take the form of a look-up-table, list of variables with associated values, or any other type of numeric array.

The object feature information can include measurements of the objects, such as the sizes, shapes, and dimensions of the objects, which can enable the processors to distinguish a debris from the target organisms among the detected objects. As discussed above, the MCAM related information can enable actual measurements of the detected objects, and a comparison with the object measurements in the object feature information can allow the processors to accept detected objects as the target organisms and to reject detected objects not conforming to the measurements of the target organisms.

The object feature information can include detection characteristics, which can enable the processors to select optimum detection algorithm and to perform the selected algorithm. The detection characteristics can include specific features of the target organisms, e.g., the features that can enable the recognition and identification of the target organisms. For example, for frame-to-frame detection, a threshold value between change and no change can be stored. Similarly, for edge detection, a threshold value between edge and no edge can be stored. For projection detection, a threshold value between detection and no detection can be stored. Also, fitted curves for the projection detection can also be stored. For object detection convolutional neural network, the detection characteristics can include feature detection convolution filters, wavelet filters or other filters that are object or organism specific.

The object feature information can also take the form of a pre-trained neural network, such as a convolutional neural network (CNN), which is designed for object detection, object segmentation, object tracking or a related task. More than one CNN weights can be pre-set or pre-determined via supervised learning approaches, using either MCAM image data or similar image data, of examples of the desired object types to be tracked. Some weights can also be not determined, e.g., the weight values can be left un-initialized, and to be optimized at a later time after acquisition of additional image data, using new during or after image capture.

Operation 702 optionally provides excitation to the sample, e.g., to provide an influence, and disturbance, an excitation, or in general, something to affect or having an effect on the organisms. The excitation can be applied to the organisms, such as a fluorescent excitation signal configured to excite the organisms. The excitation can be applied to the sample medium, e.g., to the gaseous or liquid environment in which the organisms are located, The medium excitation can include a vibration or a disturbance of the medium. Multiple excitation can be applied to the sample, either in parallel, e.g., at a same time, or in sequence, e.g., one after the other.

In some embodiments, the excitation source can provide an energy or a signal configured to have an effect directly on the organism, or indirectly to the organism through the sample medium. Thus, the excitation source can be any source configured to provide an effect on the organisms. The excitation energy or signal can by any signal carrying an energy to be provided to the organisms, or to be provided to the medium that generates an effect on the organisms.

The excitation can include a global excitation to the entire sample, e.g., either to the whole sample or to only the area of the sample whose images can be captured by a camera of the MCAM. The global excitation can be provided to the top surface of the sample, or also to the depth of the sample. For example, an acoustic source can generate a sound to the sample, mostly at the surface. A radiation source can generate a light covering the whole sample, and can penetrate the sample surface. A medium vibration source can provide a disturbance to the whole sample, including the depth of the sample.

The excitation can include one or more local excitations to one or more areas of the sample. For example, a same type of excitation energy can be applied to multiple areas of the sample. Alternatively, different types of excitation energy can be applied to different areas of the sample. The multiple excitation energies can be applied in parallel or in sequence.

The local excitation energy can be applied to the surface of the sample, or to the depth of the sample, or to both surface and depth of the sample. The local excitation source can include a focus mechanism, to limit the excitation energy to a local area. For example, a focused acoustic source can generate a beam of sound to the sample. A focused radiation source can generate a beam of light to an area of the whole sample, and can penetrate the sample surface. A vibration source can provide a disturbance to a local area of the sample, whose effect can gradually reduced farther away from the excitation center.

The excitation signal can include a uniform excitation, a patterned excitation, a continuous excitation, a periodic excitation, or a pulse excitation. For example, a radiation source can provide a uniform light to the sample. A display screen, such as an LCD or OLED screen can provide a patterned light, e.g., space-varying light, which can be time-constant or time varying. The light from the radiation source can be continuous, e.g., as a time constant light. The light from the radiation source can be periodic, e.g., having a cyclic light. The light from the radiation source can include one or more pulses, either a series of periodic pulses or a number of pulses. In addition, the excitation signal can be time constant or time varying.

The excitation can include a noise, a sound, an audio effect, a light, a visual effect, an olfactory effect, a vibration, a mechanical manipulation, a chemical or biochemical injection, a fluorescence excitation. For example, a mechanical manipulation source in the form of a stirrer can be used to stir the gaseous or liquid medium of the sample. An injection source can be in the form of a pipette, which can be used to provide droplets of a chemical or a biochemical to the gaseous or liquid medium of the sample.

Operation 703 captures images from cameras, and sends to one or more processors, with each camera data sent to one pre-processor or all camera data streams to a central processor. The MCAM can have one main processor, for example, a central processing unit for a data processing system such as a computer. The images captured from the multiple cameras of the MCAM system then can be send to the main processor, such as through a parallel to serial device, which can be configured to accept multiple image data streams from the cameras to form a serial data stream to send to the main processor. The parallel to serial device can be a FPGA, or any electronic device configured to sequentially output data from multiple input streams.

The MCAM can have multiple processors, such as one or more pre-processors in addition to the main processor. The pre-processors can be coupled to the cameras, for example, with each pre-processor coupled to a camera, to pre-process the image data from the cameras before sending to the main processor through the parallel to serial device. A major advantage of the pre-processors is the ability for parallel processing, e.g., image data from all cameras can be processed, e.g., a portion or all of the needed processing, at a same time, instead of in sequence if the image data from the cameras are sent to the main processor for processing.

The pre-processors can be configured to only screen the input data to be sent to the main processor, such as to turn off, e.g., not send, cameras that a screening analysis of the images showing no object. The screening analysis is a quick analysis, with the goal of determine whether or not there is an object. The screening analysis is faster than the object detection process, since the object detection process also provide the coordinates and dimensions of the objects. After the screening process at the pre-processors, only image data from cameras that show the presence of an object is sent to the main processor.

In some embodiments, the screening analysis can be assisted through image data of previous analysis. For example, if partial object is detected from one camera, it is likely that the neighbor cameras containing the remaining portion of the object. The screening analysis can include a determination of no frame-to-frame change from the current captured image with the background image or with a previously captured image, for example, by comparing the sum of the pixel differences between two images with a threshold value. The screening analysis can include a determination of local area change, by applying a convolution filter.

The pre-processors can be configured to share the work load with the main processor, such as the object detection process at individual cameras without cross camera work. Since the object detection process can be performed on each camera, e.g., on the image captured by each camera, the images can be pre-processed at the pre-processors before sending the results, e.g., the detected objects, to the main processor. For this configuration, the pre-processor is coupled only to one camera, without cross camera connection. After the object detection process without cross camera analysis at the pre-processors, image segments containing whole or partial images are sent to the main processor. The cross camera work can be performed at the main processor to generate object location coordinates and sizes of bounding boxes containing the whole objects.

The pre-processors can be configured to share the work load with the main processor, such as the object detection process with the cross camera work. After the objects are detected at the individual cameras, cross camera data can be used to merge objects detected in multiple neighbor cameras, and to remove redundancy caused by the overlap between neighbor cameras. Thus, the pre-processors can send object location coordinates and sizes of bounding boxes containing the objects, together with image data within the bounding boxes to the main processor.

Operation 706 detects objects or partial objects in the captured images from individual cameras, using input information related to the target organisms, such as threshold or fitting curve values for the detection algorithms, or specific features of the target organisms such as feature filters for CNN object detection.

The detection process can include an edge detection (2D or line, monochrome or color), a projection detection, or a neural network detection (2D or 3D). The detection process can be performed at the main processor, if not being performed at the pre-processors or if there are no pre-processors. The detection process can detect whole object if the object is within the field of view of the camera. The detection process can detect a partial object, e.g., a portion of the object, if the object is shared between the fields of view of multiple neighbor cameras. Outputs of the detection process can include the image segments surrounding the objects or the partial objects.

Operation 707 merge or remove duplicate objects across neighbor cameras, including removing duplicated complete or partial objects at the overlapped captured image, and merging objects spanning across multiple cameras. The merge and remove process can be performed at the main processor, if not being performed at the pre-processors or if there are no pre-processors.

The merge process can merge partial objects from neighbor cameras, due to the main processor ability for accessing cross camera data. For example, for a partial object, partial objects from neighbor cameras are evaluated to see if they are from the same object.

The duplicate removal process can remove objects or portions of objects that are duplicated, e.g., showing in more than one camera at the overlapped areas between the cameras. For example, detected objects at the overlapped area are optionally transformed so that the objects are of the same sizes and orientations. Afterward, the objects in multiple cameras are compared to remove the duplicated portions. Outputs of the merge and remove process can include the location coordinates and the sizes (e.g., width and height) of the objects, together with the image data within the bounding boxes surrounding the objects.

Operation 708 determines characteristics, including dimensions and shapes, of detected objects, comparing the characteristics with the input object data, and rejects detected objects not meeting the input object data. The detected objects are compared with the stored input data of the target organisms, to reject detected objects showing discrepancy with the target organisms. Outputs of the process can include the detected target organisms, e.g., the locations and bounding boxes of the detected target organisms, e.g., of the detected objects that have been screened to make sure that they are the target organisms.

Operation 710 forms bounding boxes and locations for the objects meeting the characteristics of the input object data. The bounding boxes and locations can be used to form tracking data of the objects.

Operation 711 transforms objects in bounding boxes, including centering the objects and translating, rotating, skewing, enlarging, or reducing the objects to conform to a same size and orientation. This process can allow a uniform analysis, since the detected objects are all of a same size and orientation.

Operation 712 generates classification scores and categorizes objects, including classifying the objects into different categories or identifying the objects, based on statistically data, for example, through a convolutional neural network.

Operation 713 analyzes the objects in details.

Operation 714 repeats as a function of time for tracking

Operation 715 forms tracing data including movements and other actions of objects FIG. 8 illustrates a process for forming an MCAM system for object tracking according to some embodiments. The process includes forming an MCAM system for tracking objects in a sample. The MCAM system includes multiple cameras configured to capture images of different portions of the sample, one or more light source configured to provide irradiation to the sample, and a controller configured to process image data from the captured images.

The MCAM system optionally includes one or more excitation sources configured to provide one or more excitation to the sample, with each excitation including a local excitation to an area of the sample or a global excitation to a whole of the sample. The excitation includes a continuous excitation, a periodic excitation, or a pulse excitation. The excitation includes a noise, a sound, an audio effect, a light, a visual effect, an olfactory effect, a vibration, a mechanical manipulation, a chemical or biochemical injection, a fluorescence excitation.

The controller can be configured to store pre-measured calibration information, e.g., information related to the MCAM system, to determine locations of the objects detected from the captured images with respect to individual cameras or with respect to the sample, to determine identifications of the multiple cameras in which the objects are detected, to determine sizes of the objects, to determine a spatial distance between two objects.

The pre-measured calibration information includes camera data (focal lengths, distance between lenses and sensors, pixel sizes and pitches, magnification data, filter data and configurations, pixel rows and columns overlap, distances between cameras, distance to the sample), light source data (distance between light sources, distance between light sources and sample), sample stage data.

The controller can be configured to accept inputs related to the objects being tracked, e.g., object feature information, with the inputs including at least object shapes, dimensions and characteristics, object types, object identification, and threshold values and fitted curves for object screening process such as frame-to-frame change detection, edge detection and projection detection, feature filters for CNN processes.

The controller can be configured to detect objects or partial objects in the captured images from individual cameras, with the detection process including an edge detection (2D or line, monochrome or color), a projection detection, or a neural network detection (2D or 3D). The controller can be configured to merge or remove duplicate objects across neighbor cameras, including removing duplicated complete or partial objects at the overlapped captured image, and merging objects spanning across multiple cameras.

The controller can be configured to determine characteristics, including dimensions and shapes, of detected objects, comparing the characteristics with the input object data, and rejects detected objects not meeting the input object data. The controller can be configured to form bounding boxes and locations for the objects meeting the characteristics of the input object data.

The controller can be configured to transform objects in bounding boxes, including centering the objects and translating, rotating, skewing, enlarging, or reducing the objects to conform to a same size and orientation. The controller can be configured to generate classification scores and categorizes objects, including classifying the objects into different categories or identifying the objects, based on statistically data. The controller can be configured to analyze the objects in details, The controller can be configured to form tracking data including movements of the objects.

Figure 9A:
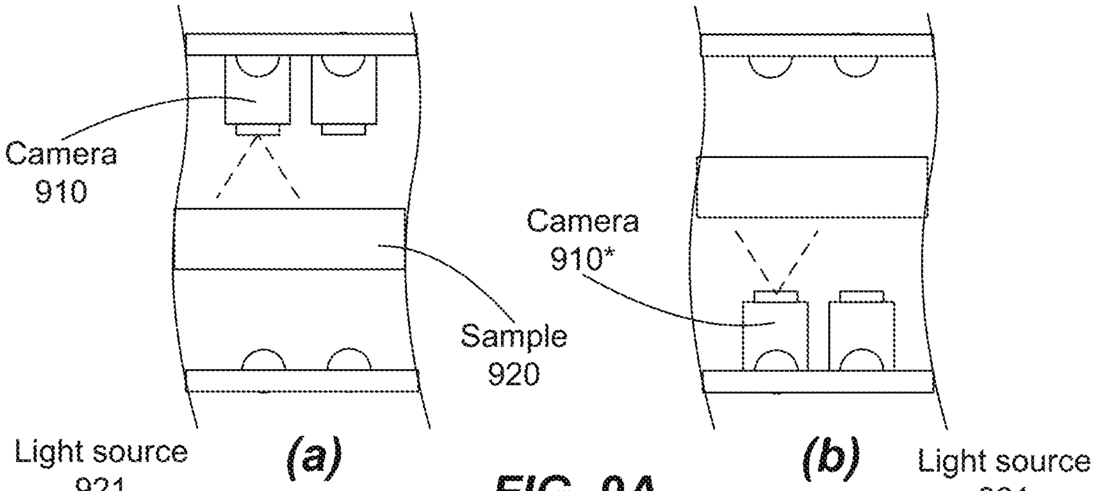
FIGS. 9A-9D illustrate MCAM configurations according to some embodiments.

FIGS. 9A-9D illustrate MCAM configurations according to some embodiments. FIG. 9A shows configurations of the cameras or the camera array in an MCAM system. The cameras 910 can be disposed above the sample 920 in FIG. 9A(a), or below the sample in FIG. 9A(b). Other configurations can be used, such as the cameras can be disposed on a left side, on a right side, or forming an angle not parallel and not perpendicular with the sample.

Figure 9B:
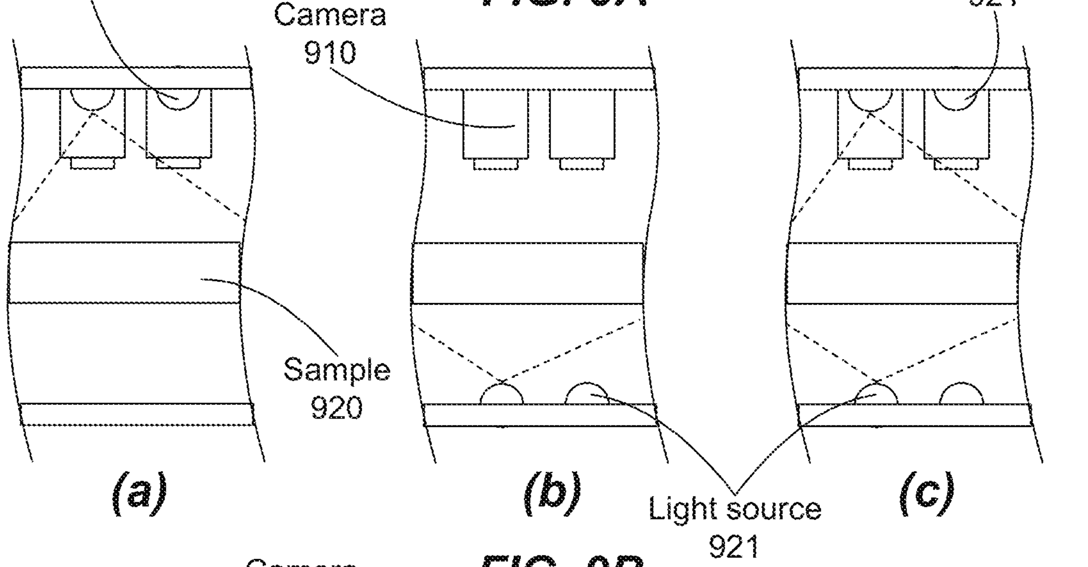

FIG. 9B shows configurations of the illumination sources or light sources in an MCAM system. The light sources 921 can be disposed above the sample 920 and at a same side as the cameras in FIG. 9B(a), to provide reflective illumination to the sample. The light sources 922 can be disposed below the sample and at an opposite side of the cameras in FIG. 9B(b), to provide transmissive illumination to the sample. The light sources 921 and 922 can be disposed above and below the sample, respectively, in FIG. 9B(c). Other configurations can be used, such as the cameras can be disposed on a left side, on a right side, or forming an angle above or below and not parallel and not perpendicular with the sample.

Figure 9C:
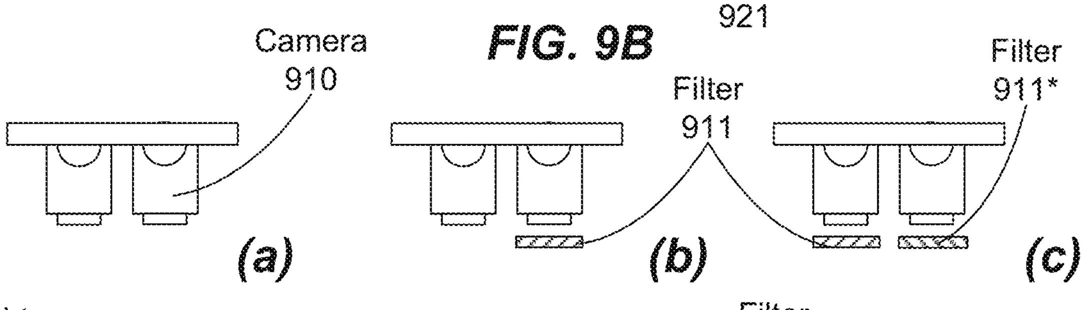

FIG. 9C shows filter configurations of the cameras or the camera array in an MCAM system. The cameras can have filters, such as fluorescent filter or polarized filters, to capture light with specific characteristics. The cameras can have no filters in FIG. 9C(a). Some cameras can have no filters and some cameras have filters in FIG. 9C(b). The cameras can have multiple types of filters in FIG. 9C(c). Other configurations can be used, such as filtered cameras can be alternatingly arranged or randomly arranged with non-filtered or with different type filtered cameras.

Figure 9D:
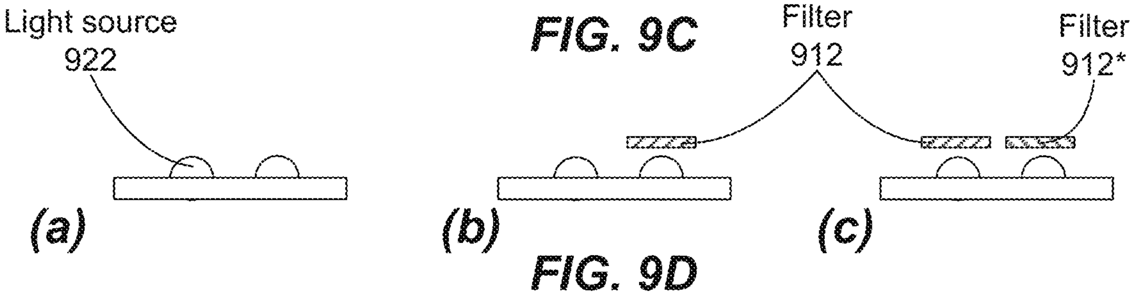

FIG. 9D shows filter configurations of the light sources in an MCAM system. The light sources can have filters, such as fluorescent filter or polarized filters, to provide excitation or light with specific characteristics. The light sources can have no filters in FIG. 9D(a). Some light sources can have no filters and some light sources have filters in FIG. 9D(b), such as no-filtered light sources for illumination and fluorescent filtered light sources for fluorescent excitation. The light sources can have multiple types of filters in FIG. 9D(c), such as no-filtered light sources for illumination, polarized light sources for polarized light, and fluorescent filtered light sources for fluorescent excitation. Other configurations can be used, such as filtered light sources can be alternatingly arranged or randomly arranged with non-filtered or with different type filtered light sources.

Figure 10A:
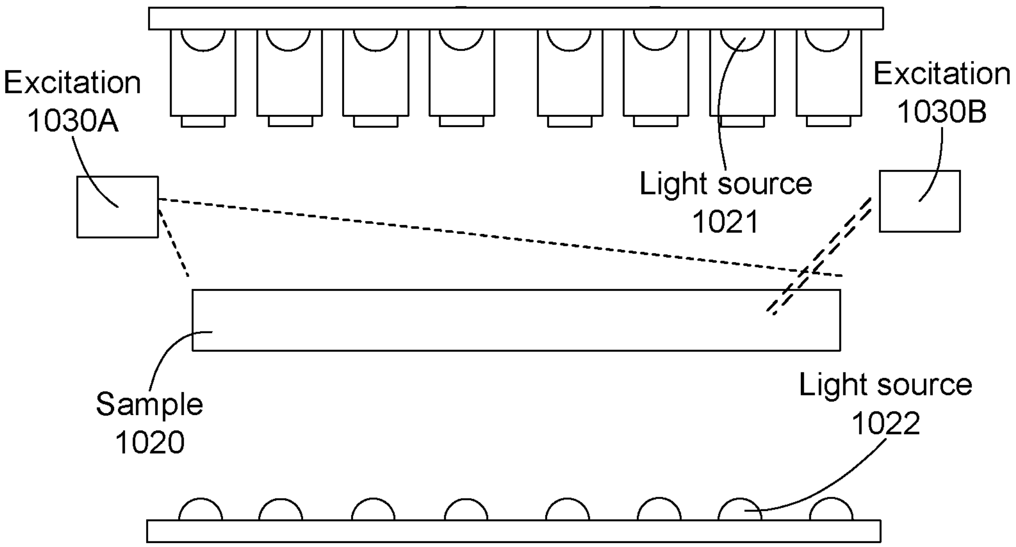
FIGS. 10A-10D illustrate configurations for excitation sources for an MCAM according to some embodiments.

FIGS. 10A-10D illustrate configurations for excitation sources for an MCAM according to some embodiments. FIG. 10A shows a configuration of an excitation source 1030A providing a global excitation to the sample 1020. In the global excitation process, the excitation energy provided by the excitation source 1030A can reach the whole sample, such as all surface of the sample and/or some depth of the sample. Another excitation source 1030B can provide local excitation to the sample. In the local excitation process, the excitation energy provided by the excitation source 1030B can reach an area of the sample, such as a surface area and/or some depth of the area.

Other configurations can be used, such as there are one global excitation source, one local excitation source, or multiple local excitation sources. The excitation sources can be disposed above, below, or at a side of the sample.

In some embodiments, the light sources 1021 and/or 1022 can be configured to function as the excitation source, such as the excitation sources can be placed at or near the light sources. For example, a fluorescent filter can be disposed on a light source, which can provide fluorescent excitation energy to the sample.

Figure 10B:
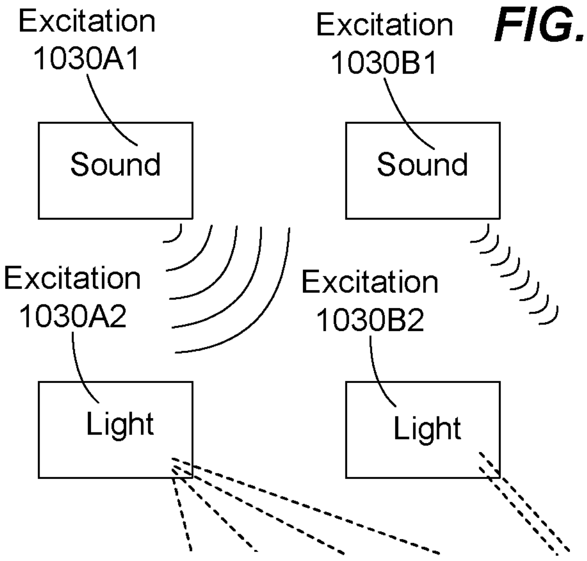

FIG. 10B shows examples of sound and light excitation sources. An excitation source 1030A1, such as a speaker, can emit an acoustic signal, such as a sound, to all areas of the sample, e.g., functioning as a global sound excitation source. An excitation source 1030A2 can emit a focus sound to an area of the sample, e.g., functioning as a local sound excitation source.

An excitation source 1030B1, such as an LED, can emit a radiation signal, such as a visible, infrared, or ultraviolet light, to all areas of the sample, e.g., functioning as a global radiation excitation source. An excitation source 1030B2 can emit a focus radiation to an area of the sample, e.g., functioning as a local radiation excitation source.

Figure 10C:
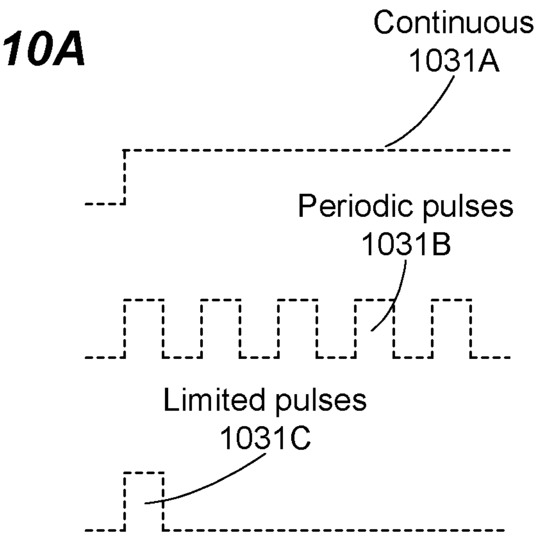

FIG. 10C shows configurations for the excitation energy provided by the excitation sources. The excitation energy 1031A can be continuous, e.g., the excitation source, once started, continuously provides excitation energy to the sample. The excitation energy can be constant or can be varied, such as a periodic excitation energy, a gradually increased excitation energy, or a gradually decreased excitation energy.

The excitation energy 1031B can be periodically pulsed, e.g., the excitation source provides periodic pulses of excitation energy to the sample. The excitation energy can be constant or can be varied, such as changing pitches, duty cycles, on times, off times, a gradually increased excitation energy, or a gradually decreased excitation energy.

The excitation energy 1031C can be one or more pulses, e.g., the excitation source provides one or more pulses of excitation energy to the sample. The excitation energy can be constant or can be varied, such as changing pitches, duty cycles, on times, off times, a gradually increased excitation energy, or a gradually decreased excitation energy.

Figure 10D:
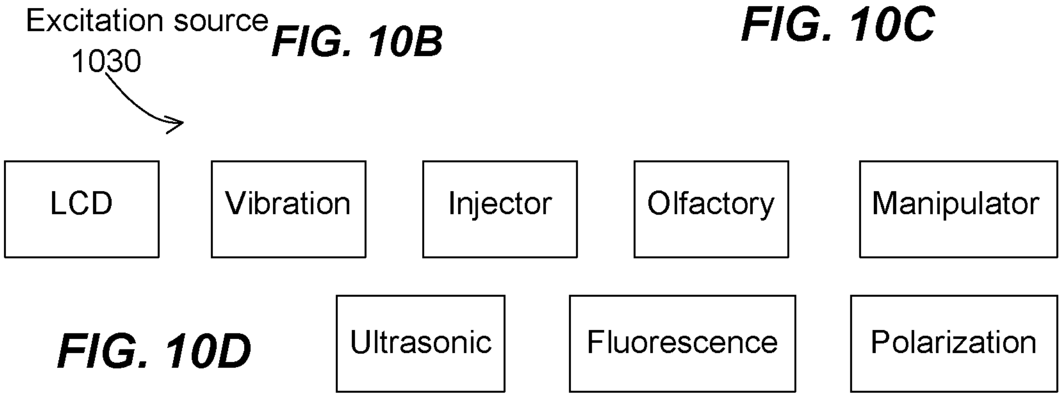

FIG. 10D shows configurations for the excitation energy provided by the excitation sources. One or more excitation sources can be used, such as at a same time, or at different times to provide excitation energy to the sample. The excitation sources 1030 can include a noise, e.g., a sound or an acoustic signal, a light flash, e.g., a burst or one or more pulses of radiation signal, a vibration of the sample holder, or a picture on an LCD screen projected to the sample surface. Other excitation sources can be used, such as an LCD, a vibration source, an injector source, an olfactory source, a manipulator source, an ultrasonic source, a fluorescent source, or a polarization source.

In addition, the excitation sources can include injectors or micro-injectors to inject various model organisms with certain biochemical material, or to insert specific chemicals, toxins or other biochemical material into the specimen arena. The excitation sources can include manipulators or micro-manipulators, which can be used to manipulate, stimulate, perturb or otherwise change the model organisms or their surrounding area. The excitation sources can include equipment such as voice coils or LCD screens, which can be used to stimulate the visual, auditory, olfactory or other sensory systems of the model organisms within the specimen plane.

The excitation sources can be placed surrounding the specimen or sample holder to manipulate the specimen, the sample, the medium, or the organisms in the sample. The excitation sources can be electronically controlled by a controller or a processor, such as a desktop computer.

In some embodiments, an object detection process can be used on the captured images to detect the presence of the objects, such as the organisms in the sample. The object detection process can include a feature extraction process, which can reduce the image data into a group of features that can be used to determine if an object is present in the image.

The features extraction process can be used to detect shapes or edges in an image. A general and basic approach to finding features is to find unique keypoints, e.g., finding the locations of distinctive features, e.g., the pixel coordinates surrounding the features, on each image. The feature then can be identified as a set of pixel coordinates and box sizes surrounding the feature. For example, the feature detection can look for areas of an image that contain high amounts of information that are likely to contain the features of interest.

In some embodiments, the object detection method can include an edge detection algorithm, e.g., finding the edge features of the object to detect the object. The object detection method combined with centroid-finding algorithms and/or inpainting algorithms to assist with robust object detection.

The image data is sent, pixel by pixel and row by row, from the cameras, e.g., from the image sensors of the cameras, to the processor, either to a main processor or to a processor coupled to each camera. The edge detection algorithm can process the image data after the image or a portion of the image is received by the processor. For example, the edge detection algorithm can process the image data row by row, e.g., processing each row of images after receiving the row data. The edge detection algorithm can process the image data pixel by pixel, e.g., processing each pixel as the pixels are coming. Alternatively, the edge detection algorithm can process the image data after the whole image data is received. The edge detection algorithm is performed by looking for rapid changes in image brightness or contrast in the image data. Example edge detection methods include the application of a Canny filter or a set of other asymmetric convolutional filters.

If the cameras capture images in monochrome, the edge detection algorithm can look at the brightness differences among nearby pixels. If the cameras capture images in color, brightness differences within color channels can be calculated. The rate of change in brightness/contrast (change in brightness divided by the number of nearby pixels) that signifies an edge can be a registered parameter that can be configured by the edge detection algorithm for tuning purposes. In addition, coordinates of the edges detected in each row of an image are stored, which are reset for a new frame, so that the location of each new edge detected can be compared to those of neighboring pixel rows to know whether it is part of the same object.

After an object is detected, information of the detected object, such as the shape, the dimensions, or the aspect ratios of various dimensions, of the detected object is compared to those of targeted objects. The comparison step can allow the removal of detected objects which are not the objects of interest.

Further, the detected object in one frame can be compared or associated with detected object in images from neighbor cameras to merge the same object appearing in multiple cameras. For example, the duplicated portion of the object can be removed based on the overlapped image that shows the same object in different cameras.

The algorithm can consider movements of the object, such as the object can exit the field of view of one camera and enter the field of view of a neighbor camera. Given that there is some amount of overlap in the fields of view of neighbor cameras, the processor can maintain an accurate measurement of the location of each organism as the organism crosses image sensor boundaries, for example, by maintaining a precise measurement in both cameras, and communicating information that the object is moving towards a second camera from a first camera.

Figure 11A:
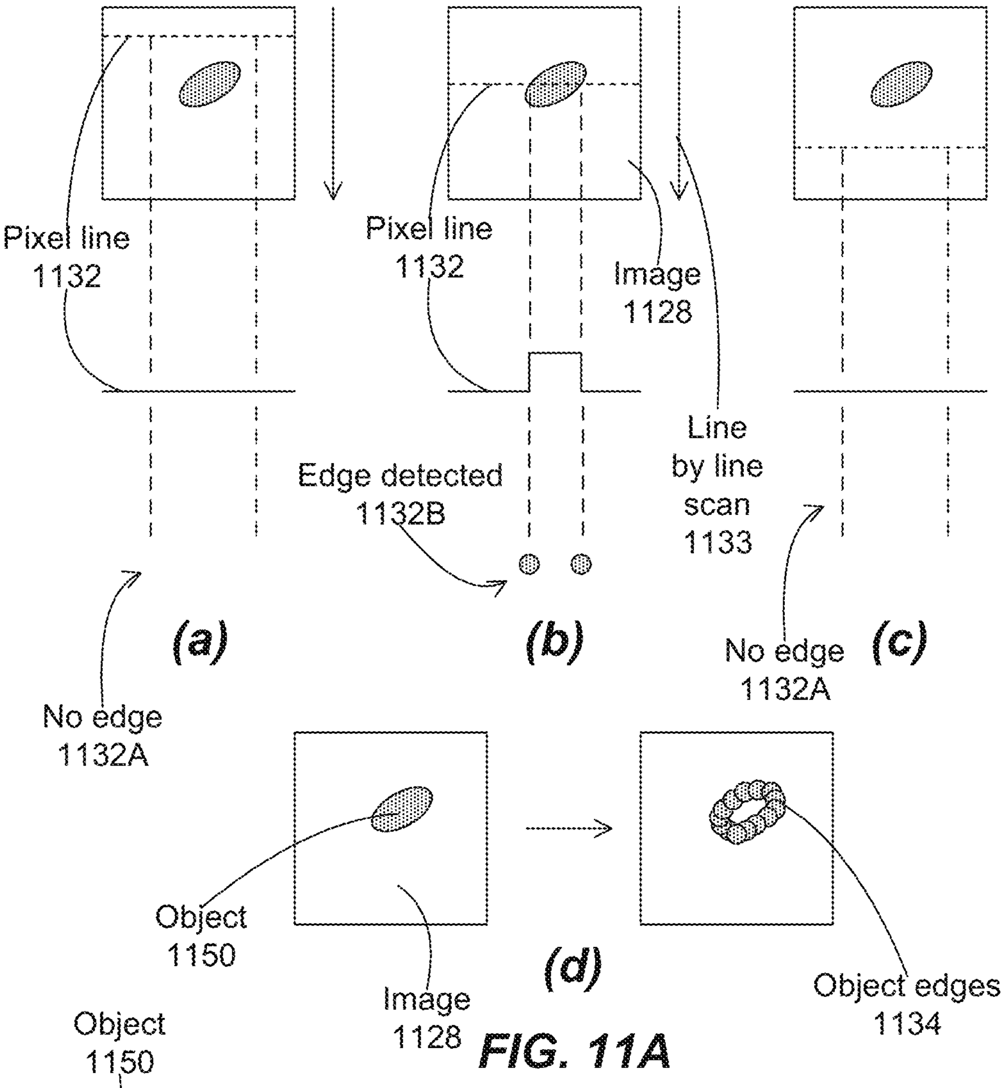
FIGS. 11A-11B illustrate an edge detection process according to some embodiments.
Figure 11B:
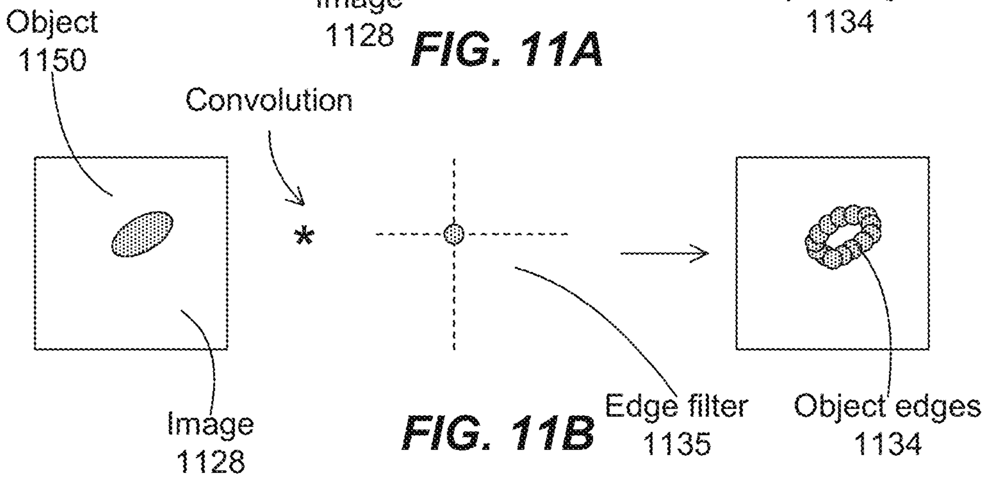

FIGS. 11A-11B illustrate an edge detection process according to some embodiments. In FIG. 11A(a), data from a pixel line 1132 is processed to determine a change in intensity, e.g., a pixel brightness. No edge 1132A is detected if there is no change in intensity, or the intensity change is less than a threshold value. In FIG. 11A(b), the process is continued with a new pixel line, e.g., the detection process can be performed on each pixel or on each line of image data as the data comes to the processor. An edge 1132B is detected if there is a change in intensity, or the intensity change is larger than the threshold value. In FIG. 11A(c), the process is continues for other pixel lines.

FIG. 11A(d) shows a result of an edge detection method. An object 1150 in an image 1128 can be processed by the edge detection algorithm to provide a collection of object edge 1134, e.g., coordinates of the edges of the object. Characteristics of the object edges can be compared to inputted data of target object to determine if the detected object is the object of interest.

FIG. 11B shows a convolutional approach for detecting objects edges. The image data is convoluted with an edge filter 1135 to generate the object edges.

In some embodiments, the object detection method can include a projection method or algorithm. In the projection method, image pixels are summed along each row streaming in. The image pixels are also accumulated along each column. A predefined threshold can be used to identify rows and columns with intensity values that deviate from some standard values, which can be created and stored in a look-up table created during a MCAM calibration process, from which an object may be localized along row. The process can be completed along the rows and columns of pixels to localize objects along two coordinates. The projection method can be extended to use fitted curves instead of threshold values and can be combined with centroid finding algorithms and inpainting algorithms to assist with robust object detection.

Figure 12A:
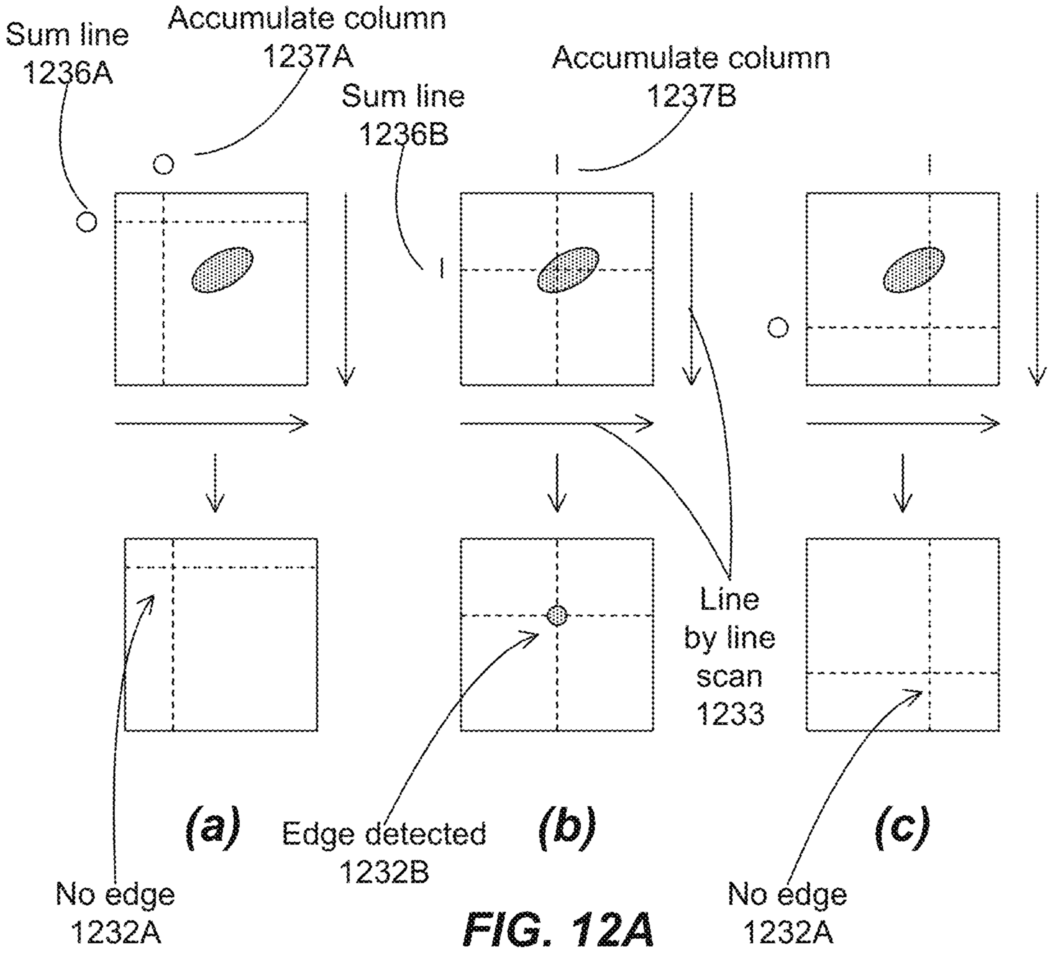
FIGS. 12A-12B illustrate a projection detection process according to some embodiments.
Figure 12B:
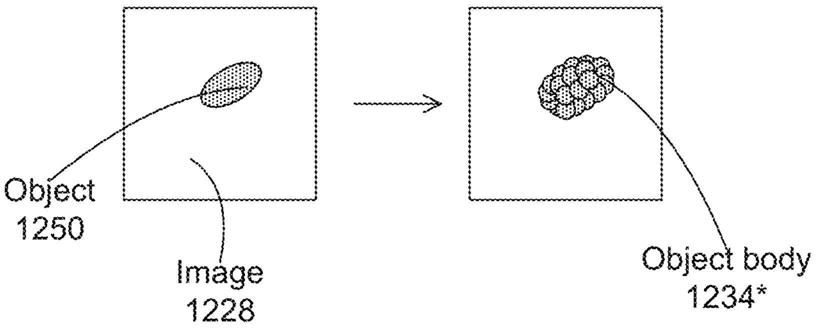

FIGS. 12A-12B illustrate a projection detection process according to some embodiments. Data from a pixel line is processed, e.g., summed to generate a sum line value 1236A, to determine a change in intensity. The data from each pixel from the pixel line is also processed, e.g., summed to generate a sum column value. for each column, e.g., for each pixel in the pixel line. A zero or low value, e.g., lower than a threshold, in either the sum line value 1236A or the sum column value 1236B indicates no detected object. A high value, e.g., higher than a threshold, in both the sum line value 1236A and the sum column value 1236B indicates that there is an object.

In FIG. 12A(a), the sum line value and the sum column value are both low, indicating no detected object. In FIG. 12A(b), the sum line value and the sum column value are both high, indicating a detected object. In FIG. 12A(c), the sum line value is low and the sum column value is high, indicating no detected object.

FIG. 12B shows a summary of the projection process. An object 1250 in an image 1228 is processed by the projection algorithm to generate coordinates of the object body 1234*, e.g., the object edges together with the object body.

In some embodiments, a neural network such as a convolutional neural network (CNN) can be employed for object detection. Example convolutional neural networks include the YOLO series and Faster-RCNN series of algorithms that can be implemented at high speed. Other convolutional neural networks include Fast R-CNN, Histogram of Oriented Gradients (HOG), Region-based Convolutional Neural Networks (R-CNN), Region-based Fully Convolutional Network (R-FCN), Single Shot Detector (SSD), and Spatial Pyramid Pooling (SPP-net).

The CNN process can be applied to the captured images, such as to each camera image data in parallel, to create bounding box coordinates for detected objects for each camera. The bounding box coordinates can be aggregated, using inter-camera overlaps to reduce double-counting objects and to merge objects having portions in multiple neighbor cameras. The object detection CNN algorithms can additionally report a classification score for each object, in addition to the location and bounding box width/heights. The classification score can be used to categorize each object. Categorizations include unique identification of objects, or for unique identification of object type.

Figure 13:
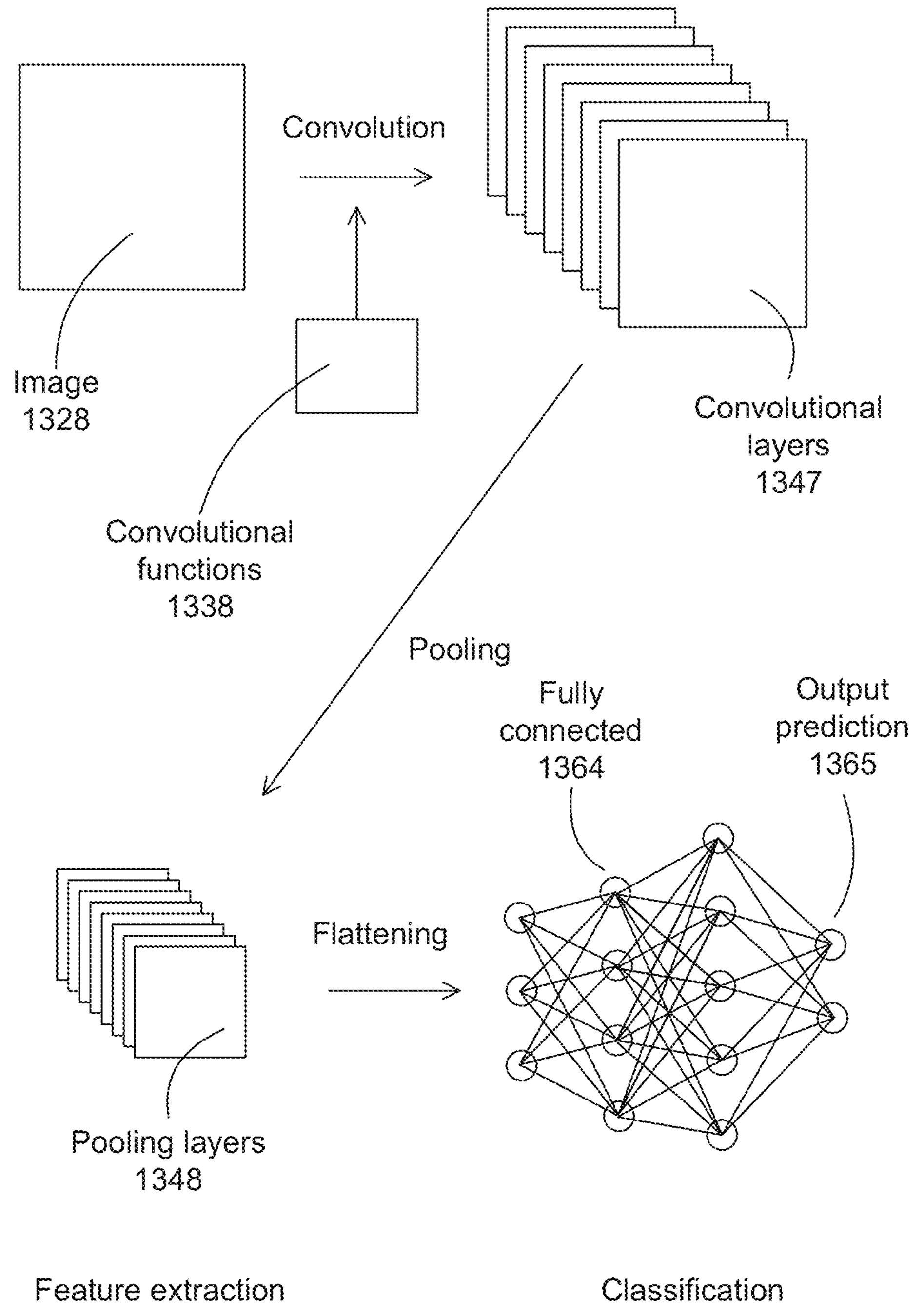
FIG. 13 illustrates an object detection CNN process according to some embodiments.

FIG. 13 illustrates an object detection CNN process according to some embodiments. In general, a feature extraction process can include a convolutional process and a pooling process. Data from an image 1328 can be convoluted with feature kernels 1338, which are functions to detect the features of the objects, to generate one or more convolutional layers 1347, with each convolutional layer corresponded to a map which is related to the feature kernel used in the convolutional process. The convolutional layers 1347 can be subjected to a pooling process to simplify the layers with pooling layers 1348. Each convolutional layer corresponds to a pooling layer 1348.

After the feature extraction process, the pooling layers can be subjected to a classification process, which can include a flattening process to form fully connected nodes 1364 and prediction output 1365. The prediction output can include probability distribution of the detected objects with the target organisms, and thus be used to classify the detected objects.

The object detection algorithm can also be used to uniquely identify multiple objects across multiple image frames acquired as a function of time, to enable object tracking as a function of time. For example, the object detection algorithm is used to locate and draw bounding boxes around detected objects. The bounding boxes are then aggregated to form moving videos of the objects.

Figure 14A:
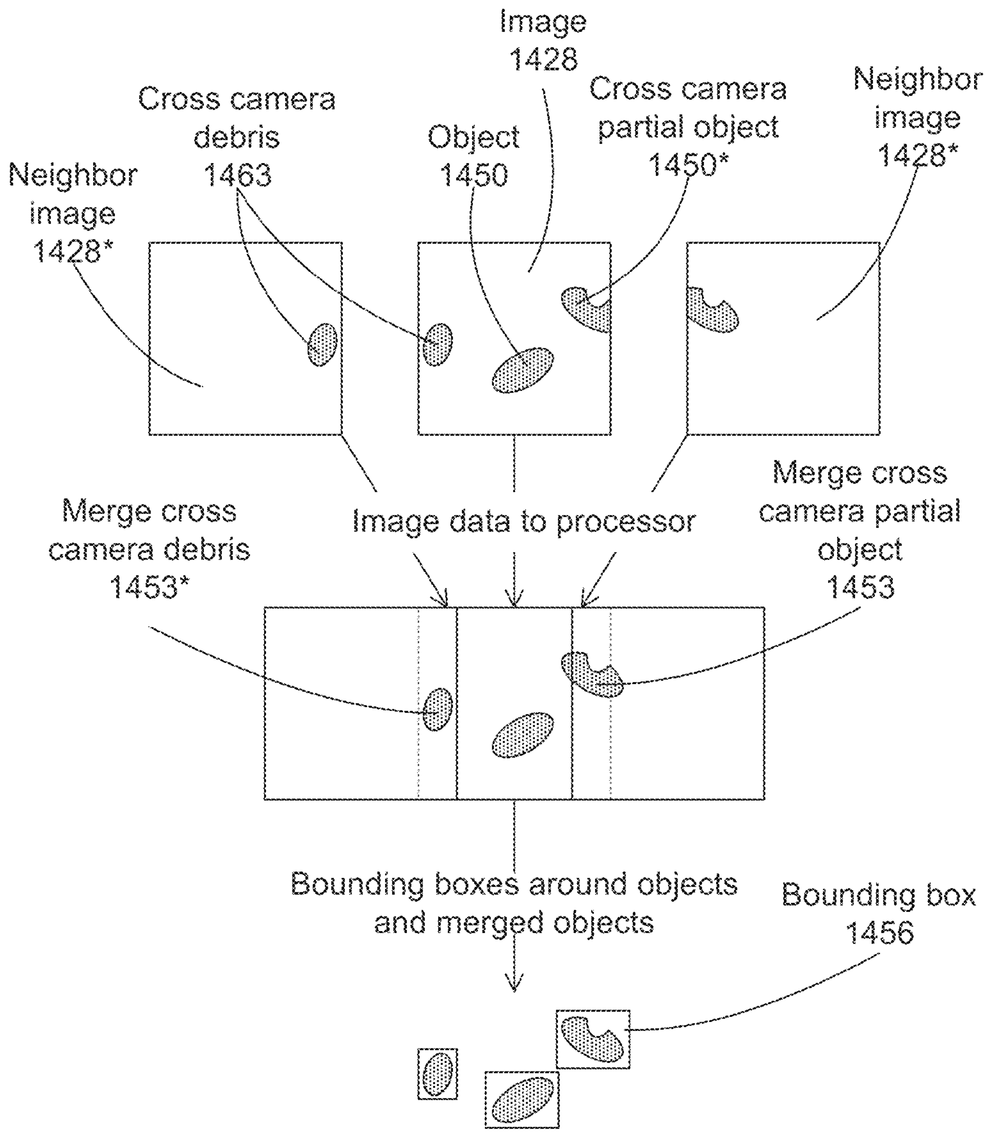
FIGS. 14A-14B illustrate a statistical process for classifying objects according to some embodiments.
Figure 14B:
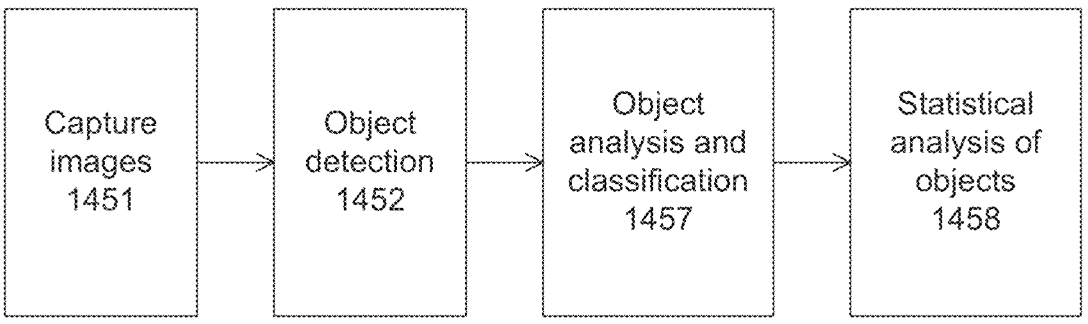

FIGS. 14A-14B illustrate a statistical process for classifying objects according to some embodiments. FIG. 14A shows a process to obtain coordinates of the detected objects. Images from a center camera 1428 and its neighbor cameras 1428* can be subjected to a merging process to consolidate objects appeared across the cameras. For example, after the image from each camera is processed to detect object, such as finding an object 1450, partial objects 1450*, and objects 1463 which can be identified as a debris in a comparison with target objects.

The objects and partial objects from the center camera and the neighbor cameras can be processed together to merge the objects and partial objects across the cameras using the overlap areas between adjacent cameras. For example, the debris objects 1463 and 1463* are detected in the overlap area of the center camera and a neighbor camera. The two objects 1463 and 1463* are merged, e.g., one object is removed to form a single object 1453*. The partial objects 1450* are detected in the center camera, the neighbor camera, and the overlap area between the two cameras. The two objects 1450* are merged, e.g., the overlap portion of the object in the overlap area is removed to form a single object 1453.

In some embodiments, bounding boxes 1456 can be drawn around the merged objects. The bounding boxes can be employed to produce cropped image segments per frame, wherein only the pixels within each bounding box area are saved and utilized for additional processing. These cropped image segments can subsequently be spatially aligned to create a centered organism video for each organism of interest. Further, per-organism analysis can be performed to provide detailed information for each organism.

FIG. 14B shows an operation for a classification analysis according to some embodiments, in which a statistical classification of the detected objects can be performed to identify the objects. Bounding box images containing the objects are identified with other portions of the image removed from being captured and excluded from being processed by the imaging system. The image capturing and image data analyzing of only features of interest can lead to a reduction of image data to be processed. The features of interest can be classified into category of objects, or into object identification.

The imaging system can capture images of a sample, and can process the image data to obtain a statistical measure of one or more features of objects of interest within the sample.

Operation 1451 performs an image capture process for the imaging system. Operation 1452 performs an object detection process on the captured image. The image areas containing the detected objects can be cropped out from the captured images to form bounding boxes around each object.

In some embodiments, an image captured from each camera can be split into one or more smaller segments, so that the smaller segments can be fed into a supervised machine learning algorithm, such as a deep neural network, that has been trained with prior acquired data for the object detection task. The output of the object detection can be a set of pixel coordinates and box sizes, with each pair of pixel coordinates and two box sizes representing an object. The object detection process can include a rejection of detected object that do not meet the characteristics of the target objects.

Operation 1457 performs analysis and classification on the bounding boxes of objects. For example, each of the bounding box image data can be passed through a supervised machine learning algorithm, such as a deep convolutional neural network (CNN), for the task of machine learning-based image analysis. The deep CNN can be trained with prior data for classifying each objects into one of several categories.

Operation 1458 generates a decision based on a statistical analysis of the object. After the image classification task, the set of all classification scores may be further combined via a statistical (e.g., by computing their mean, median, mode or some other metric) or machine learning-based approach (such as used in multiple instance learning, which would consist of an additional classification-type step on the compiled set of class scores).

Figure 15A:
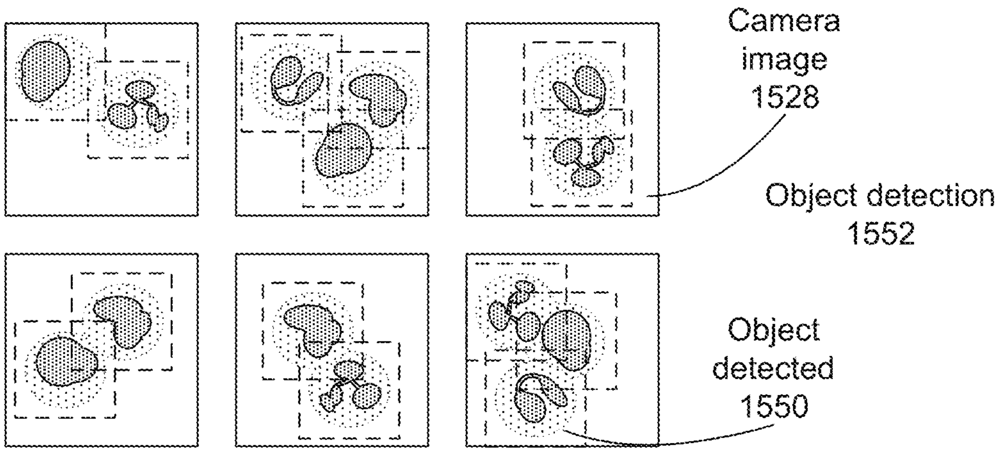
FIGS. 15A-15C illustrate operations for an object analysis according to some embodiments.
Figure 15B:
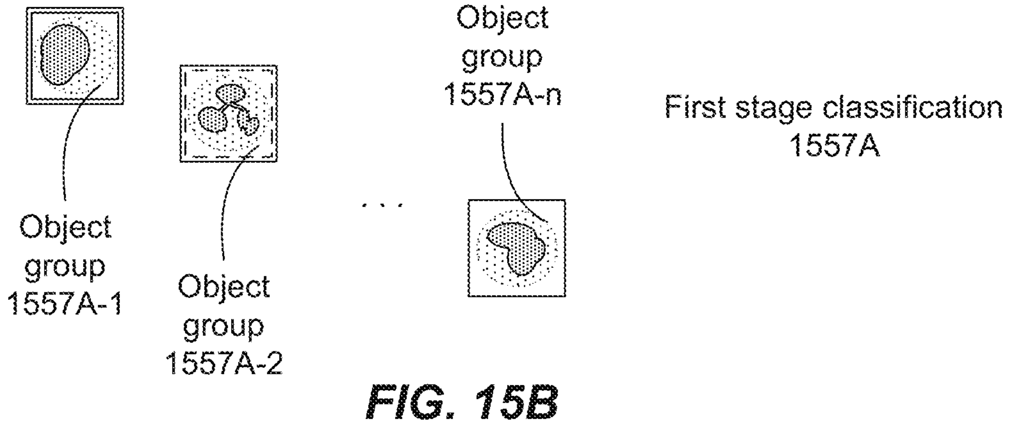
Figure 15C:
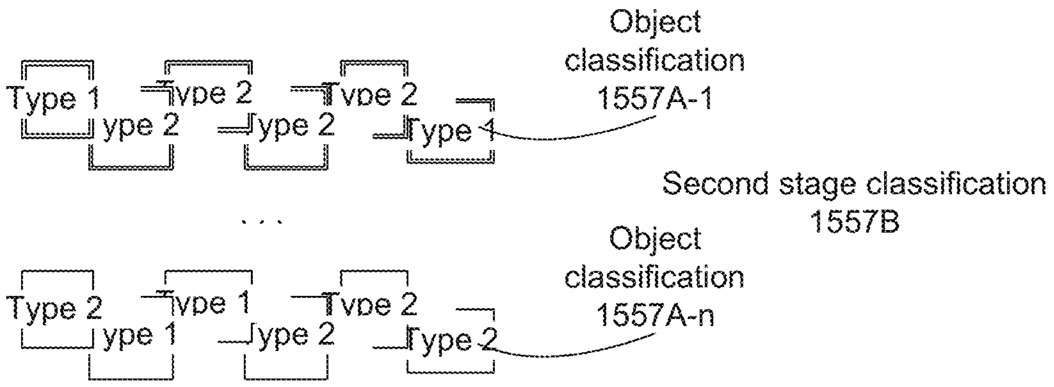

FIGS. 15A-15C illustrate operations for an object analysis according to some embodiments. FIG. 15A shows an object detection process 1552, showing the images 1528 captured by the cameras of an imaging system, including detected objects 1550 in bounding boxes. FIG. 15B shows a first stage classification 1557A, in which the object bounding boxes are grouped into multiple object groups 1557A-1, 1557A-2, etc. FIG. 15C shows a second stage classification 1557B, in which each object in each group is further classified as type 1, type 2, etc, or object identification.

In some embodiments, the MCAM system can include a main processor, such as a central processing unit of a desktop computer, which is coupled to the cameras to receive the image data from the image sensors of the cameras. The processor can include a control module, e.g., a controller, for controlling the elements of the MCAM system, such as controlling the camera, the light source, or the excitation source parameters. In some embodiments, the MCAM system can include a controller for controlling the MCAM elements. The controller can include a main processor, such as a central processing unit of a desktop computer or a data processing system.

A parallel to serial data conversion device can be disposed between the main processor and the cameras, for converting the multiple parallel image data streams from the cameras to a serial data image stream to the memory of the processor. The parallel to serial data conversion device can be an FPGA, or any other electronic device configured to perform the parallel to serial conversion.

In operation, after each of the cameras acquires an image, the image data from each camera are sent, in parallel to the FPGA. The FPGA then sequentially outputs the image data into a serial data stream to the processor to be processed, or to the memory of the processor. The parallel to serial conversion, e.g., in the FPGA, can be performed sequentially on each image or on portions of each image. For example, image data from camera 1 is sent first to the processor, followed by the image data from camera 2, and so on. Alternatively, a portion of the image data from camera 1 is sent, followed by a portion of the image data from camera 2, and so on.

An object detection algorithm, and subsequently, an object tracking and analyzing algorithm can be applied on the image data stored in the memory, including an edge detection algorithm, a projection algorithm, a centroid-finding algorithm, a neural network such as a convolutional neural network, or an inpainting algorithm. For example, the object detection is first performed to find the objects of interest, e.g., after removing the objects not suitable. The image data then can be cropped out to form bounding boxes, e.g., regions of interest. The bounding boxes can be centered upon each object of interest, and correlate specific objects as a function of time for tracking. Data from the bounding boxes are saved to the memory after processing.

Using the main processor, advanced processing algorithms on a GPU or CPU can be run, with the advanced algorithms not fast enough or flexible enough to be run on the FPGA. Advantages of the configuration include the ability to reduce saved data for subsequent per-organism analysis. This is especially relevant for MCAM video, which typically streams 50-100 camera frames (10 million pixels each) at 10 frames per second for 5-10 gigabytes of data per second.

Figure 16A:
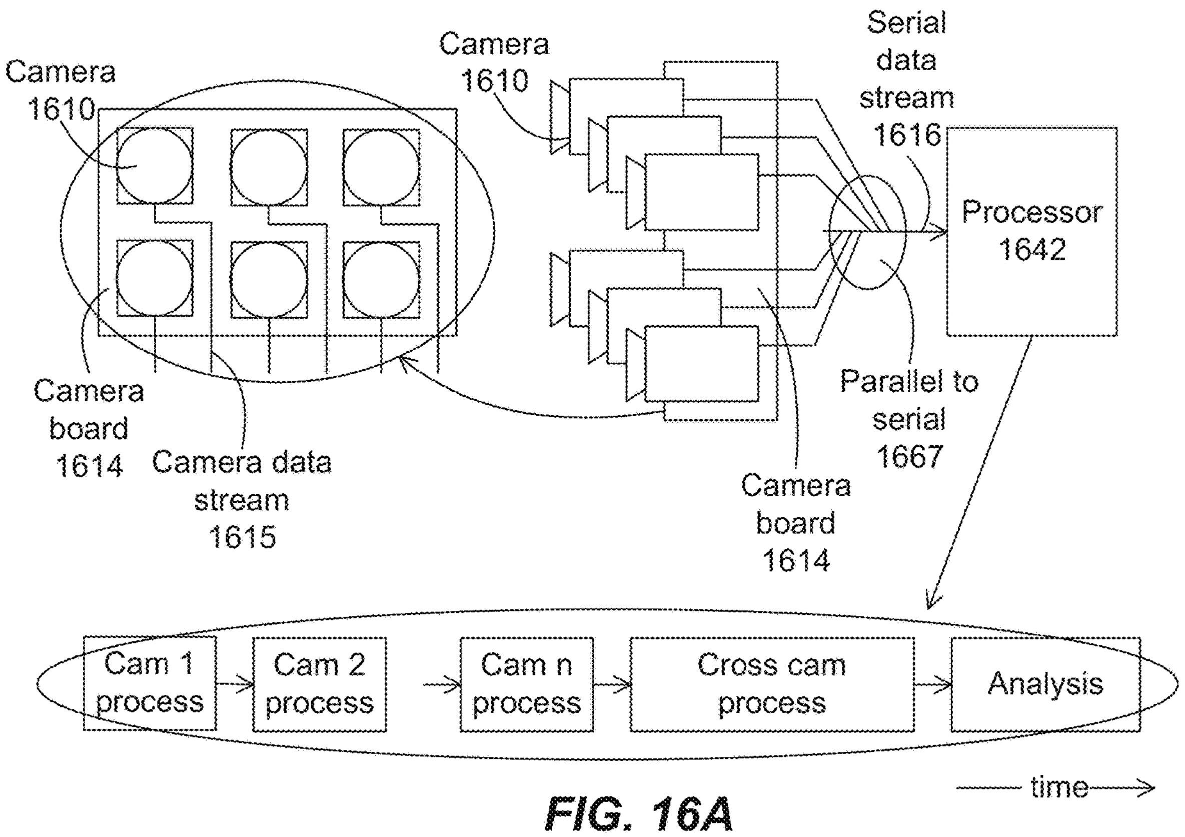
FIGS. 16A-16B illustrate configurations of an MCAM having a central processor according to some embodiments.
Figure 16B:
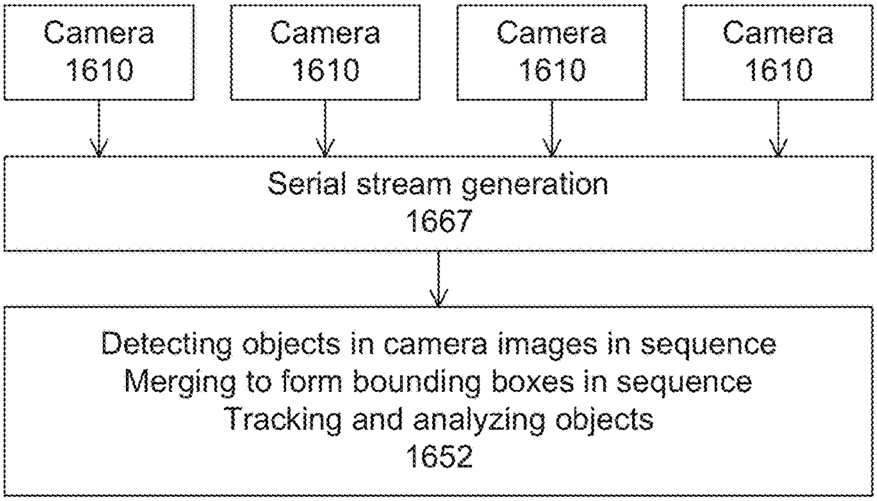

FIGS. 16A-16B illustrate configurations of an MCAM having a central processor according to some embodiments. FIG. 16A shows a schematic of an MCAM system, including multiple cameras 1610 coupled to a parallel to serial device 1667, such as an FPGA, which is coupled to a processor 1642 (or controller, which are used interchangeably in the specification). The FPGA is configured to converting parallel image data streams 1615 from the cameras 1610 to a serial data image stream 1616 to the processor 1642.

In some embodiments, the cameras can include micro-camera packages, which can include multiple camera sensors and optical components assembled on a board 1614, such as on a Printed Circuit Board (PCB).

In operation, the processor can process the image data from the cameras in sequence, e.g., one after the other. The detected objects can be subjected to an across camera analysis to merge objects and to remove duplicated objects across the cameras. The objects in bounding boxes can be analyzed, such as motion tracking and object analysis.

FIG. 16B shows a data flow of the image data. The image data from the cameras 1610 are sent in parallel to the FPGA 1667, which performs a parallel to serial conversion. The serial data stream is then sent to the processor, e.g., to a memory of the processor, for analysis, including 1652 detecting objects in camera images in sequence, merging to form bounding boxes in sequence, and tracking and analyzing objects.

FIGS. 17A-17B illustrate methods and systems for an MCAM having a central processor according to some embodiments. In FIG. 17A, operation 1703 captures images from cameras. Operation 1704 sends captured images to as a serial data streams to a central processor, for example, through a parallel to serial device (such as FPGA) to form a serial data stream from the multiple parallel image streams from the cameras. With the image data sent directly to the central processor, the central processor can perform all analysis on the captured images, including detecting objects, merging, consolidating, and removing duplicates, and rejecting objects not meeting the target organism specification.

Operation 1707 detects objects or partial objects in the captured images in sequence. Operation 1708 merge or remove duplicate objects across neighbor cameras. Operation 1710 determines characteristics to reject detected objects not meeting the input object data. Operation 1711 forms bounding boxes and locations for the objects meeting the characteristics of the input object data. Operation 1712 transforms objects in bounding boxes. Operation 1714 analyzes the objects in details. Operation 1715 repeats as a function of time for tracking. Operation 1716 forms tracing data including movements and other actions of objects.

In FIG. 17B, the process includes forming an MCAM system for tracking objects in a sample. The MCAM system includes multiple cameras configured to capture images of different portions of the sample, one or more light source configured to provide irradiation to the sample, and a controller configured to process image data from the captured images.

The controller can be configured to accept inputs related to the objects being tracked, with the inputs including at least object shapes, dimensions and characteristics, object types, object identification.

The controller can be configured to detect objects or partial objects in the captured images from individual cameras. The controller can be configured to merge or remove duplicate objects across neighbor cameras. The controller can be configured to determine characteristics to reject detected objects not meeting the input object data.

The controller can be configured to form bounding boxes and locations for the objects meeting the characteristics of the input object data. The controller can be configured to transform objects in bounding boxes. The controller can be configured to analyze the objects. The controller can be configured to form tracking data including movements of the objects.

In some embodiments, the present invention discloses methods to capture microscopy images from multiple image sensors and transfer them to a central processing unit with minimum delay in the image transfer. A benefit of the MCAM system is the ability to rapidly record high-resolution microscopy imagery over a very large field of view using a multitude of micro-cameras. Further, the MCAM system architecture can include complete or partial parallel processing for each image data captured from the cameras, which can negate the disadvantage of serially processing the image data from the multiple cameras.

Figure 18A:
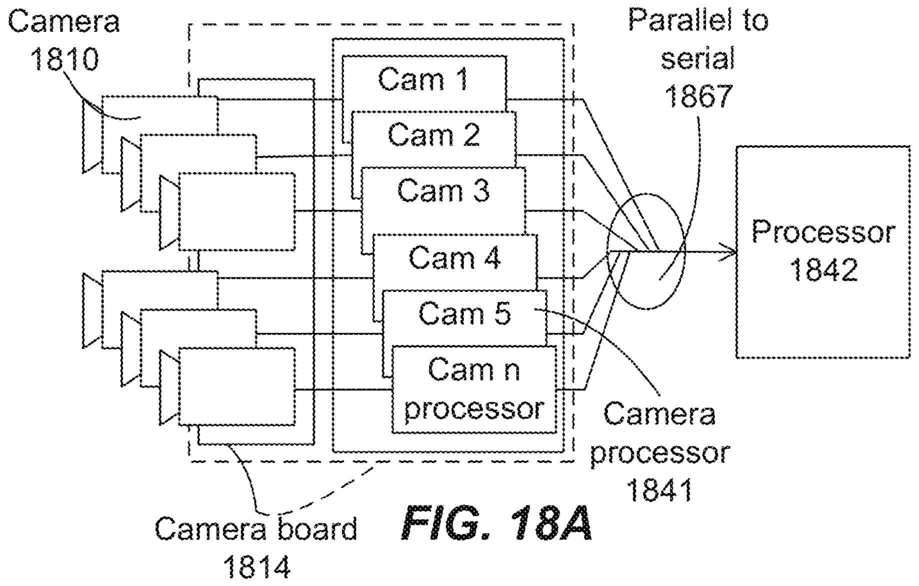
FIGS. 18A-18C illustrate configurations of an MCAM having multiple pre-processors according to some embodiments.
Figure 18B:
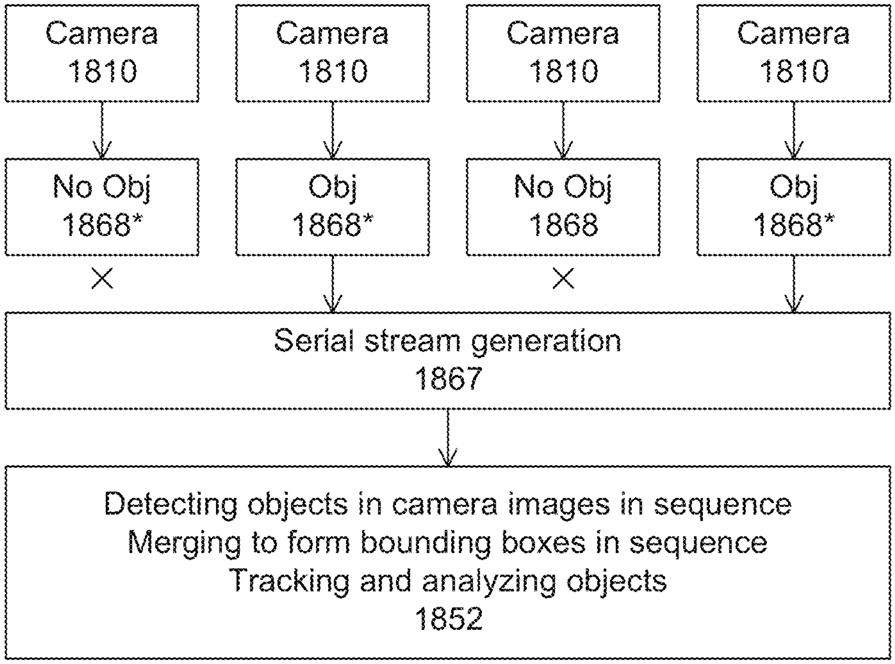
Figure 18C:
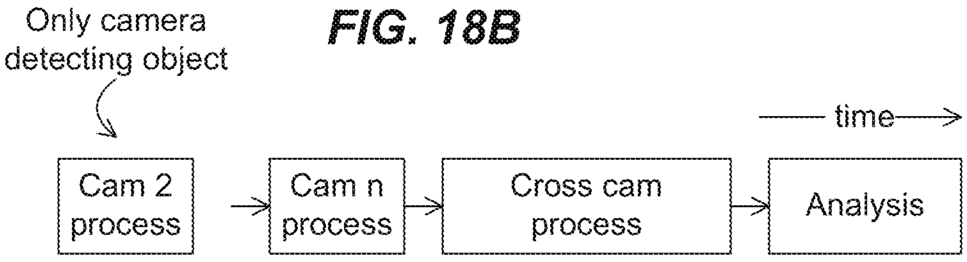

FIGS. 18A-18C illustrate configurations of an MCAM having multiple pre-processors according to some embodiments. FIG. 18A shows a schematic of an MCAM system, including multiple cameras 1810 with each camera coupled to a pre-processor 1841, e.g., to a processor configured to process the image data before sending to a central processor. The multiple pre-processors are then coupled to a parallel to serial device 1867, such as an FPGA, which is coupled to a processor 1842 (or controller). The FPGA is configured to converting parallel image data streams from the pre-processors 1841 to a serial data image stream to the processor 1842.

In some embodiments, the cameras can include micro-camera packages, which can include multiple camera sensors and optical components assembled on a printed circuit board.

The multiple pre-processors can be integrated to the cameras, or can be a separate device. For example, the multiple pre-processors can be a separate FPGA (or any other electronic device) coupled between the cameras and the parallel to serial device 1867. Alternatively, the multiple pre-processors can be integrated to the parallel to serial device 1867, e.g., an FPGA can be configured to perform the multiple pre-processor functions and the parallel to serial function.

In operation, the pre-processors 1841 and the main processor 1842 can share the data analysis, including detecting objects, merging objects, removing debris, boxing objects, tracking object movements, and analyzing objects. The division of labor between the processors 1841 and 1842 can vary, from a lot of analysis performed on the main processor 1842 to a lot of analysis performed on the processors 1841.

In some embodiments, the pre-processors are configured to perform a quick analysis to quickly screen the image data to determine if there are objects in the image data from each camera. Only image data from the cameras detecting objects are sent to the processor 1842 for analysis. Thus, the processor 1842 is configured to perform a same analysis operation as without the pre-processors. A main benefit is the reduction of image data, since only the image data having objects are sent to the processor 1842.

Thus, for samples with few objects, the screening operation of the pre-processors 1841 can be beneficial, since it significantly reduces the amount of data that the processor 1842 needs to process. For example, in an MCAM system having 100 cameras with one or two organisms, the number of cameras having an object ranges from 2 (the objects are in a middle FOV of 2 cameras) to 3 (one object is in a middle FOV of one camera and one object is between 2 cameras) to 4 (two objects are between 2 cameras) to 5 to 6 to 8 (two objects are between 4 cameras), for a reduction ratio between 2/100 and 8/100.

The quick screening operation can include a determination of no frame-to-frame change across the cameras, up to some threshold, as frames stream in from each camera. The pre-processors can store previous frames from the cameras in memory, and the algorithm running on the pre-processors can compare new frames with the stored frame, such as computing the energy of the difference between new frames acquired from each camera and the previously stored frames from the same camera. Alternatively, the comparison can be performed on the background images, obtained and stored from a calibration process.

Further, the quick screening operation can include a detection of any finite area with significant deviation, up to some threshold, with respect to the background, by computing a spatial gradient via convolution and examining the total energy. The spatial gradient can additionally be implemented across one or more previously captured frames, and the change in the gradient over time (e.g., from frame to frame) can be used as an indication of whether there is a frame-to-frame change as a function of time for one or more micro-cameras within the array.

Subsequently, the MCAM an turn off the cameras that contain limited or no frame-to-frame change as a function time, or limited/no significant deviation identified via computing the spatial gradient and examining the total energy across each frame acquired as a function of time. By "turning off" cameras that exhibit no frame-to-frame change over time, it means that no data from such cameras will be passed along from Processor 1 to Processor 2 for subsequent processing. The power doesn't necessarily need to be eliminated, but instead the data can be ignored during the "turned off" state. This approach reduces the total data overhead sent from Processor 1 to Processor 2 and can subsequently yield higher image frame rates.

The pre-processors can then send the remaining frames, which do have frame-to-frame change or deviation of the spatial gradient energy as compared to some threshold (e.g., from cameras that have not been turned off), to the main processor for analysis. The main processor can be located on a nearby computer, either the same computer used to control the MCAM imaging system, or a separate computer dedicated to image processing.

FIG. 18B shows a data flow of the image data. The image data from the cameras 1810 are sent in parallel to the pre-processors 1841, which can perform a quick screening operation, such as a frame-to-frame change detection between two subsequent frames or between a background frame with the current frame. For image data that shows not frame-to-frame change, the corresponding cameras are turned off, e.g., the image data are not sent to the FPGA 1867, which performs a parallel to serial conversion. Thus, the number of image data reaching the FPGA 1867 can be less than the total number of the cameras. The serial data stream is then sent to the processor, e.g., to a memory of the processor, for analysis, including 1852 detecting objects in camera images in sequence, merging to form bounding boxes in sequence, and tracking and analyzing objects.

FIG. 18C shows a time line of the MCAM operation. Image data from the pre-processors showing detected objects, such as showing frame-to-frame changes or changes in finite area of the frames, are sent to the main processor to be processed in sequence. The detected objects can be subjected to an across camera analysis to merge objects and to remove duplicated objects across the cameras. The objects in bounding boxes can be analyzed, such as motion tracking and object analysis.

Figure 19A:
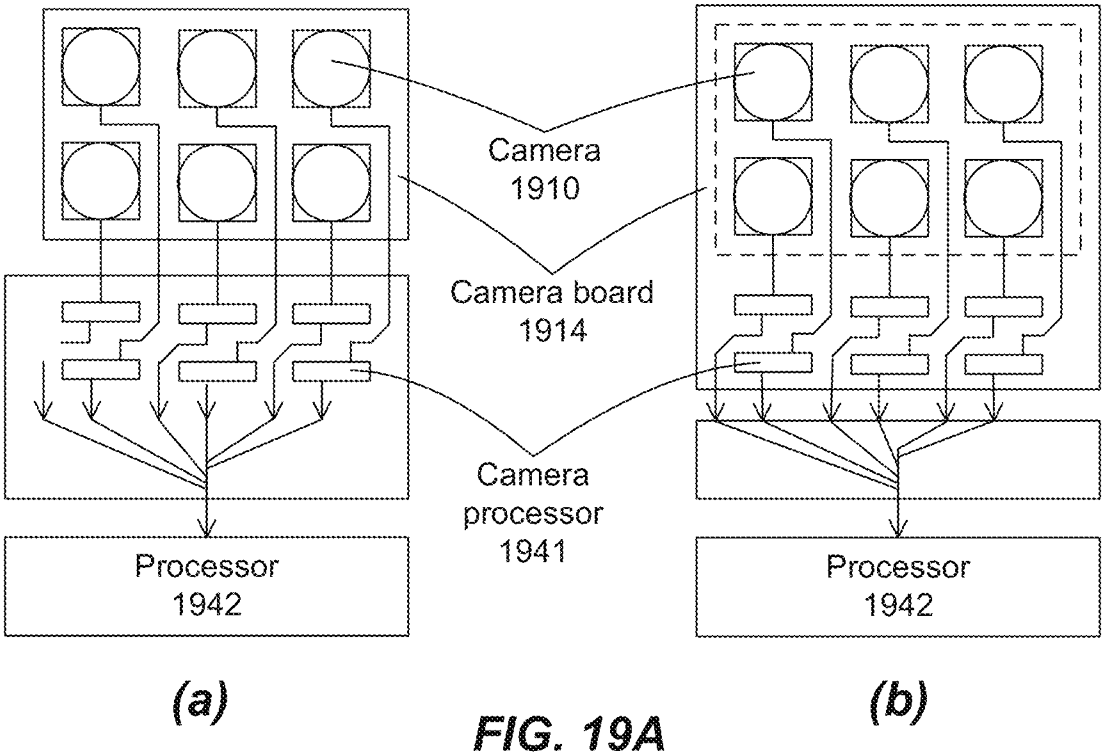
FIGS. 19A-19B illustrate configurations for an MCAM having multiple pre-processors according to some embodiments.
Figure 19B:
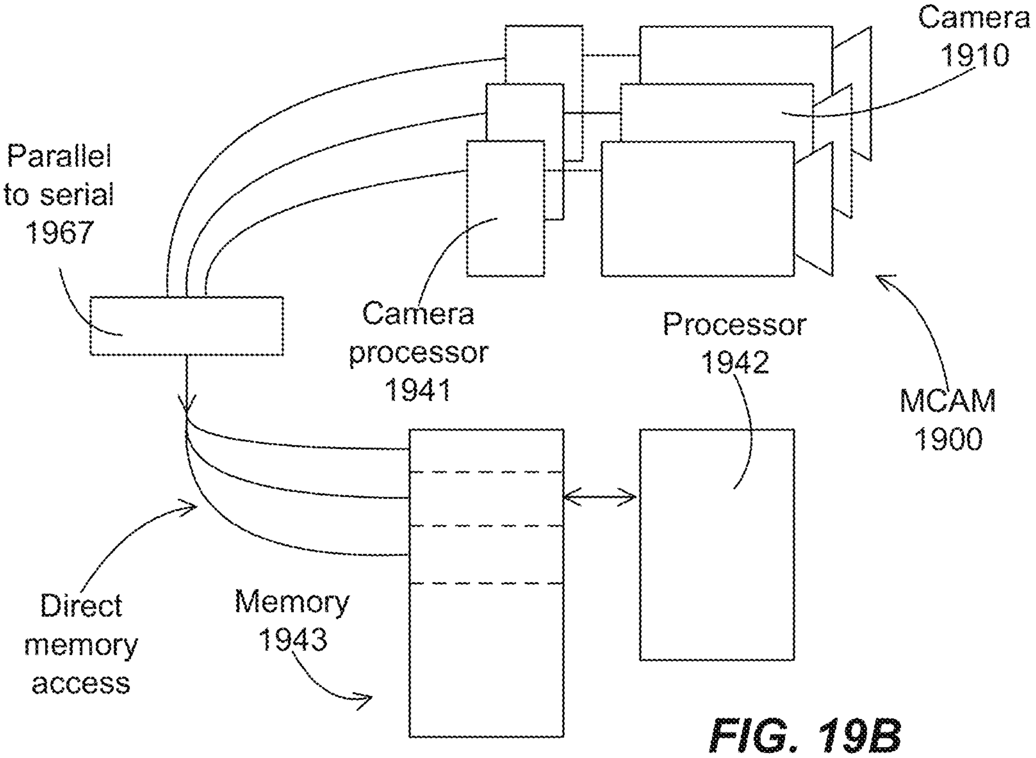

FIGS. 19A-19B illustrate configurations for an MCAM having multiple pre-processors according to some embodiments. In FIG. 19A(a), the cameras 1910 can be disposed on a PCB board 1914, with the outputs from the camera board coupled to an intermediate device before reaching the processor 1942. The intermediate device can include multiple camera pre-processors 1941 coupled to a parallel to serial conversion component. In FIG. 19A(b), the cameras 1910 and the pre-processors 1914 can be disposed on a PCB board 1914, with each camera coupled to a pre-processor. The outputs from the camera board is coupled to a parallel to serial conversion device before reaching the processor 1942.

FIG. 19B shows a data flow configuration of separate pre-processors 1941 and parallel to serial conversion 1967. Image data from multiple cameras 1910 are sent in multiple parallel data streams, each to a pre-processor 1941. The pre-processors can quickly detect if there are objects in the image frames from the captured images. The outputs from the pre-processors can be connect to a parallel to serial device 1967 to organize the data in the multiple parallel data streams into a serial data stream. Image data from cameras showing no objects is omitted, e.g., not sending to the parallel to serial device. The serial data stream is then distributed to a memory 1943 of a computational unit having a processor 1942, so that the data for each image from each of the multiple parallel data streams are stored sequentially.

Cameras from a camera array can capture images from a sample. After the images are captured, a pre-processing module in each camera can pre-process the data of the captured image, such as detecting the presence or absence of objects. The image data from cameras showing objects are sent to the parallel to serial device 1967, to form a serial data stream to the memory 1943, for example, by direct memory access.

Figure 20A:
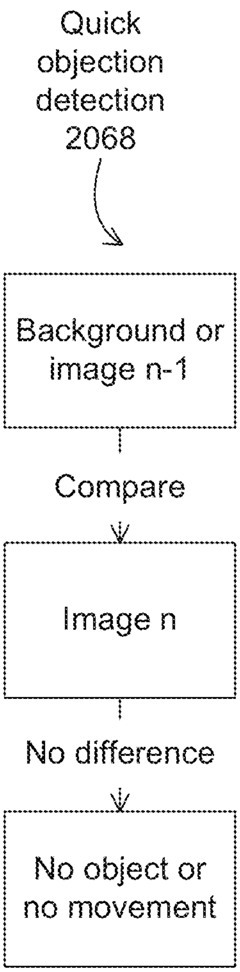
FIGS. 20A-20B illustrate a screening process for frame-to-frame changes according to some embodiments.
Figure 20B:
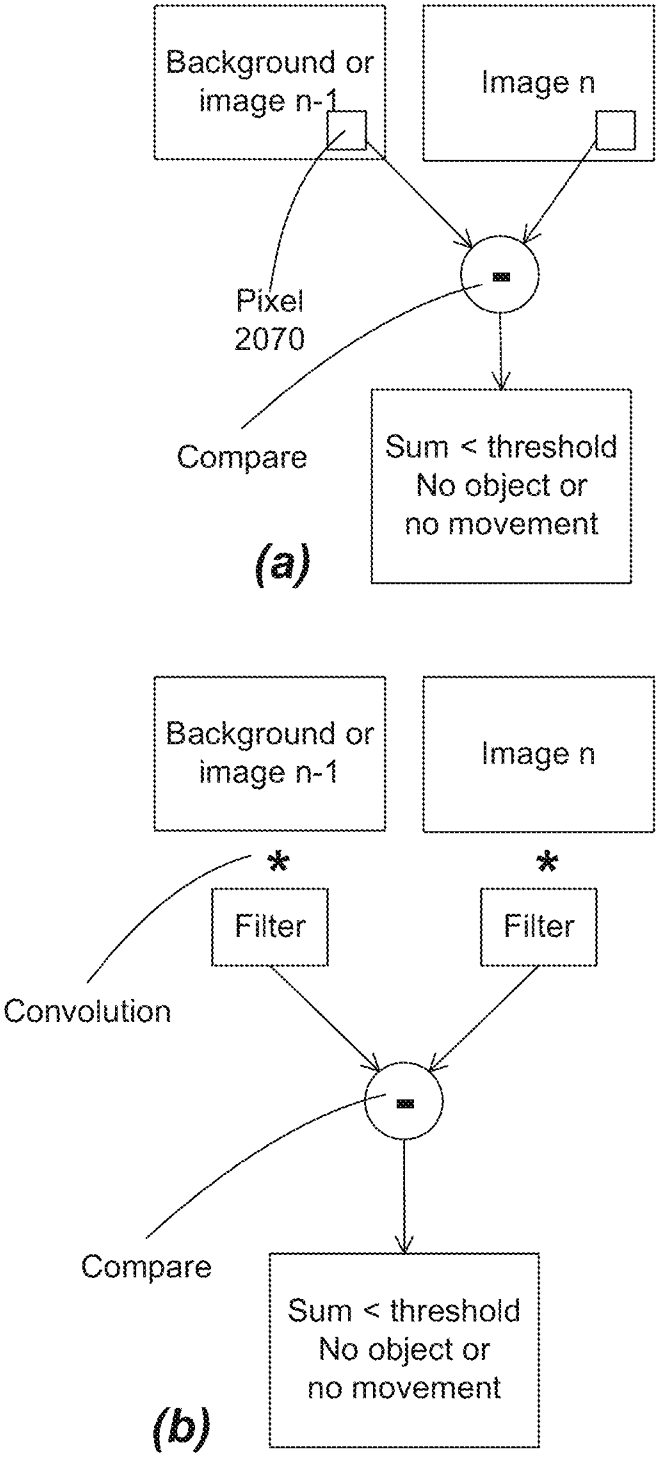

FIGS. 20A-20B illustrate a screening process for frame-to-frame changes according to some embodiments. FIG. 20A shows a quick object detection process 2068. The quick object detection process can include a comparison of a newly captured image from each camera of a camera array with either a background image or with a previously captured image from a same camera. If there is no difference, there are no objects or no movements in the newly capture image.

FIG. 20B(a) shows a pixel to pixel comparison process. Each pixel 2070 from a newly captured image from a camera is compared with a corresponding pixel of either a background image or of a previously captured image from a same camera. The sum of all the pixel differences can be compared to a threshold value to determine whether there is an object or a movement for the newly captured image.

FIG. 20B(b) shows a convolutional comparison process. The newly captured image and either a background image or a previously captured image from a same camera are convoluted with a spatial gradient, and the results summed up. The sum can be compared to a threshold value to determine whether there is an object or a movement for the newly captured image.

FIG. 21 illustrates a method for operating an MCAM for object tracking according to some embodiments. Operation 2103 captures images from cameras. Operation 2104 sends to one or more processors, with each camera data sent to one processor. The one or more processors can include multiple processors, with each processor coupled to a camera for processing image data from the camera. The one or more processors can include one processor, with the processor having multiple devices with each device coupled to a camera for processing image data from the camera. For example, the one processor can be an FPGA having multiple connected circuits with each circuit coupled to a camera. There can be no cross signals between the multiple processors or devices of the processor.

Operation 2105 processes captured image data for each camera in parallel to find cameras that the captured image data not detecting any objects, e.g., to determine an absence or presence of an object, such as only containing background image data, showing no frame-to-frame change, showing no area with significant deviation with respect to the background, or detecting no object. The process is configured to detect a presence of an object, detecting whether or not there is an object, and not to detect an object, e.g., detecting locations of the object. The object present detection process can be faster than the object detection process, for example, the object present detection process can only observe changes in intensity in local areas or in whole frame, without the need for a detailed analysis to find the object.

Operation 2106 sends the captured image data from the cameras not detecting any objects to a central processor. For example, the captured data can be sent to a parallel to serial device, such as an FPGA, which can stream the multiple image streams from the cameras to the central processor. The parallel to serial device can be input controllable, e.g., the device can determine which input image streams to be used for forming the serial data stream. The input controlled characteristic of the parallel to serial device can be performed by programming the FPGA, which can allow the FPGA to only send image data from cameras detecting the presence of an object.

Thus, the one or more processors coupled to the cameras can be used for screening the image data from the cameras to only processing the image data having objects.

Operation 2107 detects objects or partial objects in the captured images in sequence. Operation 2108 merge or remove duplicate objects across neighbor cameras. Operation 2110 determines characteristics to reject detected objects not meeting the input object data. Operation 2111 forms bounding boxes and locations for the objects meeting the characteristics of the input object data. Operation 2112 transforms objects in bounding boxes. Operation 2114 analyzes the objects in details. Operation 2115 repeats as a function of time for tracking. Operation 2116 forms tracking data including movements and other actions of objects FIG. 22 illustrates a process for forming an MCAM system for object tracking according to some embodiments. The process includes forming an MCAM system for tracking objects in a sample. The MCAM system includes multiple cameras configured to capture images of different portions of the sample, one or more light source configured to provide irradiation to the sample, and a controller configured to process image data from the captured images.

The multiple cameras are disposed on a board, with each camera coupled to a processor or a device configured to detect a presence or an absence of objects in the captured images, such as only containing background image data, showing no frame-to-frame change, showing no area with significant deviation with respect to the background, or detecting no object.

The processors are coupled to the controller to deliver the captured image data from the camera detecting the presence of an object in a serial data stream. The processors can be disposed on the board, or disposed on a separate element. The processors can be configured to be multiple separate devices, with each device of the multiple separate components coupled to a camera. Alternatively, the processors are configured to be in one or more devices, with each device of the one or more devices including one or more processors of the processors for coupling to one or more cameras. Alternatively, the processors configured to be in a single component, with the single component coupled to the multiple cameras.

The controller can be configured to form tracking data including movements of objects detected from the captured images sent to the controller.

Figure 23A:
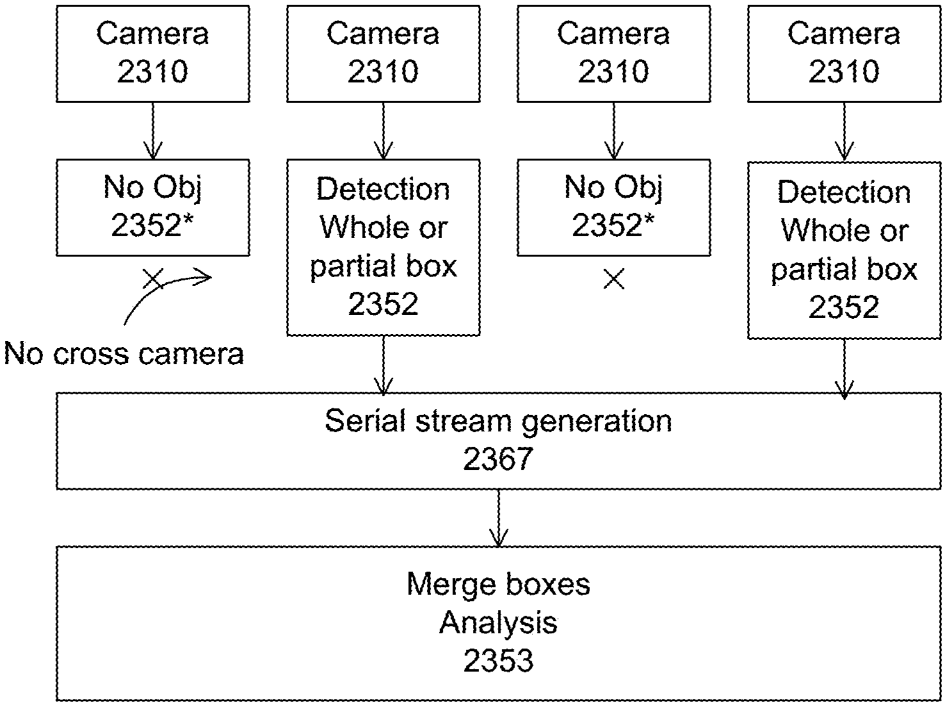
FIGS. 23A-23C illustrate configurations of an MCAM having multiple pre-processors according to some embodiments.
Figure 23B:
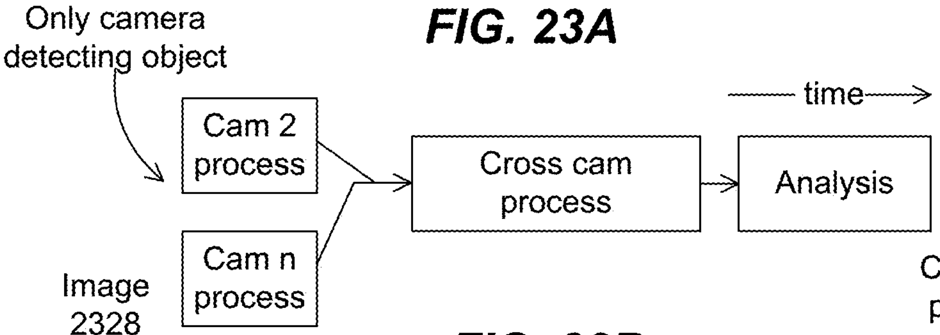
Figure 23C:
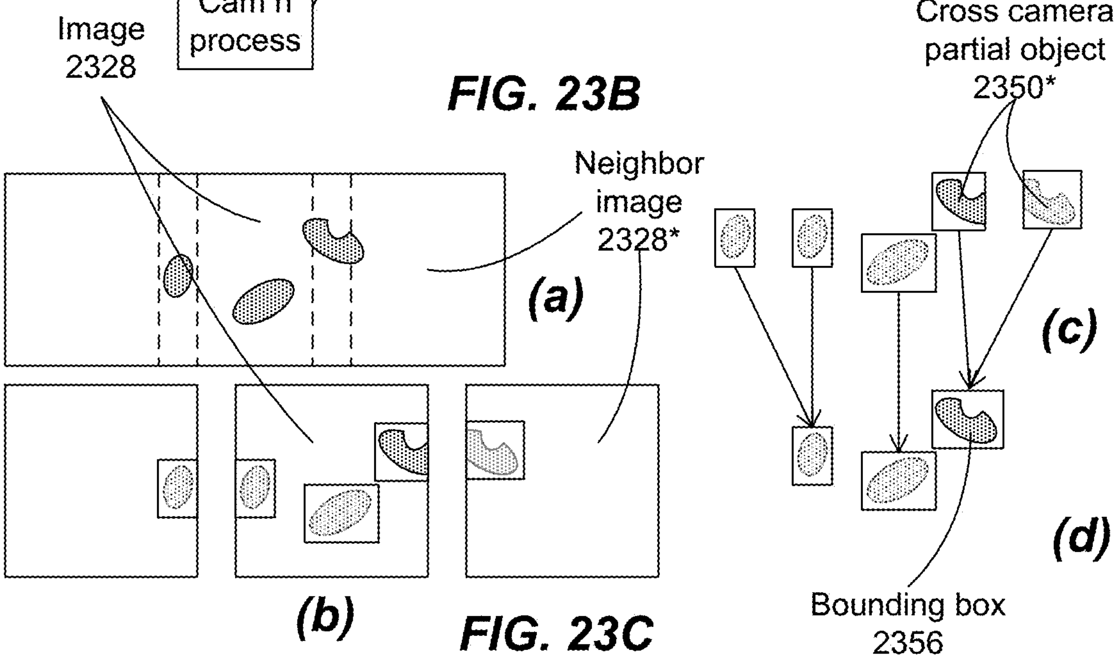

FIGS. 23A-23C illustrate configurations of an MCAM having multiple pre-processors according to some embodiments. An MCAM system can include multiple cameras with each camera coupled to a pre-processor, e.g., to a processor configured to process the image data before sending to a central processor. The multiple pre-processors are then coupled to a parallel to serial device, such as an FPGA, which is coupled to a processor (or controller). The FPGA is configured to converting parallel image data streams from the pre-processors to a serial data image stream to the processor.

In some embodiments, the pre-processors are configured to detect objects or partial objects in the captured images, and forming bounding boxes around the detected objects or partial objects. The bounding boxes data are then sent to the processor 2342 for analysis. Image data without objects are not sent. In addition, areas around the objects in image data having objects are also not sent. The processor 2342 is configured to perform cross camera analysis on the bounding boxes, together with tracking and analysis of the objects.

FIG. 23A shows a data flow of the image data. The image data from the cameras 2310 are sent in parallel to the pre-processors 2341, which can perform an object detection process, and form bounding boxes around detected objects. The bounding box data are sent to the FPGA 2367, which performs a parallel to serial conversion. The serial data stream is then sent to the processor, e.g., to a memory of the processor, for analysis, including 2352 merging to form bounding boxes in time sequence, and tracking and analyzing objects.

FIG. 23B shows a time line of the MCAM operation. Image data from the pre-processors showing detected objects in bounding boxes are sent to the main processor to be processed in sequence. The detected objects can be subjected to an across camera analysis to merge objects and to remove duplicated objects across the cameras. The objects in bounding boxes can be analyzed, such as motion tracking and object analysis.

FIGS. 23C(a)-23C(c) show a cross camera process for merging and for removing duplicates. In FIG. 23C(a), images from neighbor cameras are captured. In FIG. 23C(b), the captured images are processed in pre-processors coupled to the cameras to detect objects or partial objects 2350*. In FIG. 23C(c), the detected objects or partial objects 2350* are merged with the duplicated portions removed. In FIG. 23C(d), bounding boxes are formed around the merged objects, which can include locations and dimensions of the objects.

FIG. 24 illustrates a method for operating an MCAM for object tracking according to some embodiments. Operation 2403 captures images from cameras. Operation 2404 sends the captured images to one or more processors, with each camera data sent to one processor. Operation 2405 processes captured image data for each camera in parallel, wherein the processing includes detecting objects or partial objects in the captured images from individual cameras. Operation 2405A forms bounding boxes around the detected objects or partial objects. Operation 2406 sends the bounding boxes to a central processor. Operation 2408 merge or remove duplicate bounding boxes across neighbor cameras to form composite bounding boxes. Operation 2410 determines characteristics to reject detected objects not meeting the input object data. Operation 2411 accepts composite bounding boxes for the objects meeting the characteristics of the input object data. Operation 2412 transforms objects in the accepted composite bounding boxes. Operation 2414 analyzes the objects. Operation 2415 repeats as a function of time for tracking. Operation 2416 forms tracking data including movements and other actions of objects.

FIG. 25 illustrates a process for forming an MCAM system for object tracking according to some embodiments. The process includes forming an MCAM system for tracking objects in a sample. The MCAM system includes multiple cameras configured to capture images of different portions of the sample, one or more light source configured to provide irradiation to the sample, and a controller configured to process image data from the captured images. The multiple cameras are disposed on a board, with each camera coupled to a processor configured to detect objects or partial objects in the captured images from the each camera.

The processor is configured to form bounding boxes around the detected objects or partial objects. The processors are coupled to the controller to deliver the bounding boxes in a serial data stream. The processors are disposed on the board, or disposed on a separate element. The processors are configured to be multiple separate components, with each component of the multiple separate components coupled to a camera. Alternatively, the processors are configured to be in one or more components, with each component of the one or more components including one or more processors of the processors for coupling to one or more cameras. Alternatively, the processors configured to be in a single component, with the single component coupled to the multiple cameras.

The controller can be configured to merge or remove duplicate bounding boxes across neighbor cameras to form composite bounding boxes. The controller can be configured to determine characteristics, including dimensions and shapes, of detected objects, comparing the characteristics with the input object data, and rejects detected objects not meeting the input object data. The controller can be configured to accept composite bounding boxes for the objects meeting the characteristics of the input object data. The controller can be configured to form tracking data including movements of objects detected from the captured images sent to the controller.

Figure 26A:
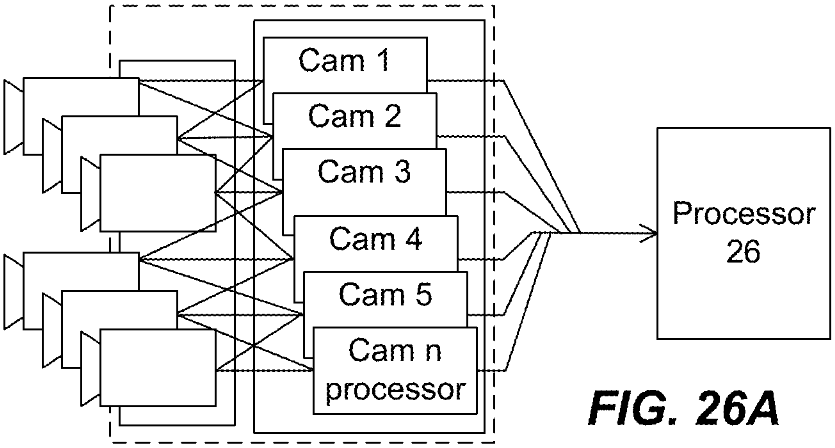
FIGS. 26A-26C illustrate configurations of an MCAM having multiple pre-processors according to some embodiments.
Figure 26B:
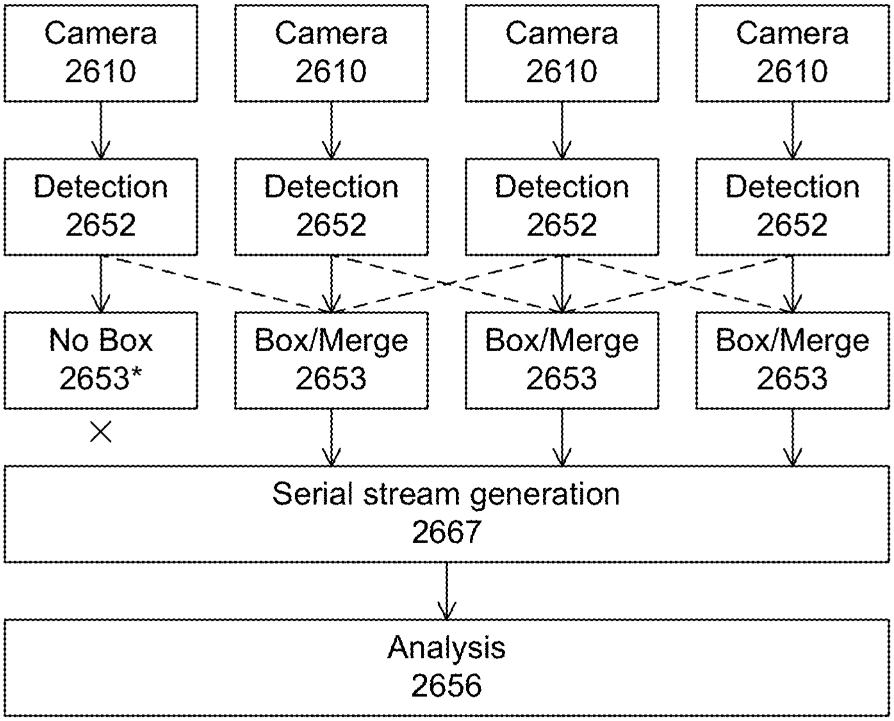
Figure 26C:
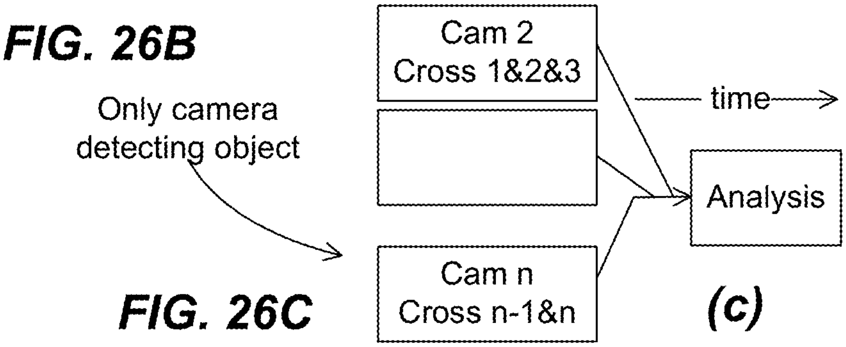

FIGS. 26A-26C illustrate configurations of an MCAM having multiple pre-processors according to some embodiments. FIG. 26A shows an MCAM system having multiple cameras with each camera coupled to one or more neighbor pre-processors. The multiple pre-processors are then coupled to a parallel to serial device, such as an FPGA, which is coupled to a processor (or controller). The FPGA is configured to converting parallel image data streams from the pre-processors to a serial data image stream to the processor.

In some embodiments, the pre-processors are configured to detect objects in the captured images, and forming bounding boxes around the detected objects. Since the pre-processors are also connected to neighbor cameras, the cross camera analysis to merge and to remove duplicates can be performed at the pre-processors to form bounding boxes around the detected objects. The bounding boxes data are then sent to the processor 2642 for analysis. Image data without objects are not sent. In addition, areas around the objects in image data having objects are also not sent. The processor 2642 is configured to perform tracking and analysis of the objects.

FIG. 26B shows a data flow of the image data. The image data from the cameras 2610 are sent in parallel to the pre-processors 2641, which can perform an object detection process, and form bounding boxes around detected objects after the cross camera analysis. The pre-processors are also connected to neighbor cameras, and thus, the pre-processors are capable of performing cross camera analysis to merge and to remove duplicates 2653 and 2653*, e.g., to form bounding box of complete objects.

The bounding box data are sent to the FPGA 2667, which performs a parallel to serial conversion. The serial data stream is then sent to the processor, e.g., to a memory of the processor, for analysis, including 2652 tracking and analyzing the objects.

FIG. 26C shows a time line of the MCAM operation. Image data from the pre-processors showing detected objects in bounding boxes are sent to the main processor to be processed in sequence. The pre-processors can also perform an across camera analysis to merge objects and to remove duplicated objects across the cameras. The objects in bounding boxes can be analyzed, such as motion tracking and object analysis.

There are two primary advantages of implementing object detection and tracking on the pre-processors. First is the data reduction at standard frame rates. In some embodiments, a full image from one sensor has between 10-20 million pixels. If object detection is implemented and only 3 objects are identified, each taking up 10,000 pixels, then the total number of pixels that will be passed to the computer is just 30,000, which is much less than the full frame. Second, data reduction is possible with increased frame rate. Many image sensors allow for a region of interest within the sensor's imaging area to be specified for acquisition, which reduces the amount of data the sensor needs to output to the FPGA per frame. This, therefore, allows the sensor to output video streams at increased frame rates. The FPGA, which is tracking model organisms in real-time, would be able to configure the sensors to output only the range of pixels that encompass the tracked organism, thereby increasing the frame rate of video acquisition as well as reducing the amount of data the FPGA needs to analyze to detect and track the model organisms in the next detection cycle. This would not only help the tracking algorithm detect model organisms in the image data more quickly and accurately, but it would provide for the user high frame-rate video footage, which is useful, if not necessary, for studies investigating motor function, neural activity, and behavior among other things.

In some embodiments, the frame rate of the cameras can be controlled, for example, by a main processor or a controller, based on the data transfer rate of the parallel to serial device. High camera frame rate can be set for low data transfer rate, which is related to the number of detected organisms in the sample. The optimum frame rate can be the frame rate corresponded to the maximum data transfer rate of the parallel to serial device, e.g., the FPGA between the pre-processors and the main processor.

FIG. 27 illustrates a method for operating an MCAM for object tracking according to some embodiments. Operation 2703 captures images from cameras. Operation 2704 sends the captured images to one or more processors, with each processor receiving captured images from a first camera and from second cameras neighboring the first camera. Operation 2705 processes captured image data for each processor in parallel, wherein the processing includes detecting objects or partial objects in the captured images from individual cameras. Operation 2708 merge or remove duplicate detected objects or partial objects across neighbor cameras to form bounding boxes. Operation 2710 determines characteristics to reject detected objects not meeting input object data. Operation 2711 accepts bounding boxes for the objects meeting the characteristics of the input object data. Operation 2706 sends the bounding boxes to a central processor. Operation 2712 transforms objects in the accepted composite bounding boxes. Operation 2714 analyzes the objects. Operation 2715 repeats as a function of time for tracking. Operation 2716 forms tracking data including movements and other actions of objects.

FIG. 28 illustrates a process for forming an MCAM system for object tracking according to some embodiments. The process includes forming an MCAM system for tracking objects in a sample. The MCAM system includes multiple cameras configured to capture images of different portions of the sample, one or more light source configured to provide irradiation to the sample, and a controller configured to process image data from the captured images.

The MCAM system further includes one or more processors coupled to the multiple cameras, with each processor coupled to a first camera and second cameras neighboring to the first camera. Each processor is configured to detect objects or partial objects in the captured images from the first camera. Each processor is configured to merge the detected partial objects or remove the objects or the partial objects duplicated with the second cameras. Each processor is optionally configured to reject objects of the objects or the merged objects not meeting characteristics of input object data, Each processor is configured to form bounding boxes around the non-rejected objects and merged objects.

The processors are coupled to the controller to deliver the bounding boxes in a serial data stream. The multiple cameras and the one or more processors are disposed on a board, Alternatively, the multiple cameras are disposed on a board and the one or more processors are disposed on a separate element.

The processors are configured to be multiple separate components, with each component of the multiple separate components coupled to a camera. Alternatively, the processors are configured to be in one or more components, with each component of the one or more components including one or more processors of the processors for coupling to one or more cameras. Alternatively, the processors configured to be in a single component, with the single component coupled to the multiple cameras.

The controller can be optionally configured to reject objects of the objects or the merged objects not meeting characteristics of input object data, The controller can be configured to form bounding boxes around the non-rejected objects and merged objects. The controller can be configured to form tracking data including movements of objects detected from the captured images sent to the controller.

In some embodiments, the present invention discloses a microscope technology that offers the ability to track and image organisms in large areas in 2D or 3D. The technology include multiple cameras having overlapped fields of view, which can be utilized for depth determination using stereoscopy of photogrammetry. For example, tuning the microscope to an large amount of field of view overlap, such as at least 50% in one direction, can enable the MCAM system to perform 3D object tracking and 3D organism behavior analysis across a finite depth range, which is useful in certain applications of model organism behavioral study.

After tuning to larger than 50% overlap, all areas of the sample are overlapped by two or more cameras. In the overlap areas, optical information about points within the specimen plane are captured by two or more cameras. Such redundant information can be used by stereoscopic and/or photogrammetry methods to obtain an estimate of object depth and/or an object depth map, which can be combined with the 2D information that is captured about object position and morphology.

With the larger than 50% overlap, all areas in the sample are captured by the cameras in two or more images. The captured images can be processed to obtain 3D positions of the objects, for example, by inputting the image data into a 3D object detection convolutional neural network (CNN), which employs stereoscopic or photogrammetry in the feature kernels.

Figure 29A:
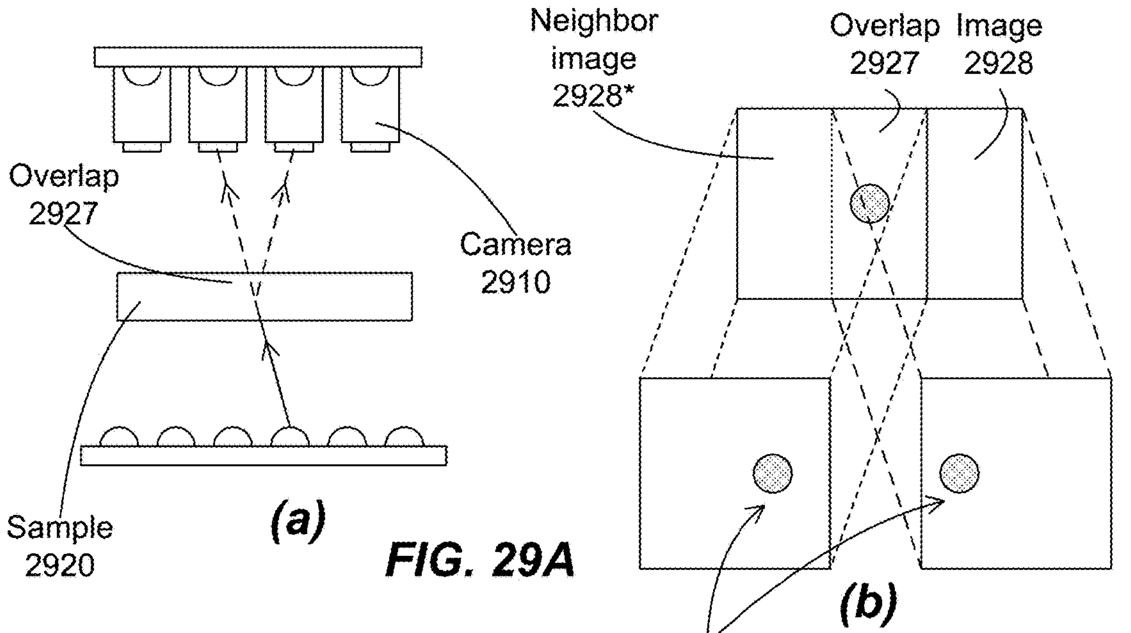
FIGS. 29A-29C illustrate processes for 3D location determination according to some embodiments.
Figure 29B:
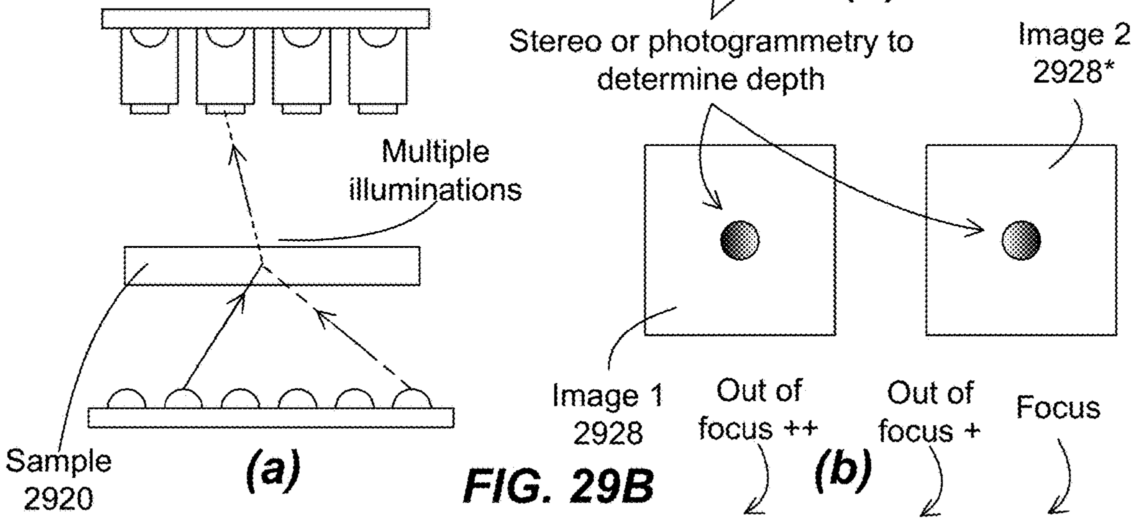
Figure 29C:
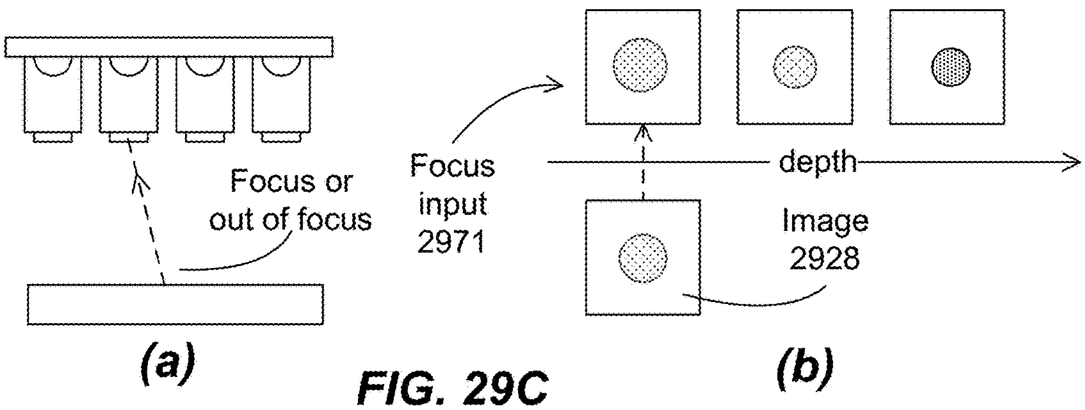

FIGS. 29A-29C illustrate processes for 3D location determination according to some embodiments. In FIG. 29A(a), an overlap point 2927 in a sample 2920 can be imaged by two adjacent cameras 2910 of an MCAM system. By tuning the MCAM to have 50% or larger overlap between neighbor cameras, all areas of the sample can be imaged by more than one camera. FIG. 29A(b) shows a stereoscopic process for determine depth information of an object from two images 2928 and 2928* captured by two adjacent cameras, e.g., the object is located in the overlap area 2927 of the two adjacent cameras. The disparity between the same object in two images can be used to determine the depth of the object, for example, by triangulation process using the focus lengths of the cameras and the baseline, e.g., the distance between the cameras.

In FIG. 29B(a), a point in a sample 2920 can be imaged two times by a same camera using two different illumination patterns of an MCAM system. Using multiple illumination patterns, the MCAM does not need to have 50% or larger overlap fields of view, even though the higher the overlap fields of view, the higher depth accuracy can be achieved. FIG. 29B(b) shows a stereoscopic process for determine depth information of an object from two images captured a same camera. Phase difference between the light paths can be used to determine the depth of the object.

In FIG. 29C(a), a point in a sample can be imaged by a camera of an MCAM system. The out-of-focus information of the object in the image can be used to determine the depth information of the object. FIG. 29C(b) shows a process for determine depth information of a out-of-focus object by comparing the object image with a focus input 2971 containing object images at different levels of focus.

In some embodiments, an MCAM system can be tuned to have 50% or larger overlap field of view for 3D object tracking. The overlap amount can be changed by changing the magnification of the cameras or the fields of view of the cameras. For example, decreasing the magnification of each camera can increase the inter-camera overlap for the MCAM system.

Figure 30A:
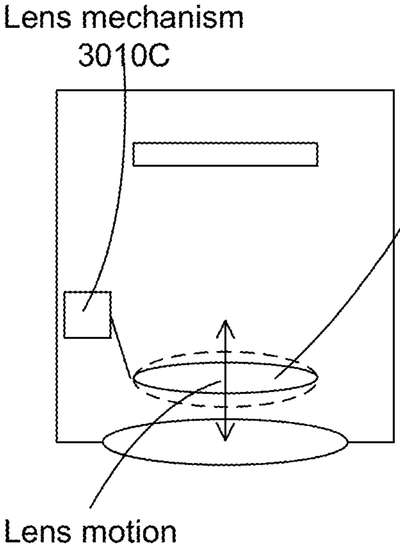
FIGS. 30A-30D illustrate camera configurations according to some embodiments.
Figure 30B:
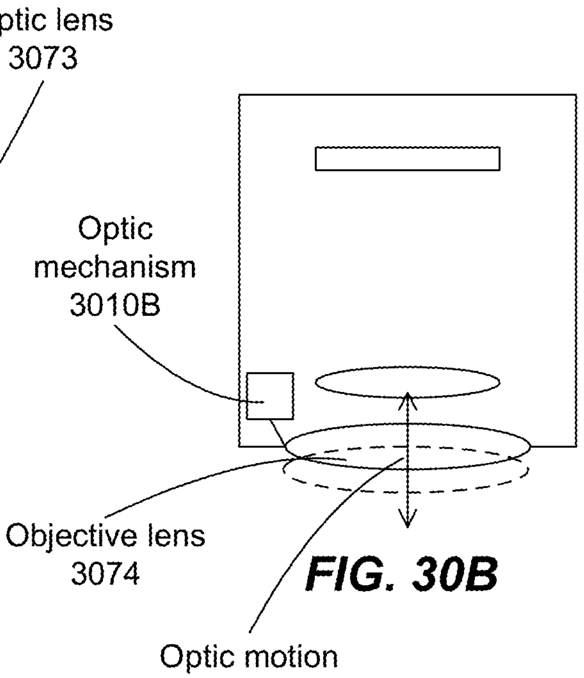
Figure 30C:
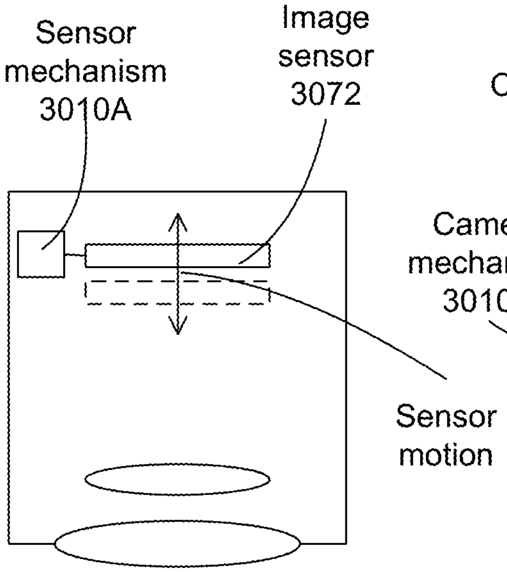
Figure 30D:
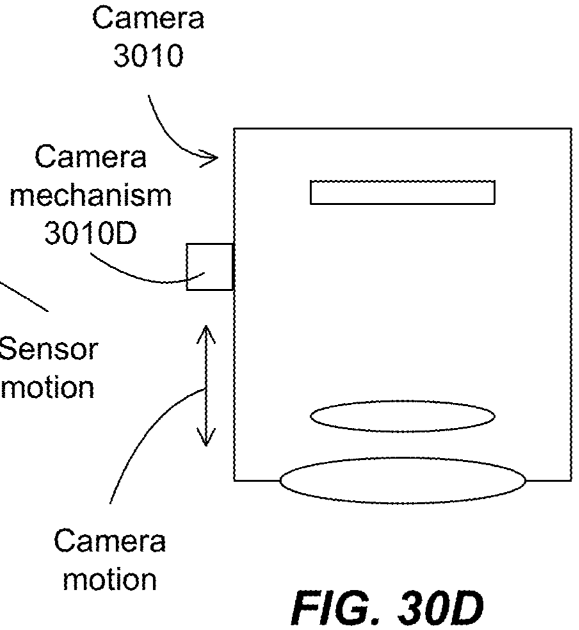

FIGS. 30A-30D illustrate camera configurations according to some embodiments. In FIG. 30A, a camera can have a lens mechanism 3010C for adjusting positions of an optical lens 3073, which can change the magnification of the camera. In FIG. 30B, a camera can have an optic mechanism 3010B for adjusting positions of an objective lens 3074, which can change the magnification of the camera. In FIG. 30C, a camera can have a sensor mechanism 3010A for adjusting positions of an image sensor 3072, which can change the magnification of the camera. In FIG. 30D, a camera can be coupled to a camera mechanism 3010D for adjusting positions of the camera 3010, which can change the magnification of the camera. The change in magnification of the camera can change the overlapped field of view of the cameras of the MCAM, allowing tuning the MCAM to have 50% or more FOV overlap for 3D object tracking.

In some embodiments, the MCAM can include a mechanism for toggling between 2D tracking and 3D tracking, for example, by changing the magnification of the cameras to obtain between 50% or less or 50% or more FOV overlap.

In some embodiments, the MCAM can be tuned to 50% or more FOV overlap for both 2D and 3D object tracking. The 50% or more FOV overlap can enable 3D object tracking, and does not affect the ability of the MCAM for 2D object tracking.

Figure 31A:
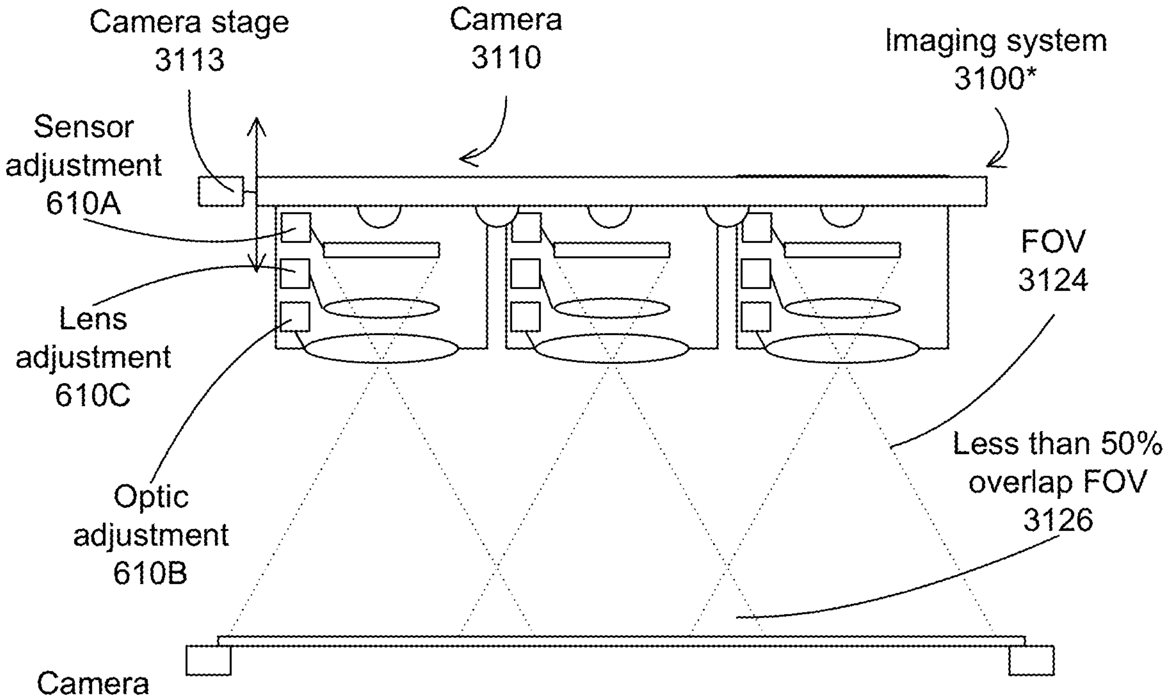
FIGS. 31A-31B illustrate a process for adjusting FOV overlap according to some embodiments.
Figure 31B:
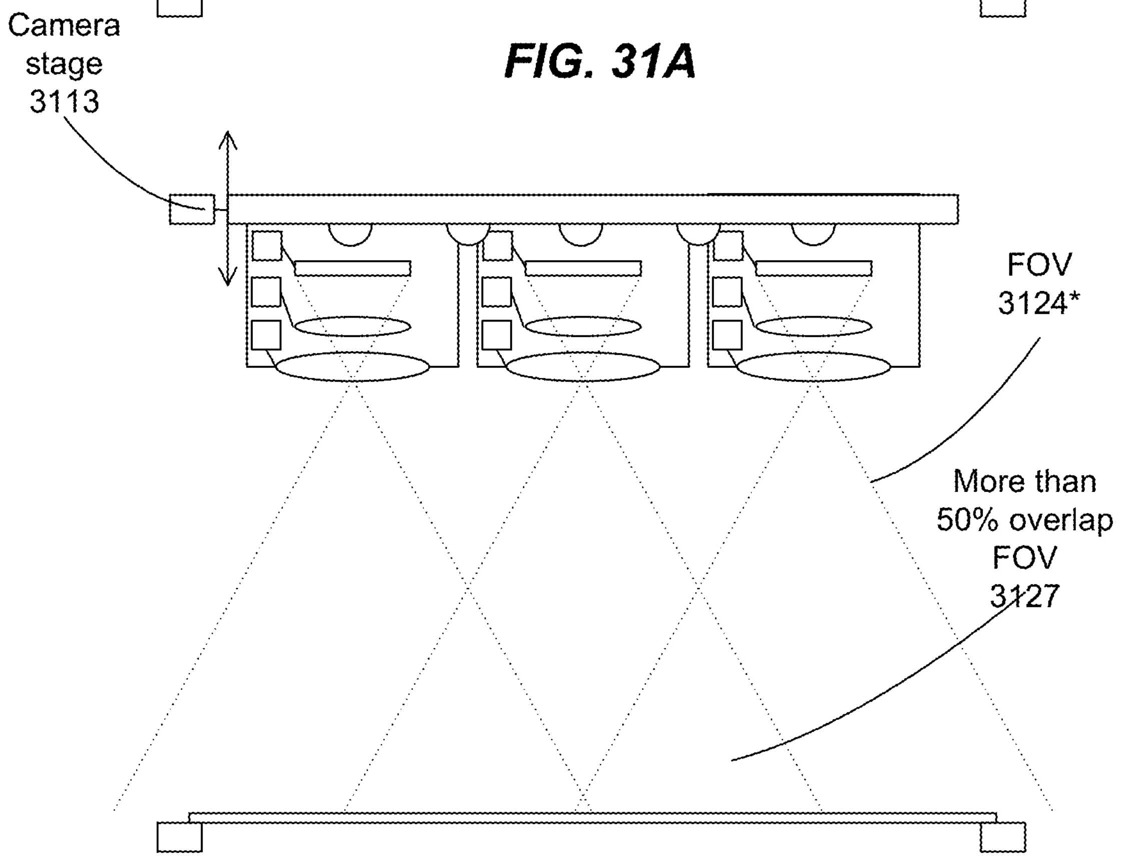

FIGS. 31A-31B illustrate a process for adjusting FOV overlap according to some embodiments. In FIG. 31A, an MCAM 3100 can have multiple cameras 3110 coupled to a camera stage 3113. The camera stage 3113 can be adjusted, e.g., to move the cameras relative to the sample. Each camera can have a sensor adjustment mechanism 3110A for adjusting positions of the image sensor, a lens adjustment mechanism 3110C for adjusting positions of the optical lens, and an optic adjustment mechanism 3110B for adjusting positions of the objective lens. Each camera can have a field of view 3124. The cameras can have less than 50% overlapped field of view 3126.

With less than 50% FOV overlap, the MCAM is tuned for 2D object tracking, e.g., maximizing the sample area or maximizing the magnification of the sample.

In FIG. 31B, the camera stage 3113 is adjusted to have a larger field of view 3124* and a larger than 50% overlapped field of view 3127. Alternatively, the larger than 50% overlapped field of view can be achieved by adjusting the sensor adjustment mechanism, the lens adjustment mechanism, or the optic adjustment mechanism.

With more than 50% FOV overlap, the MCAM is tuned for 3D object tracking. The MCAM can be set to more than 50% FOV overlap for both 2D and 3D object tracking.

In some embodiments, the MCAM can include a mechanism for toggling between 2D tracking and 3D tracking, for example, by adjusting the camera stage, the sensor adjustment mechanism, the lens adjustment mechanism, or the optic adjustment mechanism.

Figure 32A:
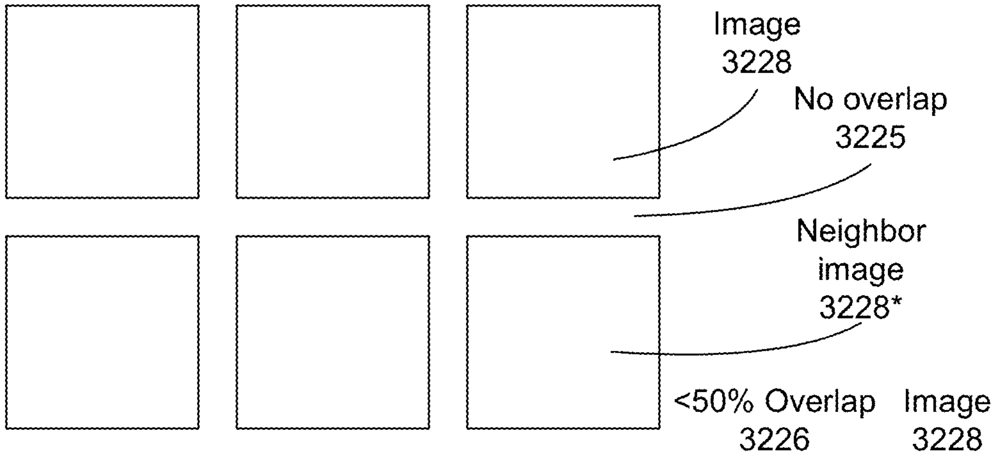
FIGS. 32A-32C illustrate overlapping configurations for an MCAM according to some embodiments.
Figure 32B:
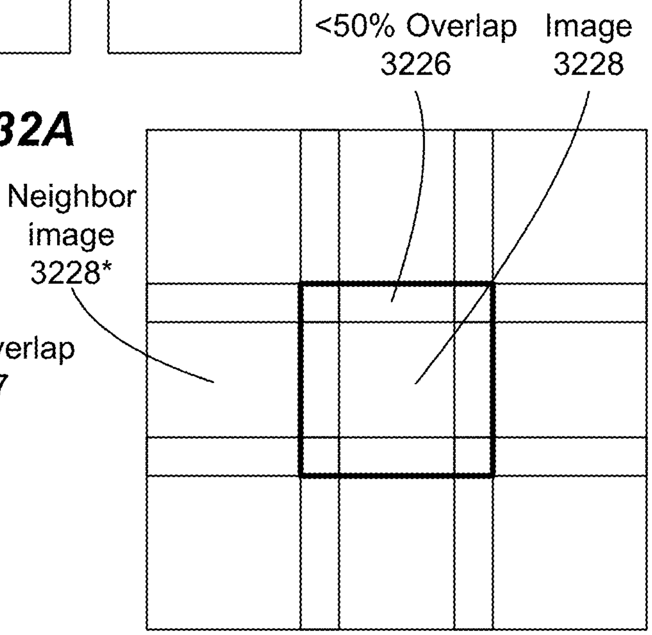
Figure 32C:
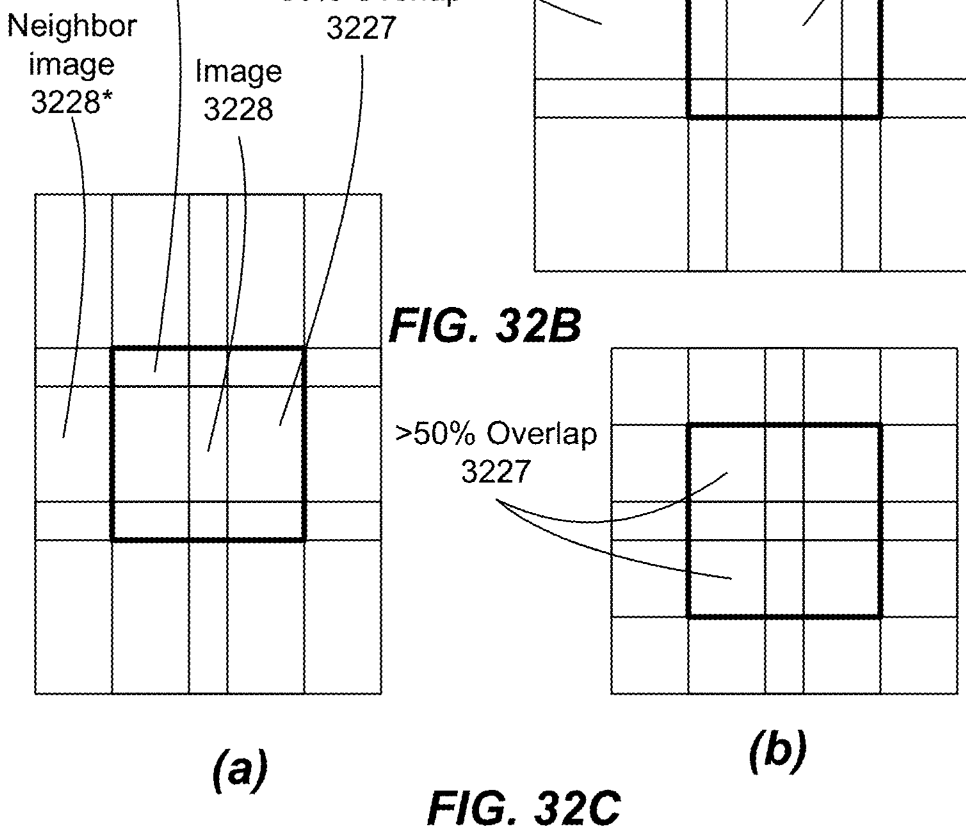

FIGS. 32A-32C illustrate overlapping configurations for an MCAM according to some embodiments. In FIG. 32A, an MCAM can have multiple cameras configured to capture images 3228 and 3228* with no overlap 3225 between the images, or without overlap between at least two images. In FIG. 32B, an MCAM can have multiple cameras configured to capture images 3228 and 3228* with 50% or less overlap 3226 between the images, or with 50% or less overlap 3226 between at least two images. In FIG. 32C(a), an MCAM can have multiple cameras configured to capture images 3228 and 3228* with 50% or less overlap 3226 between images in one direction, and with 50% or more overlap 3227 between images in another direction. In FIG. 32C(b), an MCAM can have multiple cameras configured to capture images 3228 and 3228* with 50% or more overlap 3227 between images in two directions.

FIGS. 33A-33C illustrate toggle processes for an MCAM for object tracking according to some embodiments. In FIG. 33A, operation 3300 changes at least a characteristic of individual cameras, a camera stage, or a sample support of an MCAM to toggle between non-overlapped field of view, less than 50% overlapped field of view, and 50% or more overlapped field of view of adjacent cameras on a sample supported by the stage support.

Changing at least a characteristic of individual cameras includes changing a magnification or a field of view of individual cameras in the MCAM. Changing at least a characteristic of a camera stage includes moving the camera stage relative to the sample support. Changing at least a characteristic of a sample support includes moving the sample support relative to the camera stage.

In FIG. 33B, operation 3310 changes at least a characteristic of individual cameras, a camera stage, or a sample support of an MCAM to provide 50% or more overlapped field of view of adjacent cameras on a sample supported by the sample support. Operation 3311 captures images from the cameras. Operation 3312 detects objects from the captured images in 3D based on the 50% or more overlapped field of view of the adjacent cameras. Operation 3313 tracks movements or other actions of the detected objects in 3D.

In FIG. 33C, operation 3320 changes at least a characteristic of individual cameras, a camera stage, or a sample support of an MCAM to provide less than 50% overlapped field of view of adjacent cameras on a sample supported by the sample support. Operation 3321 captures images from the cameras. Operation 3322 detects objects from the captured images in 2D based on the less than 50% overlapped field of view of the adjacent cameras. Operation 3323 tracks movements or other actions of the detected objects in 2D.

FIG. 34 illustrates a method for operating an MCAM for object tracking according to some embodiments. Operation 3403 captures images from cameras, and sends to one or more processors, with each camera data sent to one pre-processor or all camera data streams to a central processor. The captured images include information for 3D image construction. Operation 3404 optionally pre-processes captured image data for each camera in parallel.

The optional pre-process includes finding excluded cameras that the captured image data not detecting any objects, such as only containing background image data, showing no frame-to-frame change, or detecting no object. Alternatively, the optional pre-process includes detecting objects, and forming bounding boxes in 3 dimensions around the detected objects. Operation 3405 sends the image data captured by the cameras or optionally pre-processed by the pre-processors to the central processor.

The image sending includes sending image data captured by the cameras, as a serial data stream to a memory of the central processor to be processed. Alternatively, the image sending includes sending image data captured by the cameras excluding image data from the excluded cameras. Alternatively, the image sending includes sending bounding box image data pre-processed by the pre-processors, as a serial data stream to a memory of the central processor.

Operation 3406 detects objects or partial objects in the captured images from individual cameras in 3 dimensions. Operation 3407 merge or remove duplicate objects across neighbor cameras. Operation 3408 determines characteristics of detected objects, compares the characteristics with the input object data, and rejects detected objects not meeting the input object data. Operation 3410 forms bounding boxes and locations in 3 dimensions for the objects meeting the characteristics of the input object data. Operation 3413 analyzes the objects. Operation 3414 repeats as a function of time for tracking. Operation 3415 forms tracing data including movements and other actions of objects.

FIG. 35 illustrates a process for forming an MCAM system for object tracking according to some embodiments. The process includes forming an MCAM system for tracking objects in a sample. The MCAM system includes a multiple cameras configured to capture images of different portions of the sample, one or more light sources configured to provide irradiation to the sample, and a controller configured to process image data from the captured images. The multiple cameras are configured so that the captured images include information for 3D image construction, such as at least two cameras of the multiple cameras include more than 50% overlapping field of view, or the captured images include images captured through multiple illumination patterns generated by the one or more light sources.

The controller can be configured to accept inputs related to the objects being tracked, with the inputs including at least object shapes, dimensions and characteristics, object types, object identification.

The controller can be configured to detect objects or partial objects in the captured images from individual cameras in 3 dimensions. The controller can be configured to merge or remove duplicate objects across neighbor cameras. The controller can be configured to determine characteristics to reject detected objects not meeting the input object data. The controller can be configured to form bounding boxes and locations in 3 dimensions for the objects meeting the characteristics of the input object data.

The controller can be configured to transform objects in bounding boxes, including centering the objects and translating, rotating, skewing, enlarging, or reducing the objects to conform to a same size and orientation. The controller can be configured to analyze the objects. The controller can be configured to form tracking data including movements of the objects.

What is claimed is:

1. A microscope comprising:

a plurality of cameras;

wherein each camera unit of the plurality of cameras is configured to capture one or more images of a region of a sample;

one or more radiation sources;

wherein the one or more radiation sources are configured to illuminate the sample;

one or more excitation sources;

wherein the one or more excitation sources are configured to affect an organism in the sample;

a processor;

wherein the processor is configured to control the one or more radiation sources to create one or more illumination patterns to the sample;

wherein the processor is configured to control the plurality of camera units to capture images of the sample under the one or more illumination patterns;

wherein the processor is configured to track changes of the organism caused by the one or more excitation sources across the plurality of cameras;

a second processor coupled between the plurality of cameras and the processor;

wherein the second processor comprises multiple devices with each device coupled to a camera of the plurality of cameras for processing image data captured by the camera;

wherein the second processor is configured to from a serial data stream to the processor from multiple parallel data streams outputted from the multiple devices;

wherein the each device is configured to determine if the organism is present in the images captured by the camera;

wherein the processor is configured to receive only images from cameras showing a presence of the organism:

wherein one of:

determining if the organism is present comprises calculating a frame to frame change between a newly captured image and a background image or a previously captured image; or determining if the organism is present comprises detecting if there is a finite area in a newly captured image with a deviation greater than a threshold value with respect to a background image or to a previously captured image; or determining if the organism is present comprises detecting the organism in the captured images.

2. A microscope as in claim 1;

wherein the processor is configured to store pre-measured information of the Micro-Camera Array Microscope (MCAM) system;

wherein the pre-measured information comprises at least one of:

distances between cameras of the plurality of cameras;

a distance between a camera and the sample;

focal lengths of lenses in the cameras;

a distance between the lenses and image sensors in the cameras;

dimensions in pixels of the image sensors of the cameras;

a pixel pitch of the image sensors; or a number of rows and columns of pixel overlap between neighbor cameras;

wherein the processor is configured to store feature information of a target organism to be tracked;

wherein the feature information comprises at least one of:

detection filters;

convolutional neural network weights; or shapes, dimensions, or aspect ratios of the target organism.

3. A microscope as in claim 1;

wherein each camera of the plurality of cameras is a micro-camera assembled on a printed circuit board.

4. A microscope as in claim 1;

wherein the one or more excitation sources are configured to affect a local area of the sample or all areas of the sample to be imaged by the plurality of cameras; and wherein the one or more excitation sources are configured to provide a time-variation signal, a continuous signal, one pulse, a series of pulses, or a periodic series of pulses to the sample.

5. A microscope as in claim 1;

wherein the one or more excitation sources comprise at least one of an acoustic source configured to provide an acoustic signal, a voice coil, a radiation source configured to provide a visible, infrared or ultraviolet light, a fluorescence excitation source configured to provide a fluorescent excitation signal, an olfactory source, an injector configured to inject a chemical or biochemical material, a vibration source or a manipulator configured to provide a disturbance to a medium of the sample, or a display screen.

6. A microscope as in claim 1;

wherein tracking changes of the organisms comprises detecting the organism in the captured images;

wherein detecting the organism comprises locating and drawing bounding boxes around the detected organism; and wherein detecting the organism comprises performing an edge detection process, a projection process, or a convolutional neural network process.

7. A microscope as in claim 1;

wherein tracking changes of the organism comprises merging organisms detected from the captured images across the plurality of cameras; and wherein merging the organism comprises forming an organism from the detected organisms.

8. A microscope as in claim 1;

wherein tracking changes of the organism comprises resolving duplicated organisms in overlapped areas between cameras of the plurality of cameras; and wherein resolving duplicated organism comprises removing duplicated organisms appeared in captured images of adjacent cameras.

9. A microscope as in claim 1;

wherein tracking changes of the organism comprises determining locations and dimensions of bounding boxes around detected organisms, and forming the bounding boxes;

wherein tracking changes of the organism comprises storing the locations and the dimensions of the bounding boxes as a function of time;

wherein the bounding boxes is formed by cropping the captured images into image segments comprising the detected organisms; and wherein the cropped image segments are saved and utilized for subsequent processing.

10. A microscope as in claim 1;

wherein tracking changes of the organism comprises creating a centered organism video based on cropped image segments; and wherein creating a centered organism video comprises transforming the bounding boxes to obtain a maximum similarity between the bounding boxes in different times.

11. A microscope as in claim 1;

wherein the captured images are processed to determined cameras whose captured images comprise the organism before being sent to the processor for organism tracking.

12. A microscope as in claim 1, further comprising:

a second processor coupled between the plurality of cameras and the processor;

wherein the second processor comprises multiple devices with each device coupled to multiple neighboring cameras of the plurality of cameras for processing the captured images of the camera; and wherein the second processor is configured to from a serial data stream to the processor from multiple parallel data streams outputted from the multiple devices.

13. A microscope as in claim 12;

wherein the each device is configured to detect the organisms from the captured images, merge the organisms from the captured across the plurality of cameras, resolve duplicated organisms in overlapped areas between cameras of the plurality of cameras, remove the organisms not meeting characteristics of a target organism, and determine location and width and height of bounding boxes around the organisms.

14. A microscope as in claim 1;

wherein field-of-view (FOV) of each camera overlaps 50% or more with FOV of one or more camera that are immediately adjacent to the each camera;

wherein the processor is configured to detect the organisms in 3 dimensions;

wherein the detection of the organisms in 3 dimensions comprises a photogrammetry process for calculating a depth information of the detected organisms based on the overlapped FOV of adjacent cameras; or wherein the detection of the organisms in 3 dimensions comprises a 3D object detection convolutional neural network processing more than one image data for each organism based on 50% or more inter-camera field of view overlaps.

15. A microscope as in claim 1;

wherein the plurality of cameras is configured to vary a magnification of the plurality of cameras to achieve 50% or more field of view overlap before processing 3D organism tracking.

* * * * *